(12) United States Patent
Karimine et al.

(10) Patent No.: US 10,144,983 B2
(45) Date of Patent: Dec. 4, 2018

(54) METHOD OF REHEATING RAIL WELD ZONE

(75) Inventors: Kenichi Karimine, Tokyo (JP); Masaharu Ueda, Tokyo (JP); Katsuya Iwano, Tokyo (JP); Hideo Tottori, Tokyo (JP); Takeshi Yamamoto, Tokyo (JP)

(73) Assignee: NIPPON STEEL AND SUMITOMO METAL CORPORATION, Tokyo (JP)

( * ) Notice: Subject to any disclaimer, the term of this patent is extended or adjusted under 35 U.S.C. 154(b) by 641 days.

(21) Appl. No.: 14/119,819

(22) PCT Filed: May 23, 2012

(86) PCT No.: PCT/JP2012/063147
§ 371 (c)(1),
(2), (4) Date: Nov. 22, 2013

(87) PCT Pub. No.: WO2012/161207
PCT Pub. Date: Nov. 29, 2012

(65) Prior Publication Data
US 2014/0087320 A1    Mar. 27, 2014

(30) Foreign Application Priority Data
May 25, 2011 (JP) .................... 2011-117317

(51) Int. Cl.
*C21D 9/04* (2006.01)
*B23K 31/02* (2006.01)
(Continued)

(52) U.S. Cl.
CPC ............. *C21D 9/04* (2013.01); *B23K 31/02* (2013.01); *C21D 1/30* (2013.01); *C21D 9/50* (2013.01);
(Continued)

(58) Field of Classification Search
CPC .......... B23K 2201/26; B23K 2203/04; B23K 31/02; C21D 1/30; C21D 2221/00;
(Continued)

(56) References Cited

U.S. PATENT DOCUMENTS 4,573,666 A * 3/1986 Nomura ............... C21D 9/505
228/46
2012/0234806 A1  9/2012 Saita et al.

FOREIGN PATENT DOCUMENTS

CA    2 756 855 A1   10/2010
GB       273326 A    5/1928
(Continued)

OTHER PUBLICATIONS

International Search Report, issued in PCT/JP2012/063147, dated Aug. 21, 2012.
(Continued)

*Primary Examiner* — Jessee R Roe
*Assistant Examiner* — Michael Aboagye
(74) *Attorney, Agent, or Firm* — Birch, Stewart, Kolasch & Birch, LLP

(57) ABSTRACT

A method of reheating a rail weld zone after rails were welded, a distance C between a reheating region P of a rail web portion 2 and a welding center Q is set to more than or equal to 0.2 times and less than or equal to three times a HAZ length Lh of the rail weld zone. A length B of the reheating region P may be more than or equal to 0.5 times and less than or equal to five times the HAZ length Lh of the rail weld zone. A height A of the reheating region P may be more than or equal to 0.2 times a height Hw of the rail web portion 2. A temperature Th reached in a reheating process at a center of the reheating region P may be higher than or equal to 400° C. and lower than or equal to 750° C.

17 Claims, 21 Drawing Sheets

(51) Int. Cl.
*C21D 1/30* (2006.01)
*C21D 9/50* (2006.01)
*C22C 38/02* (2006.01)
*C22C 38/04* (2006.01)
*C22C 38/18* (2006.01)
B23K 101/26 (2006.01)
B23K 103/04 (2006.01)

(52) U.S. Cl.
CPC .............. *C22C 38/02* (2013.01); *C22C 38/04* (2013.01); *C22C 38/18* (2013.01); *B23K 2201/26* (2013.01); *B23K 2203/04* (2013.01); *C21D 2221/00* (2013.01)

(58) Field of Classification Search
CPC .. C21D 9/04; C21D 9/50; C22C 38/02; C22C 38/04; C22C 38/18
USPC ........ 266/252, 259, 249, 128, 129; 248/526, 248/529, 651, 516; 432/9; 148/526, 529, 148/651, 516, 581, 569, 520
See application file for complete search history.

(56) References Cited

FOREIGN PATENT DOCUMENTS

| GB | 2403174 | * | 12/2004 |
|---|---|---|---|
| JP | 48-095337 | | 2/1973 |
| JP | 56-136292 A | | 10/1981 |
| JP | 58-153731 A | | 9/1983 |
| JP | 59-93837 A | | 5/1984 |
| JP | 59-93838 A | | 5/1984 |
| JP | 63-160799 A | | 7/1988 |
| JP | 3-249127 A | | 11/1991 |
| JP | 3-277720 A | | 12/1991 |
| JP | 08-337819 | * | 12/1996 |
| JP | 8-337819 A | | 12/1996 |
| JP | 11-58042 A | | 3/1999 |
| JP | 11-270810 A | | 10/1999 |
| JP | 2010-543 A | | 1/2010 |
| WO | 2010/116680 A1 | | 10/2010 |
| WO | WO 2011/052562 A1 | | 5/2011 |

OTHER PUBLICATIONS

Written Opinion of the International Search Authority, issued in PCT/JP2012/063147, dated Aug. 21, 2012.
Australian Office Action dated Sep. 19, 2014, issued in Australian Patent Application No. 2012259857.
Australian Examination Report dated May 21, 2014 issued in Australian patent application No. 2012259857.
Australian Office Action dated Nov. 19, 2014, issued in Australian Patent Application No. 2012259857.
Canadian Office Action dated Jan. 12, 2015, issued in Canadian Patent Application No. 2,836,260.
Chikayuki Urashima et al.; The Influence of Residual Stress on Durability of Rails; Proceedings of the Second International Conference on Residual Stresses, ICR2; Nancy; France; Nov. 23-25, 1988; pp. 912-918.
G. F. Carpenter et al.; Residual Stresses in Welded Rails; Proceedings Railroad Rail Welding; AAR, Memphis, USA, Nov. 29-30, 1983; pp. 153-160.
Brazilian Gazette dated Jul. 10, 2018 providing Brazilian Office Action and Search Report for corresponding Brazilian Application No. 112013029859-6, dated Jun. 8, 2018, with an English translation.
Ichiyama et al., "Flash-Butt Welding of High Strength Steels," Nippon Steel Technical Report, No. 95, Jan. 2007, pp. 81-87.

* cited by examiner

CROSS SECTION ALONG LINE A-A

CROSS SECTION ALONG LINE B-B

CROSS SECTION ALONG LINE B-B

DISTRIBUTION OF RESIDUAL STRESS IN
LONGITUDINAL DIRECTION AT TL, TR

METHOD OF REHEATING RAIL WELD ZONE

TECHNICAL FIELD

The present invention relates to a method of reheating a rail weld zone, the method increasing fatigue strength of the weld zone compared to the prior art.

BACKGROUND ART

It is a joint portion of rails where it is most likely to be damaged and cost the most for the maintenance. Further, the joint portion is a main source of noise and vibration generated during train passage. Since the speeding up of passenger railway operations and the increase in loads of freight railways are promoted in many countries, the following technology is generalized: the rail joints that cause the above problems are welded such that the rails are formed into a continuous long rail.

With reference to FIGS. 1A to 1D, there are described names for a weld zone of the long rail and a cross section of the rail. FIG. 1A is a side view of a weld zone in a longitudinal direction. The long rail is produced by welding at least two rails. Accordingly, the long rail includes a weld zone 7. A bead 8 is present on the weld zone 7.

FIG. 1B is a cross-sectional view along the line A-A perpendicular to a longitudinal direction of a rail at a welding center Q. The rail has a head portion 1 that is an upper part of the rail which comes in contact with wheels, a foot portion 3 that is a lower part of the rail which is in contact with ties, and a rail web portion 2 that is a perpendicular part between the head portion 1 and the foot portion 3. Further, a point 4, which is the highest point of the head portion may be referred to as head-top portion, a top surface 5 of the foot portion may be referred to as foot-top, and a back surface 6 of the foot portion may be referred to as sole or base.

Next, a method of welding rails is described. There are four examples of main methods of welding rails: flash butt welding (for example, Patent Document 1), gas pressure welding (for example, Patent Document 2), enclosed arc welding (for example, Patent Document 3), and thermite welding (for example, Patent Document 4).

Figure 2A:
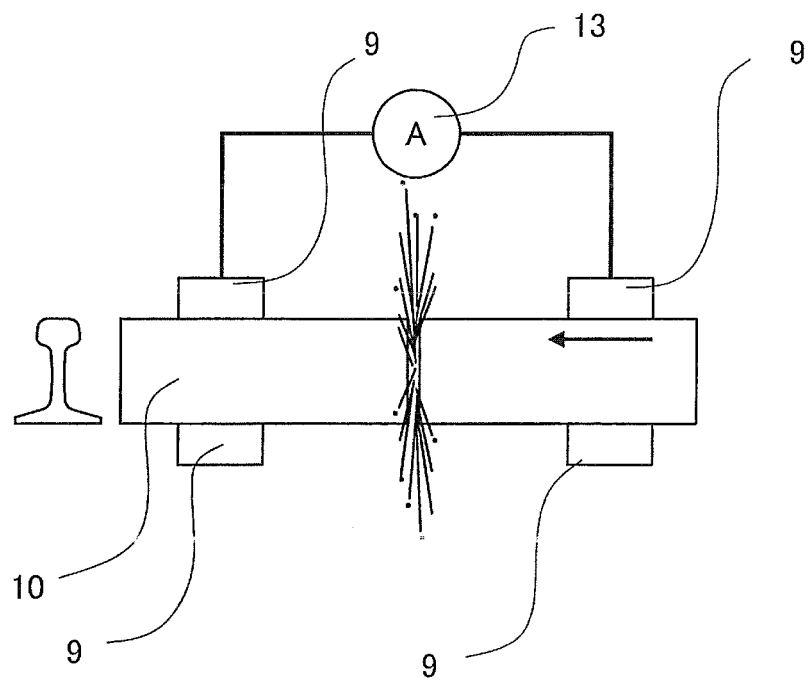
Figure 2B:
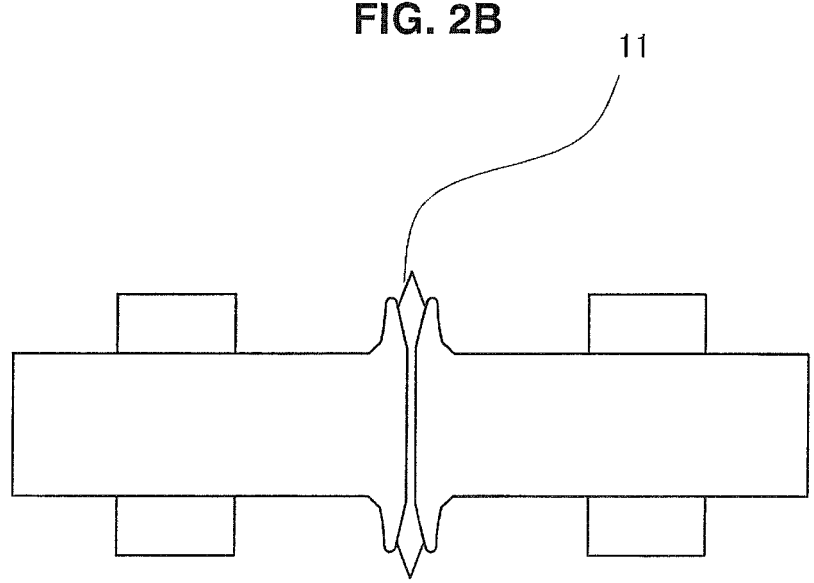
Figure 2C:
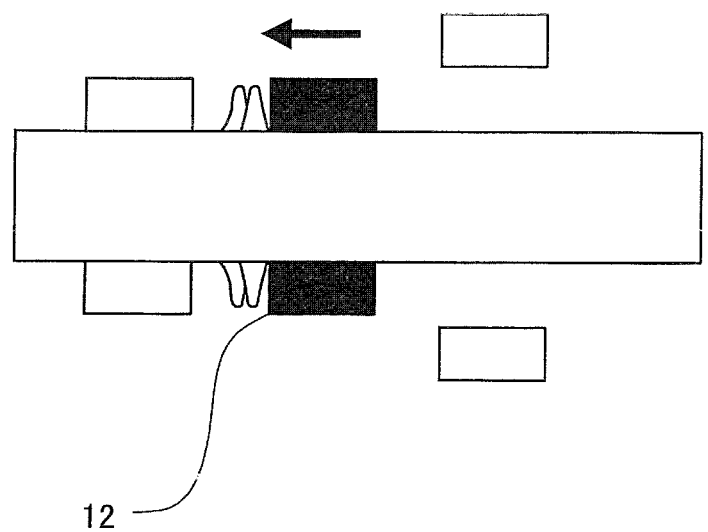

As shown in FIGS. 2A to 2C, the flash butt welding is a welding method involving applying voltage through electrodes 9 to welding materials 10 placed face to face, causing an arc to be formed between end faces of the welding materials to melt the end faces, and, at the time point at which the welding materials are sufficiently heated, bonding the welding materials by pressurizing in an axial direction the materials.

The thermite welding is a method involving causing the welding materials 10 to be placed face to face with a gap of 20 to 30 mm therebetween, surrounding the gap part with a mold, producing molten steel resulting from a reaction of aluminum with iron oxide, the reaction taking place inside a crucible set at an upper part of the mold, and injecting the molten steel into the mold to melt end faces of rails and weld the end faces to each other.

The gas pressure welding is a method involving heating, in the state of bonding faces being pressurized, the welding materials in the vicinity of the bonding faces from the side surfaces using a burner, and pressure welding the bonding faces at a high temperature. The vicinity of the weld zone is expanded and deformed by the pressurization. The expanded portion is removed by a trimmer.

The enclosed arc welding is a manual arc welding method involving causing the welding materials to be placed face to face with a gap of 10 to 20 mm therebetween, surrounding the gap with a backing strip and a side strip, and heaping up the weld metal at the gap with a welding rod.

Figure 3A:
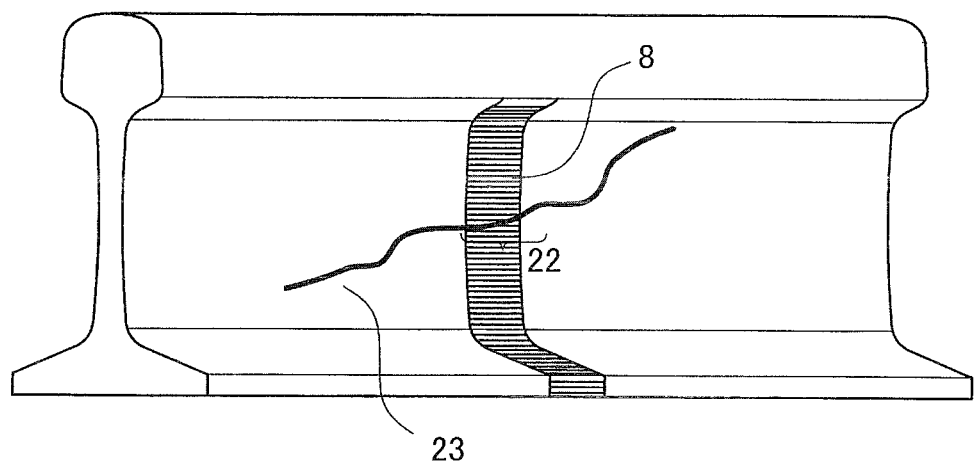
Figure 3B:
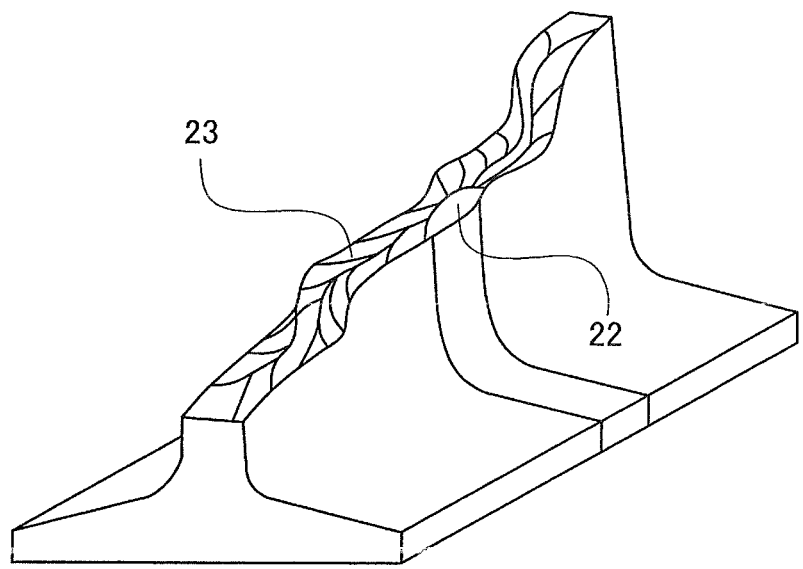

In a rail weld zone, there are cases where a fatigue crack is generated from a neutral axis of the rail web portion of the rail weld zone, particularly in heavy load freight railways and in a cold district, the fatigue crack causes a brittle fracture, and thus increases the frequency of replacing the rails. FIG. 3A and FIG. 3B show a form of the damage.

That is, FIG. 3A is a view of a horizontal crack generation state of the rail web portion viewed from the side face of the rail. A fatigue crack 22 is generated in the horizontal direction from a point of a weld defect near a reinforcement of weld in the vicinity of the neutral axis of the rail web portion, then a brittle crack 23 penetrates the thickness of the rail web portion, and after that, one end of the crack propagates towards the head-top side and the other end of the crack propagates towards the base side. Although there is the case where an origination of the fracture is the weld defect, the fracture may also be generated from the surface of the weld zone when there is no defect.

FIG. 3B shows a state where the site at which the horizontal crack is generated in the rail web portion is cut, and a crack surface is opened and viewed from the rail head-top side. The following state can be seen: the fatigue crack 22 is generated from near the center of the rail web portion of the rail weld zone; and then the brittle crack 23 penetrates the thickness of the rail web portion.

Figure 4:
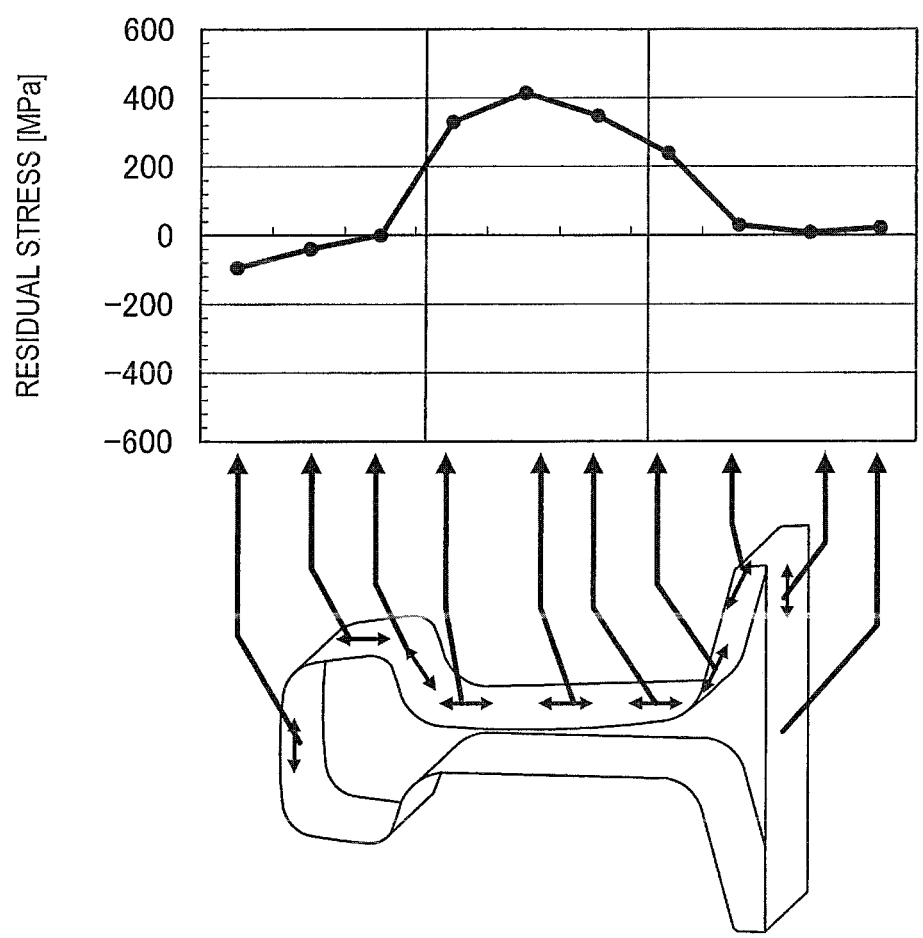

As described in Non-Patent Document 2, it is considered that the generation of the fatigue crack is affected by not only an external load condition but also residual stress in the materials. FIG. 4 shows results measured by the inventors of the present application of the residual stress distribution within a cross section in a circumferential direction, the cross section forming a right angle with the longitudinal direction of the rail at the welding center Q of the rail weld zone. The fatigue crack 22 is generated and propagated, because large tensile residual stress is generated by the welding in the vicinity of the rail web portion 2 of the weld zone in the circumferential direction of the rail, that is, in the vertical direction, and a load is repeatedly applied each time trains pass. In order to prevent such damage, it is desirable to prevent the weld defect which is a damage origination, and also to render the defect harmless even if there is the defect. From this viewpoint, it is desirable that the residual stress in the vertical direction applied to the rail web portion be smaller. According to a fatigue test performed by the present inventors, it is desirable that, for reducing the frequency of the generation of the fatigue crack, the residual stress in the vertical direction be 350 MPa or less.

A railway track is formed of broken stone ballasts, ties, devices each fastening a rail and a tie, and rails. During the passage of trains on the rail, a load distributed from many wheels of the trains are applied to the railway track.

In considering a cause for generating the damage, it is necessary to consider a load condition from the wheels with respect to the rail weld zone. The most typical states of the relationship between a rail and ties supporting the rail are: a state in which a vertical load is directly applied to the rail a wheel passes immediately above the tie; and a state in which the wheel passes an interval between ties. When a long rail produced by the welding performed in a manufacturing facility is placed at an actual location, it is only by chance that a position of a weld zone and a position of a tie meet with each other. It is considered that, in one long rail having a length of several hundred meters, there are several parts at which a position of a tie and a position of a weld zone meet with each other.

Figure 5:
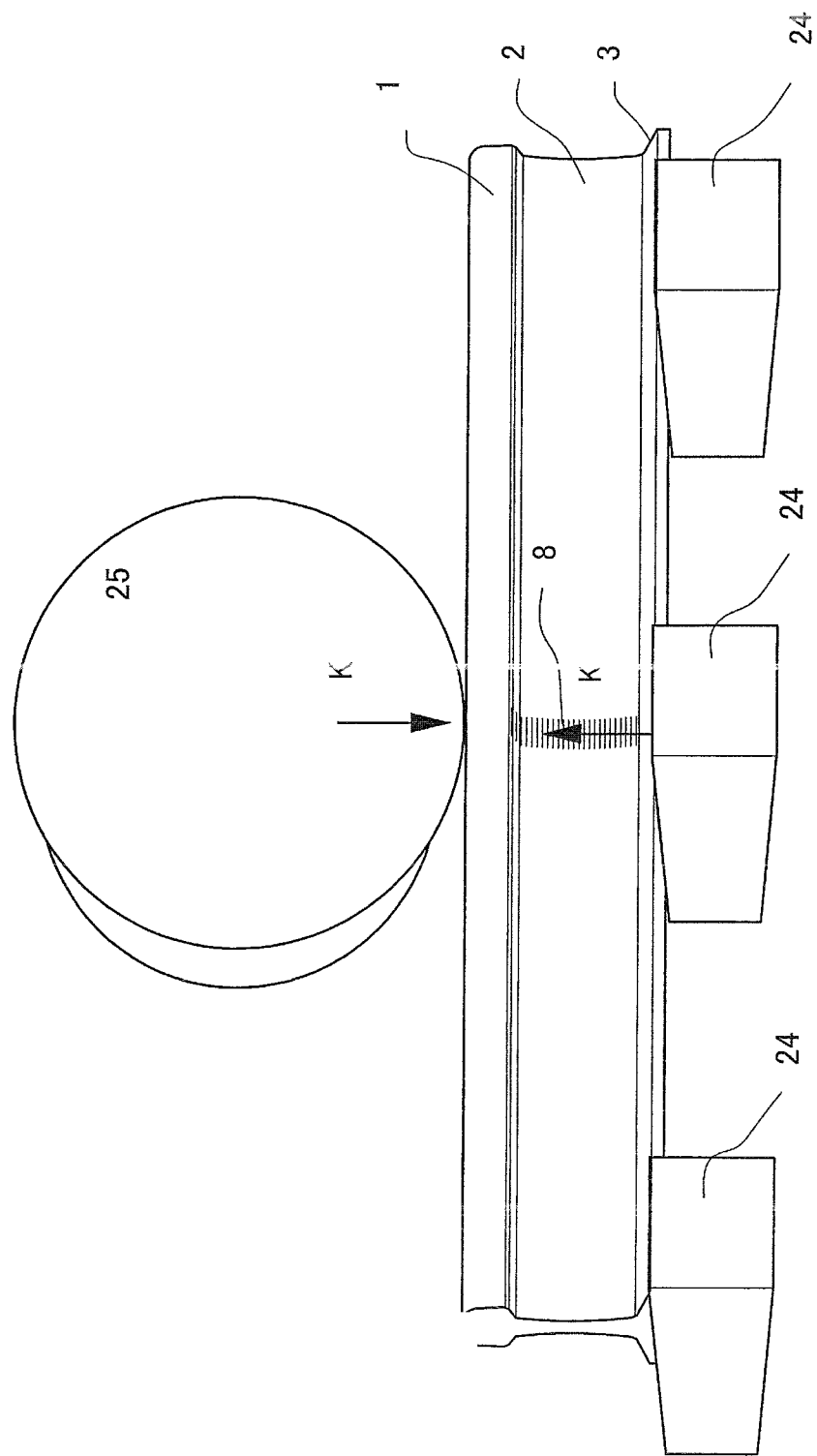

FIG. 5 shows a case where a wheel 25 passes immediately above a tie 24. In this case, the largest stress is generated at the rail web portion 2 which has a small cross sectional area. Although the stress in this case is compressive stress, the stress at the rail web portion 2 of the weld zone 7 has the excessively large tensile residual stress, and hence, the stress is substantially in a repetitive stress state in a tensile region.

Figure 6:
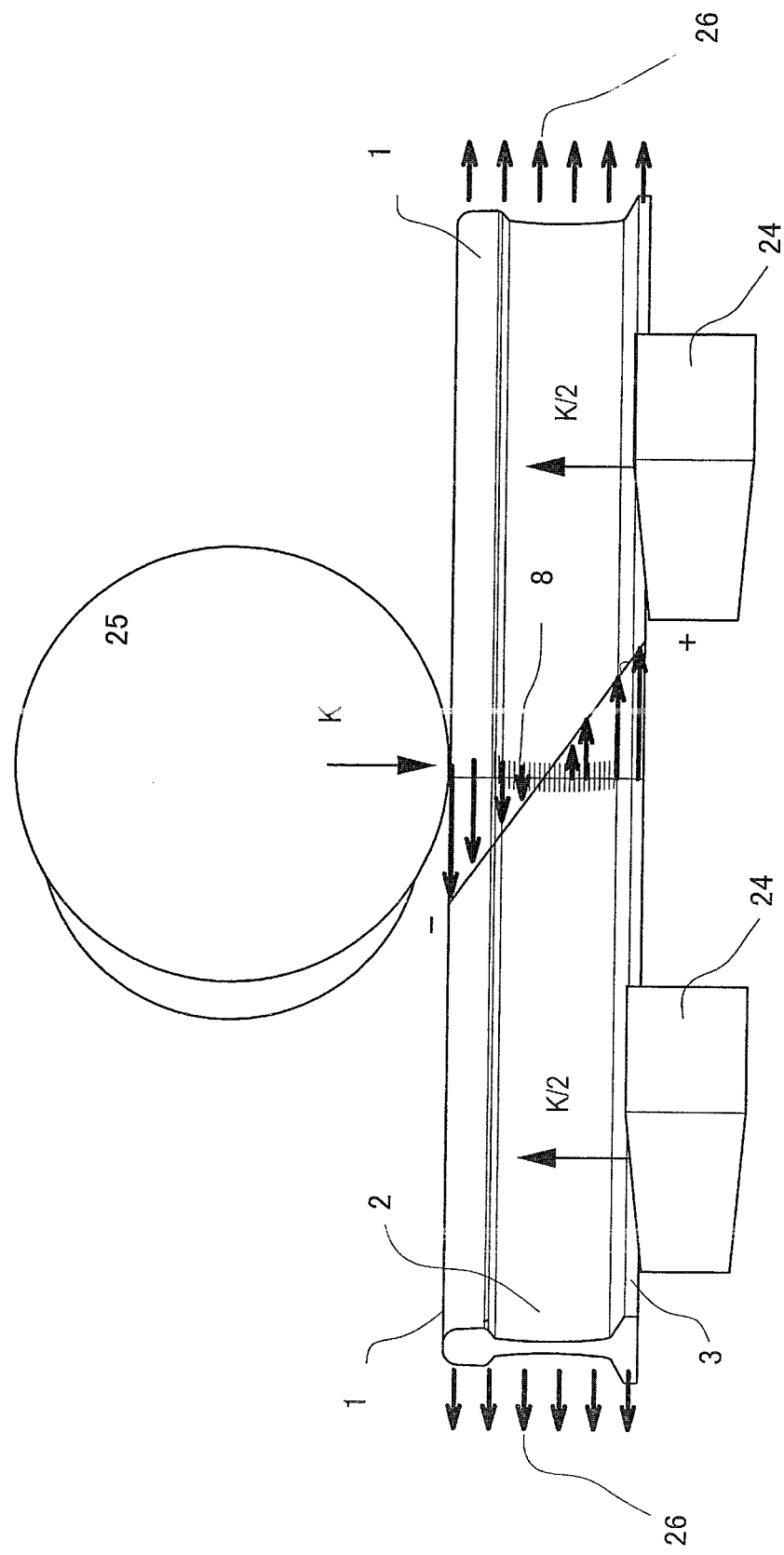

Further, it is considered that the state in which the wheel passes an interval between the ties is the other typical loaded state, and as shown in FIG. 6, a load that bends the rail by pushing from an upper part is added. In this loaded state, a rail head portion is compressed in a longitudinal direction, a rail foot portion is pulled in the longitudinal direction, and the rail web portion is neutral. However, in winter, shrinkage stress is generated in the longitudinal direction of the rail in many cases, and tensile stress may be applied repeatedly at a position where a height of the rail web portion is low. When the residual stress in the longitudinal direction is applied in addition to the shrinkage stress and the tensile stress, there is a risk in winter that a fatigue crack in a direction that forms a right angle with the longitudinal direction of the rail, that is, in the vertical direction, may be generated at the rail web portion, the fatigue crack being attributed to the stress in the longitudinal direction of the rail.

Figure 7:
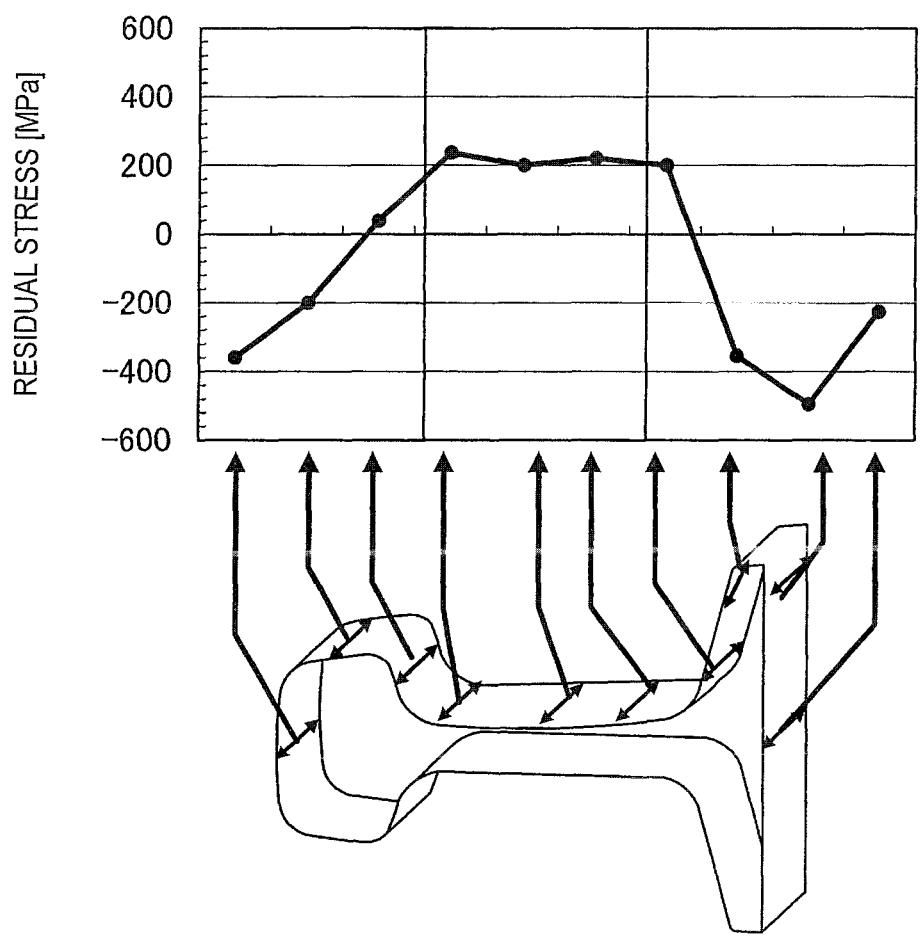

Note that the tensile stress is applied to the rail foot portion each time the wheel passes. However, as shown in Non-Patent Document 2, the residual stress of a flash butt weld zone in the longitudinal direction is in a large compressive stress state in the rail sole portion. FIG. 7 shows results measured by the inventors of the present application. Accordingly, the tensile stress applied to the rail foot portion through the passage of trains and the residual stress offset each other, and thereby forming a compressed region, which gives an advantage that fatigue cracks are not easily generated.

In order to improve durability of the long rail, it is necessary to suppress the generation of the fatigue crack from the rail web portion of the weld zone and to achieve the fatigue-resistant characteristics of those portions.

In order to prevent the damage to the rail web portion, the inventions of Patent Documents 5 and 6 each disclose a method of improving the fatigue resistance of the rail weld zone by controlling the residual stress using rapid cooling of the head portion and the rail web portion of the rail weld zone or the entire rail weld zone, which is in a high-temperature state attributed to welding heat or heat transferred from the outside, and reducing tensile residual stress that is generated at the rail web portion of the rail weld zone in the vertical direction or converting the tensile residual stress into compressive stress. According to those inventions, it has become possible to largely reduce the generation of the fatigue crack from the rail web portion.

When the method of rapidly cooling the head portion and the rail web portion after the welding as described in Patent Documents 5 and 6 is performed, Non-Patent Document 1 shows that the residual stress that is generated at the rail web portion in the vertical direction [o1] is reduced, and thus, the generation of the fatigue crack in the rail web portion can be suppressed. However, according to this method, it is illustrated that the residual stress of the sole portion in the longitudinal direction is converted into tensile stress. In recent years, there has been a tendency that weight of freight cars in heavy freight railways is increasing, and as a result thereof, a bending load applied to the sole portion is increased. The sole portion is pulled in the longitudinal direction of the rail due to the bending load, and a bending fatigue strength of this part is strongly influenced by the residual stress in the longitudinal direction. If the residual stress of the sole portion in the longitudinal direction is converted into tensile stress due to the cooling method of Patent Documents 5 and 6, there is a risk that bending fatigue resistance may be lowered.

As other techniques that improve the fatigue strength of the rail weld zone, there are given a method using shot peening as described in, for example, Patent Document 7, and methods using hammer peening, grinder treatment, and TIG dressing.

Further, Patent Document 8 shows a method of reducing the residual stress by reheating the weld zone with a gas burner. There is shown a possibility that this method may reduce the residual stress, but Patent Document 8 does not show an appropriate reheating region that is assumed to be different for each welding method, and it is not necessarily sufficient for preventing fatigue damage.

PRIOR ART DOCUMENT(S)

Patent Document(s)

[Patent Document 1] JP S56-136292A
[Patent Document 2] JP H11-270810A
[Patent Document 3] JP S63-160799A
[Patent Document 4] JP S48-95337A
[Patent Document 5] JP S59-93837A
[Patent Document 6] JP S59-93838A
[Patent Document 7] JP H3-249127A
[Patent Document 8] JP H8-337819A Non-Patent Document(s)

[Non-Patent Document 1] Proceedings of the Second International Conference on residual stresses, ICR2, Nancy, France, 23-25, Nov. 1988, P912-918
[Non-Patent Document 2] Proceedings Railroad Rail Welding, AAR, Memphis, USA, 29-30, Nov. 1983, P153-160

SUMMARY OF THE INVENTION

Problem(s) to be Solved by the Invention

An aspect of the present invention is achieved by taking into consideration the above-mentioned problems of prior art, and an object thereof is to provide a method of producing efficiently a long rail whose fatigue strength of the rail weld zone is improved as compared to the prior art.

Means for Solving the Problem(s)

An aspect of the present invention is to reduce residual stress of the rail weld zone to thereby improve the fatigue strength. That is, the aspect of the present invention is as follows.

(1) A method of reheating a rail weld zone, the method being performed after rails were welded, each rail having a reheating region P of a rail web portion, the reheating region P being present at a distance C away from a welding center Q, the distance C being more than or equal to 0.2 times and less than or equal to three times a heat affected zone (HAZ) length Lh of the rail weld zone:

$$0.2Lh \leq C \leq 3Lh.$$

(2) The method of reheating a rail weld zone according to (1), wherein the reheating region P has a length B in a rail longitudinal direction of more than or equal to 0.5 times and less than or equal to five times the HAZ length Lh of the rail weld zone:

$$0.5Lh \leq B \leq 5Lh.$$

(3) The method of reheating a rail weld zone according to (1) or (2), wherein the reheating region P has a height A of more than or equal to 0.2 times a height Hw of the rail web portion:

$$0.2Hw \leq A.$$

(4) The method of reheating a rail weld zone according to any one of (1) to (3), wherein the reheating region P has a temperature reached in a reheating process at a center of the reheating region P of higher than or equal to 400° C. and lower than or equal to 750° C.

(5) The method of reheating a rail weld zone according to (4), wherein the temperature Th(° C.) reached in the reheating process at the center of the reheating region P satisfies, in relationship with an initial temperature Tw(° C.) of the rail weld zone in the reheating process, $$0.375Tw+350 \leq Th \leq 0.5Tw+600.$$

(6) The method of reheating a rail weld zone according to any one of (1) to (5), wherein a distance Ch between a reheating region Ph of a rail head-top portion and the welding center Q is more than or equal to 0.2 times and less than or equal to three times the HAZ length Lh of the rail weld zone.

(7) The method of reheating a rail weld zone according to any one of (1) to (6), wherein the reheating region Ph of the rail head-top portion has a length Bh of more than or equal to 0.5 times and less than or equal to five times the HAZ length Lh of the rail weld zone.

(8) The method of reheating a rail weld zone according to any one of (1) to (7), wherein the reheating region Ph of the rail head-top portion has a width Ah of more than or equal to 0.3 times a rail head width Gh.

(9) The method of reheating a rail weld zone according to any one of (1) to (8), wherein the reheating region Ph of the rail head-top portion has a temperature reached at a center of the reheating region Ph of higher than or equal to 400° C. and lower than or equal to 750° C.

(10) The method of reheating a rail weld zone according to any one of (1) to (9), wherein a distance Cb between a reheating region Pb of a rail sole portion and the welding center Q is more than or equal to 0.2 times and less than or equal to three times the HAZ length Lh of the rail weld zone.

(11) The method of reheating a rail weld zone according to any one of (1) to (10), wherein the reheating region Pb of the rail sole portion has a length Bb of more than or equal to 0.5 times and less than or equal to five times the HAZ length Lh of the rail weld zone.

(12) The method of reheating a rail weld zone according to any one of (1) to (11), wherein the reheating region of the rail sole portion has a width Ab of more than or equal to 0.3 times a rail foot width Gb.

(13) The method of reheating a rail weld zone according to any one of (1) to (12), wherein the reheating region Pb of the rail sole portion has a temperature reached at a center of the reheating region Pb of higher than or equal to 400° C. and lower than or equal to 750° C.

Effect(s) of the Invention

According to an aspect of the present invention, the residual stress of the rail web portion at the rail weld zone can be reduced, and it can be made more difficult for fatigue cracks to be generated in the weld zone.

BRIEF DESCRIPTION OF THE DRAWING(S)

Figure 1A:
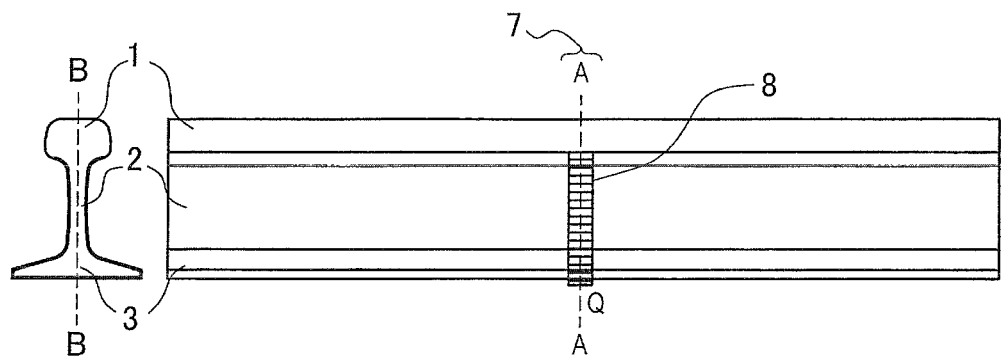
FIG. 1C is a cross-sectional view along the line B-B parallel and vertical to the longitudinal direction of the rail, which includes the welding center Q. There is a region which is heated to more than or equal to an A1 transformation point by welding, that is, there are boundary lines X of a heat-affected zone (hereinafter, referred to as HAZ) at both sides of the welding center Q.
FIG. 1D is a cross-sectional view along the line B-B in the case of melt welding such as thermite welding and enclosed arc welding. There are melting boundaries Z at both sides of the welding center Q, and the inside thereof is a weld metal.

FIG. 1A is an explanatory diagram of names for a weld zone and a rail cross section, and is a side view in which a long rail is viewed in a horizontal direction.

Figure 1B:
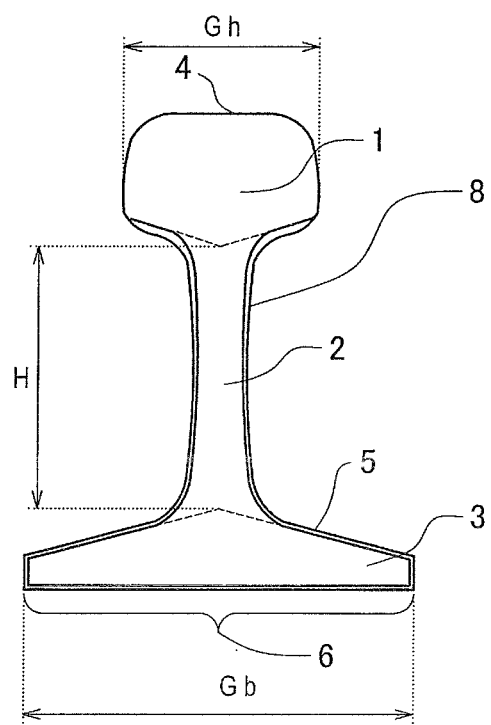

FIG. 1B is a cross-sectional view along the line A-A of FIG. 1A.

Figure 1C:
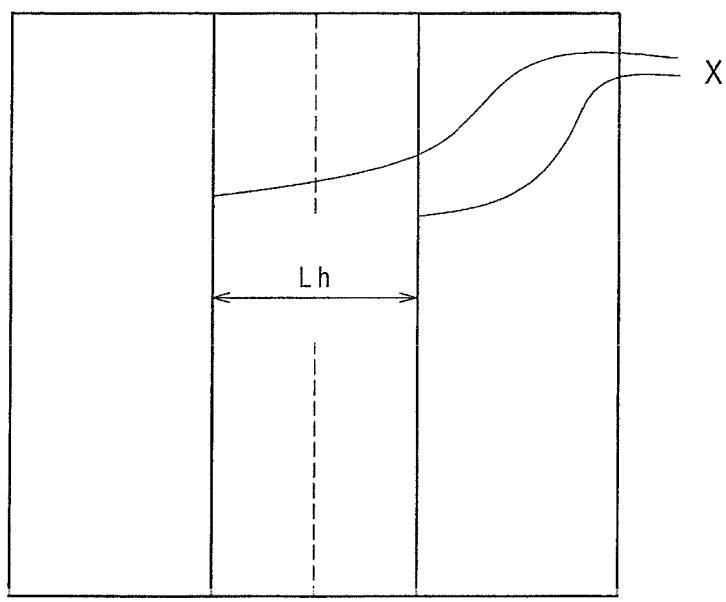

FIG. 1C is a cross-sectional view along the line B-B of FIG. 1A in flash butt welding and gas pressure welding.

Figure 1D:
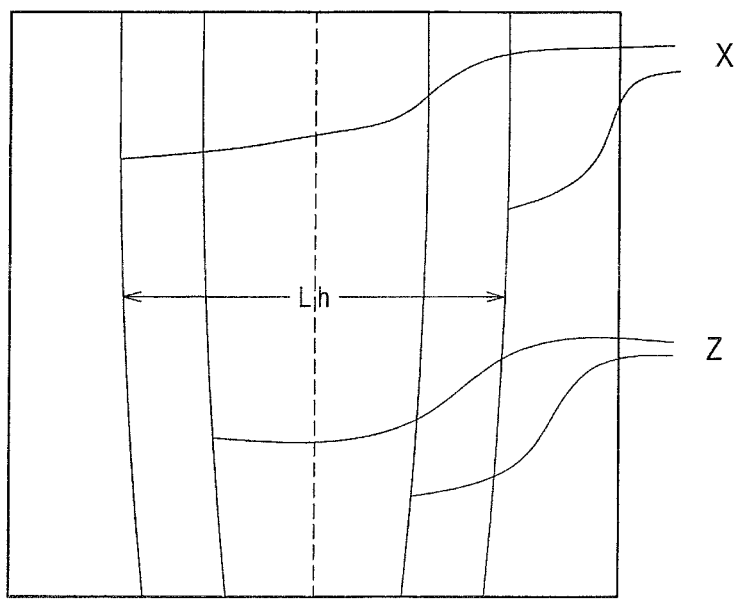

FIG. 1D is a cross-sectional view along the line B-B of melt welding such as thermite welding and enclosed arc welding.

FIG. 2A is a schematic view of flash butt welding, and shows a flashing process.

FIG. 2B is a schematic view of flash butt welding, and shows an upset process.

FIG. 2C is a schematic view of flash butt welding, and shows a trimming process.

FIG. 3A is a schematic view of an example of a fatigue damage generated from a rail web portion of a rail weld zone, in which a damaged part is viewed in a horizontal direction.

FIG. 3B is a schematic view of an example of the fatigue damage generated from the rail web portion of the rail weld zone, in which a crack of the damaged part is opened and viewed from an upper part.

FIG. 4 shows a distribution of residual stress within a cross section along the line A-A in a circumferential direction at a welding center Q of a flash butt welded joint.

FIG. 5 is an explanatory diagram showing a situation where a wheel passes on a weld zone immediately above a tie.

FIG. 6 is an explanatory diagram showing a situation where a wheel passes on a weld zone between ties, and showing a situation of shrinkage stress in winter.

FIG. 7 shows a distribution of residual stress within a cross section along the line A-A in a longitudinal direction at a welding center Q of a flash butt welded joint.

Figure 8A:
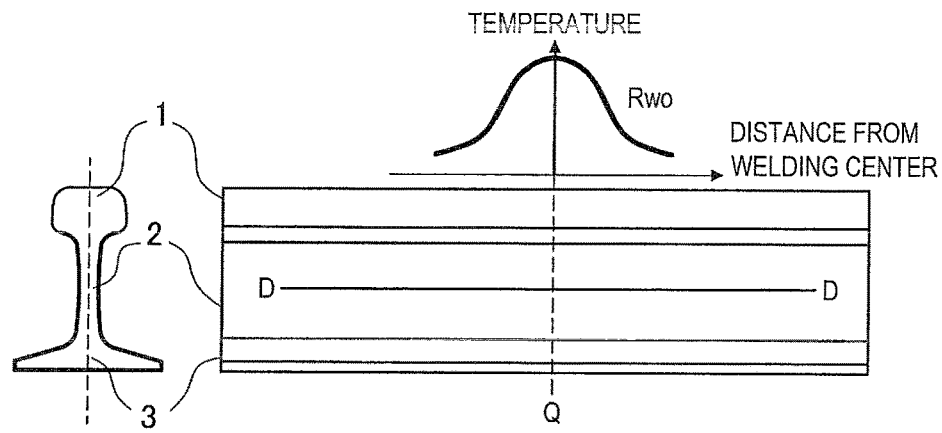

FIG. 8A is a schematic view of a residual stress generation mechanism, and shows a temperature distribution along a center line D-D of a rail web portion immediately after welding.

Figure 8B:
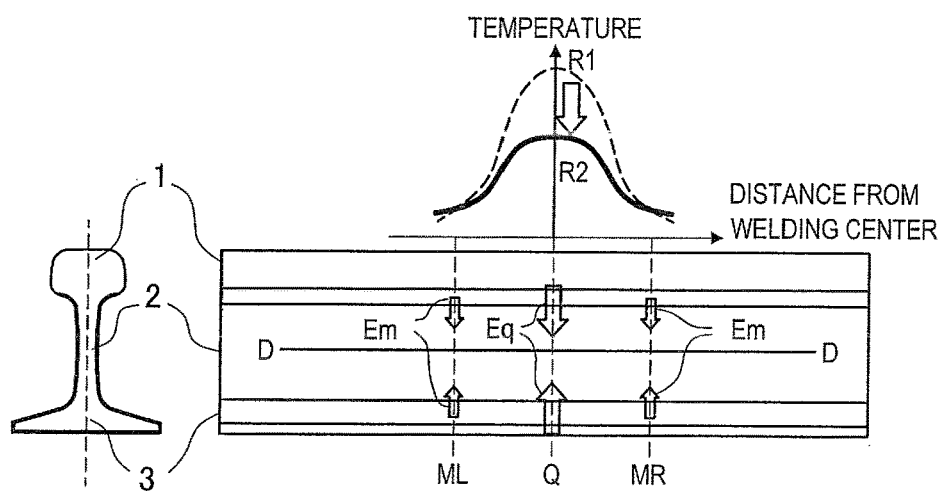

FIG. 8B is a schematic view of the residual stress generation mechanism, and shows a situation of generation of a strain in a natural cooling process after the welding.

Figure 8C:
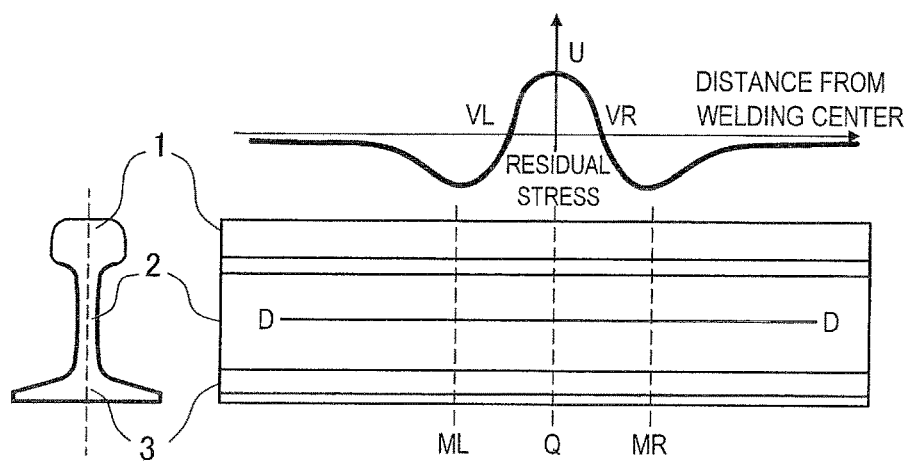

FIG. 8C is a schematic view of the residual stress generation mechanism, and shows a distribution of residual stress along a rail web center line D-D.

Figure 9:
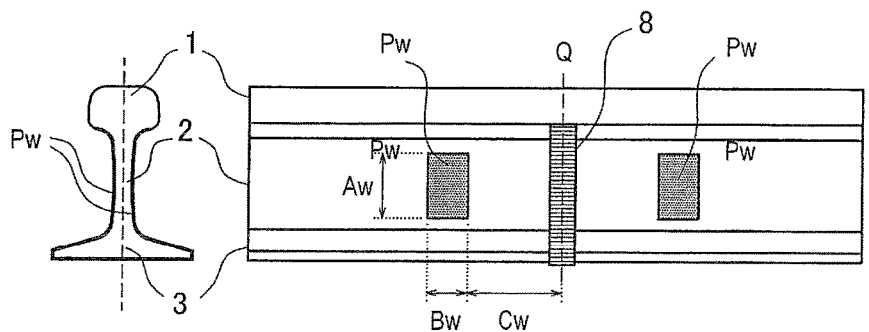

FIG. 9 is a schematic view showing a method of reheating a rail web portion 2 of a weld zone according to an aspect of the present invention.

Figure 10:
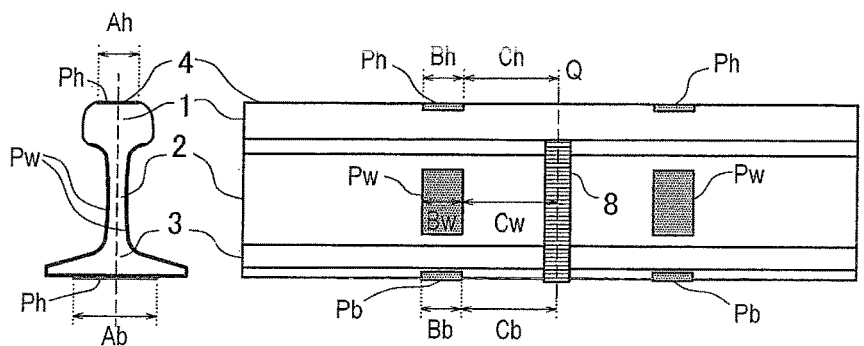

FIG. 10 is a schematic view showing a method of reheating a rail web portion 2, a head-top portion 4, and a sole portion 6 of a weld zone according to an aspect of the present invention.

Figure 11:
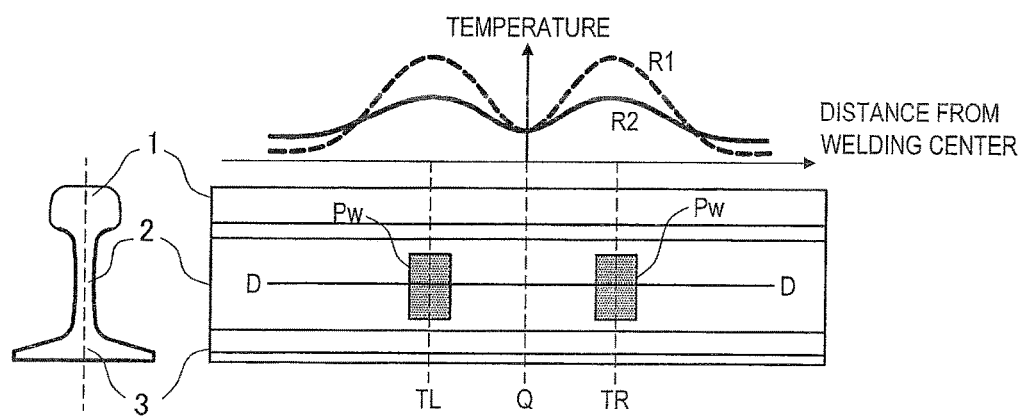

FIG. 11 is a schematic view of temperature distributions when carrying out reheating according to an aspect of the present invention.

Figure 12A:
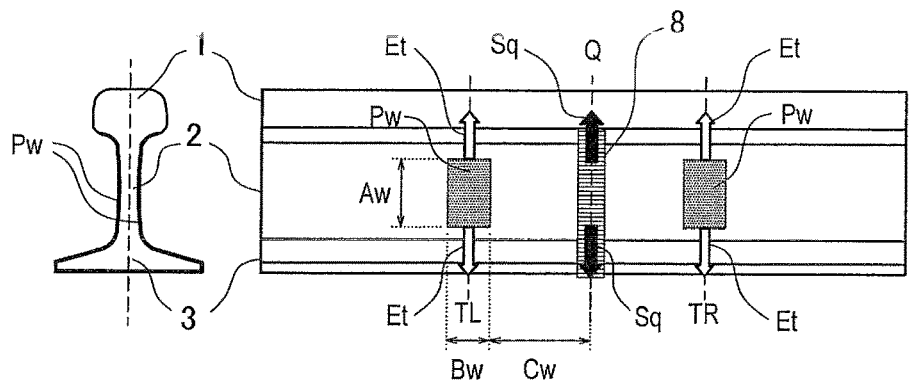

FIG. 12A is a schematic view showing generation of a strain and stress when carrying out reheating according to an aspect of the present invention, and shows a situation at a time of reheating.

Figure 12B:
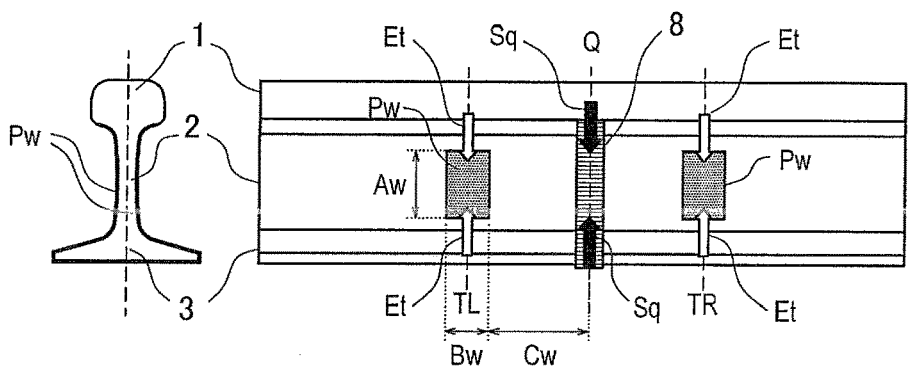

FIG. 12B is a schematic view showing generation of a strain and stress when carrying out reheating according to an aspect of the present invention, and shows a situation in a cooling process.

Figure 13:
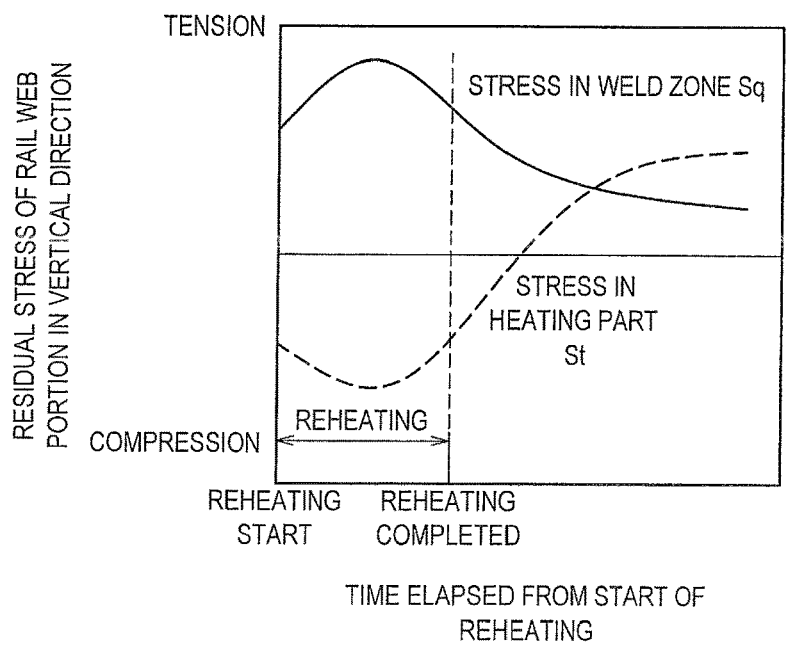

FIG. 13 is a schematic view showing changes in strains at a weld zone and a reheating part TL, TR when carrying out reheating according to an aspect of the present invention.

Figure 14:
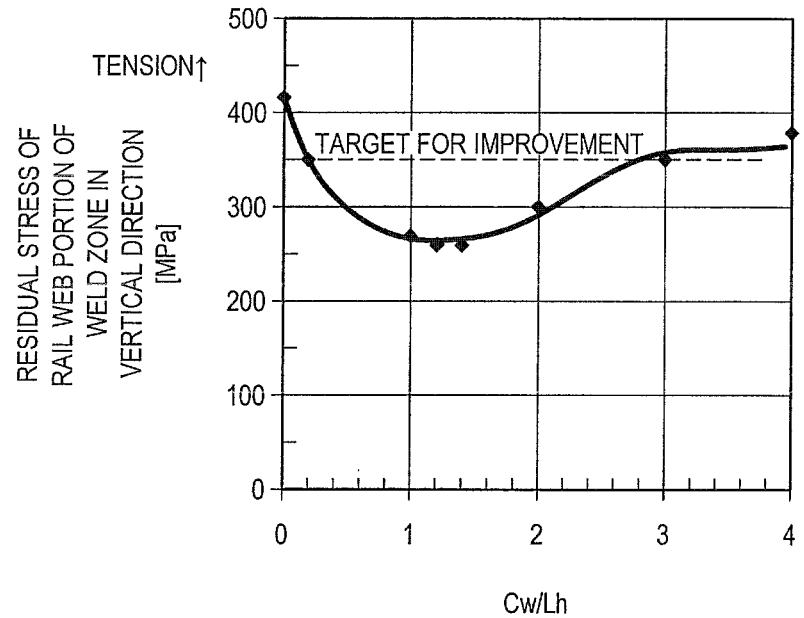

FIG. 14 is a schematic view showing a relationship between: a distance Cw between a reheating region Pw and a welding center; and residual stress.

Figure 15:
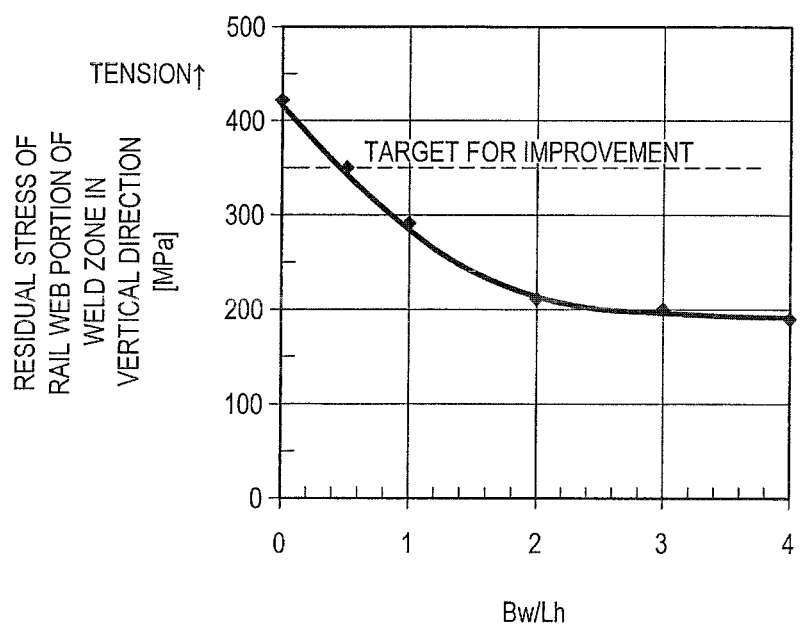

FIG. 15 is a schematic view showing a relationship between a length Bw of the reheating region Pw and residual stress.

Figure 16:
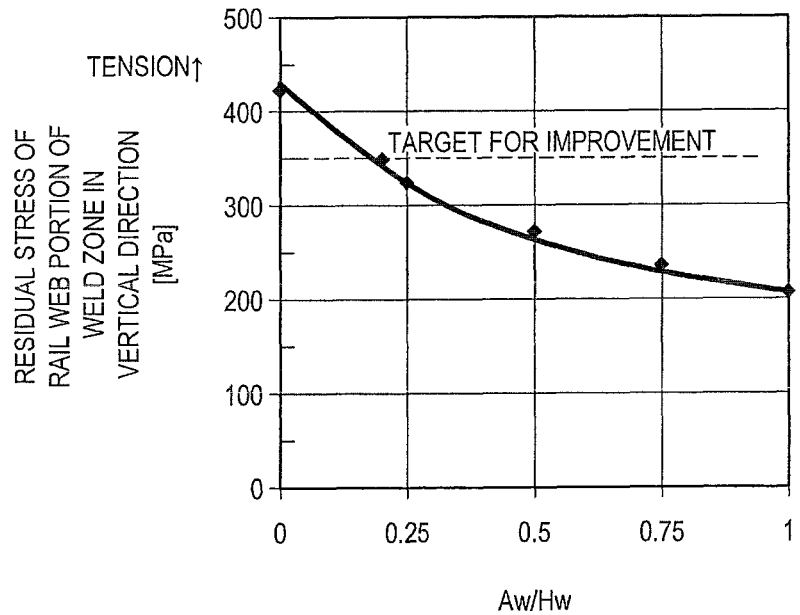

FIG. 16 is a schematic view showing a relationship between a height Aw of the reheating region Pw of the rail web portion 2 and residual stress.

Figure 17:
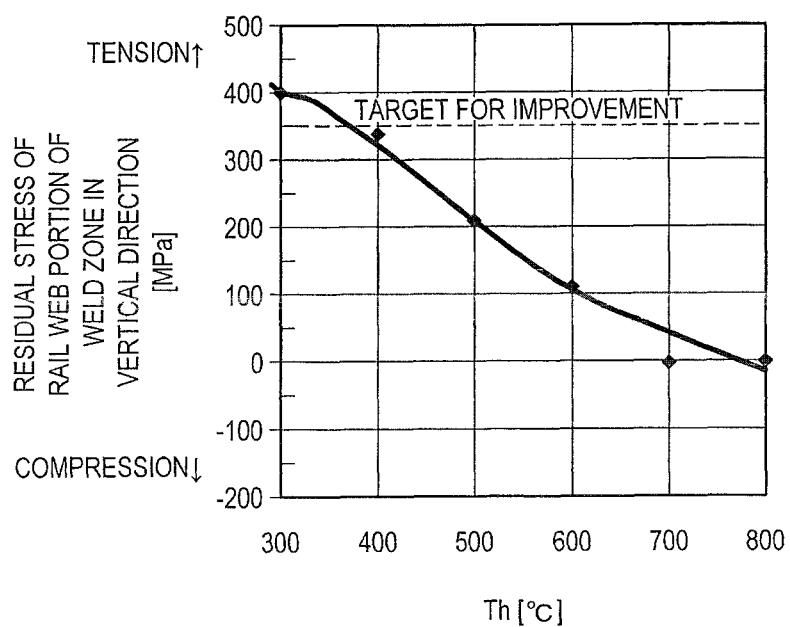

FIG. 17 is a schematic view showing a relationship between a reheating temperature Th at a reheating region P of the rail web portion 2 and residual stress.

Figure 18:
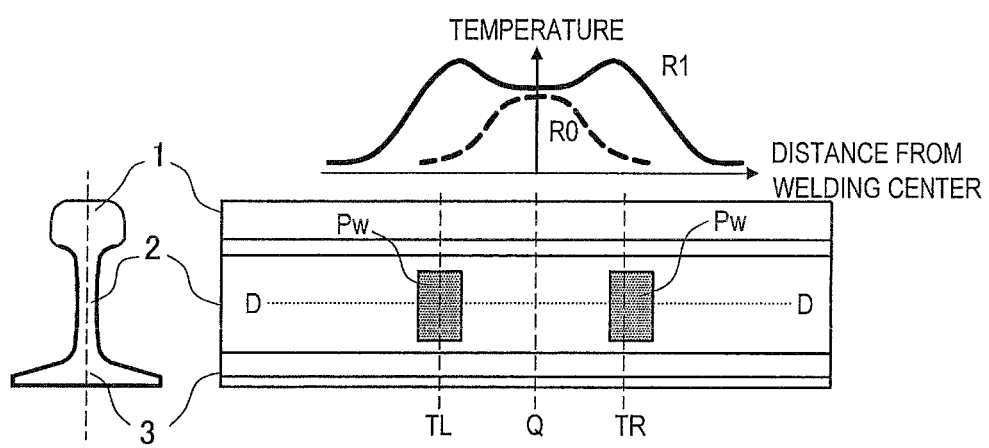

FIG. 18 is a schematic view showing temperature distributions when carrying out reheating from a warm state after welding.

Figure 19:
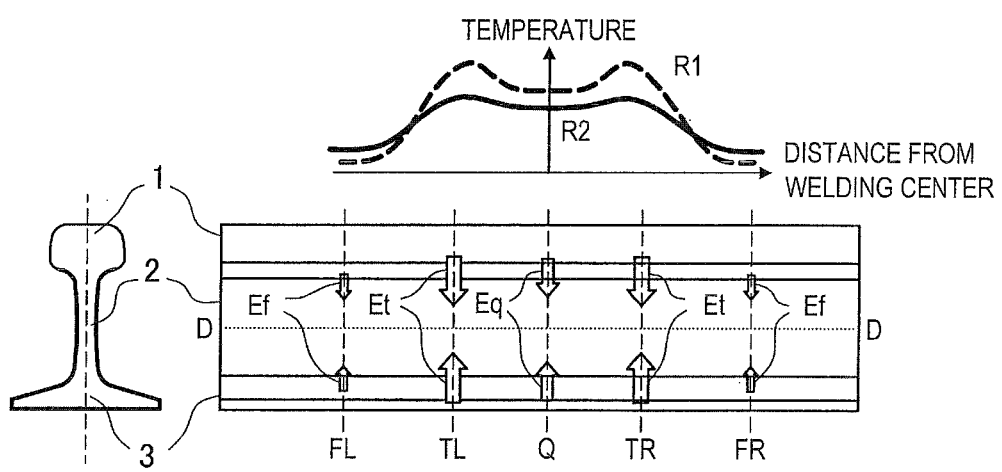

FIG. 19 is a schematic view showing temperature distributions in a cooling process after carrying out reheating from the warm state after welding.

Figure 20:
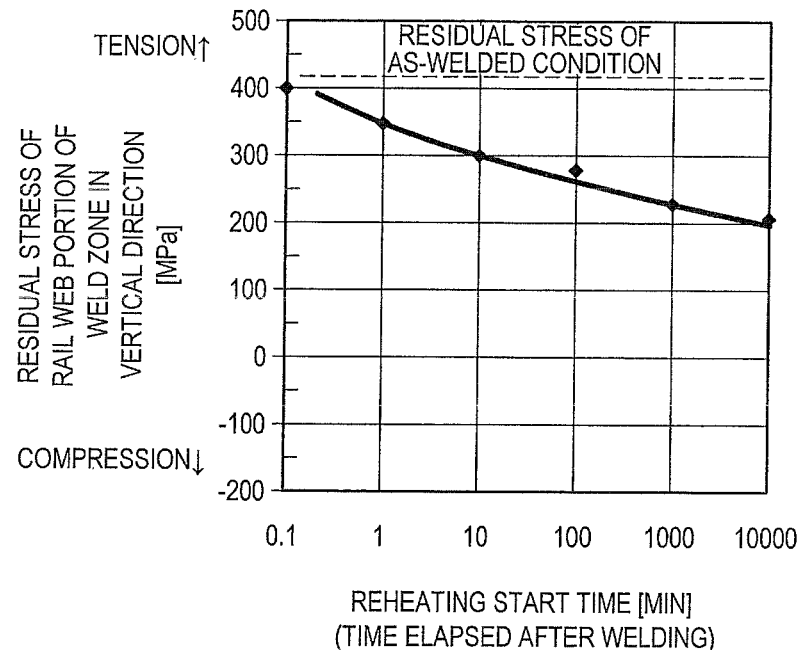

FIG. 20 is a schematic view showing a relationship between a time of starting reheating after welding and residual stress.

Figure 21:
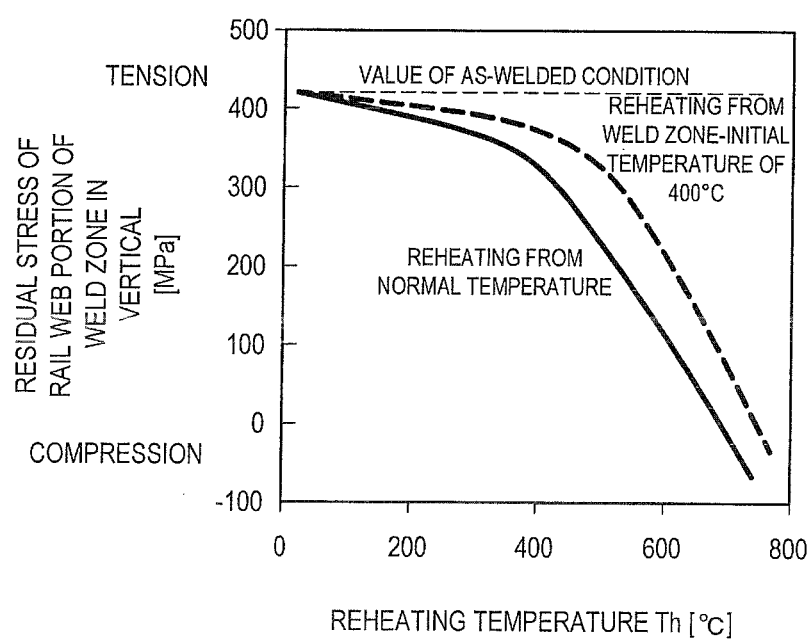

FIG. 21 is a schematic view showing an influence of a reheating temperature of a rail web portion on residual stress of a rail web portion of a weld zone in a vertical direction.

Figure 22:
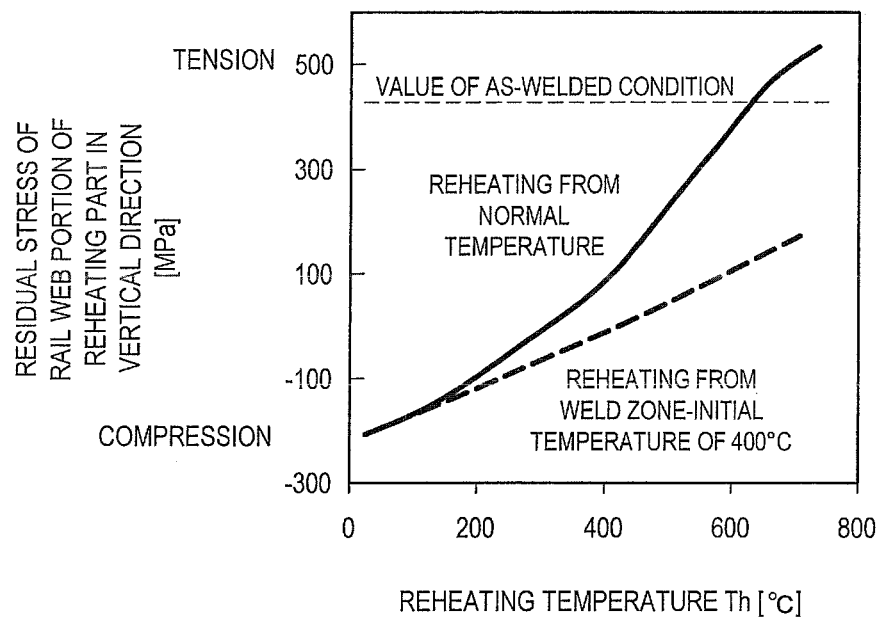

FIG. 22 is a schematic view showing an influence of a reheating temperature of a rail web portion on residual stress of a rail web portion of a reheating part in a vertical direction.

Figure 23:
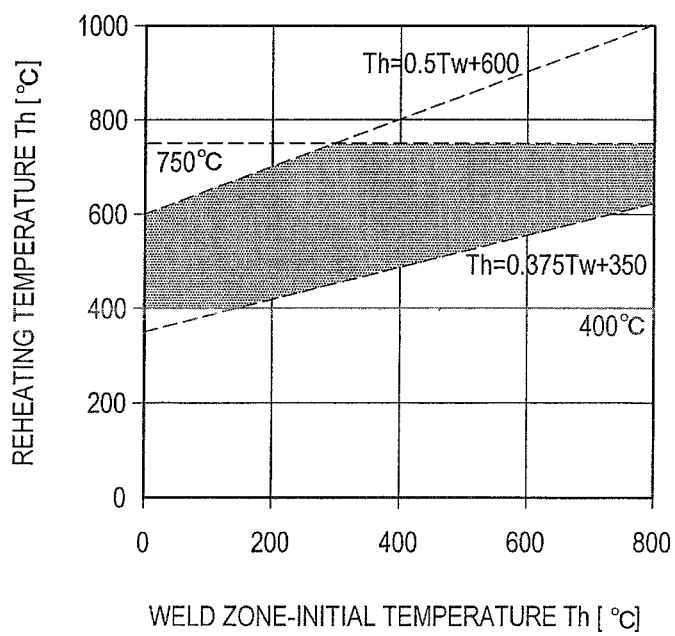

FIG. 23 is a schematic view showing a relationship between an initial temperature of a weld zone and an optimum reheating temperature of a rail web portion.

Figure 24A:
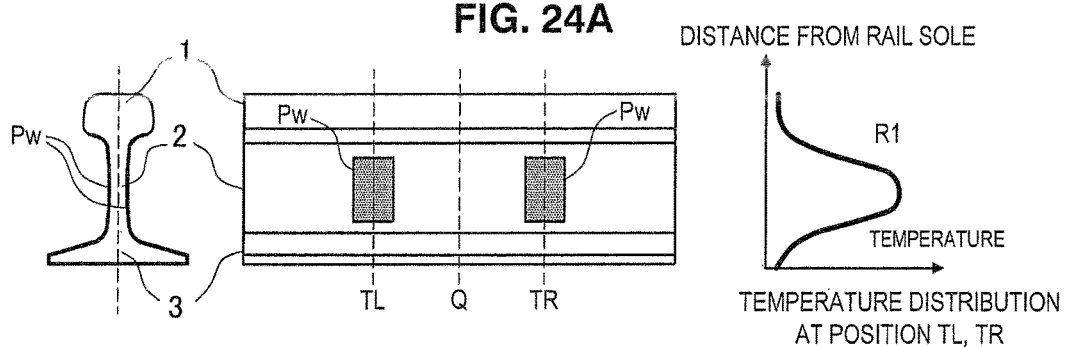

FIG. 24A is a schematic view showing temperature distributions at the reheating part TL, TR in a vertical direction in a case where only the rail web portion 2 is reheated.

Figure 24B:
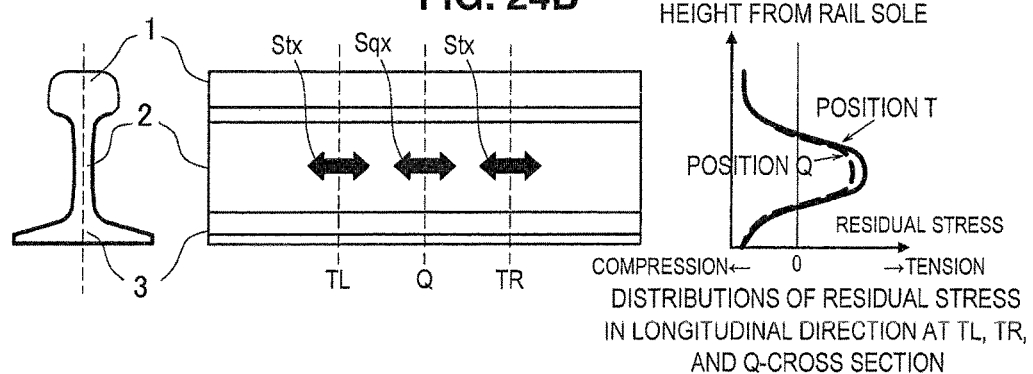

FIG. 24B is a schematic view showing a distribution of residual stress at a cross section of the welding center Q and the reheating part TL, TR in a longitudinal direction in a case where only the rail web portion 2 is reheated.

Figure 25A:
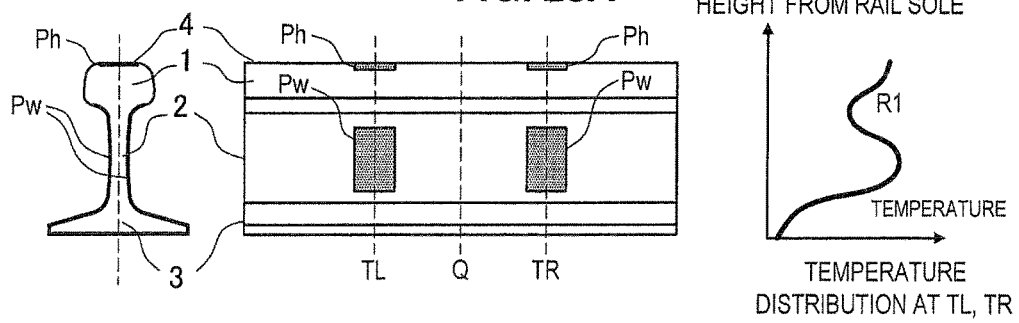

FIG. 25A is a schematic view showing a temperature distribution at the reheating part in a vertical direction in a case where a head portion is reheated in addition to the rail web portion 2.

Figure 25B:
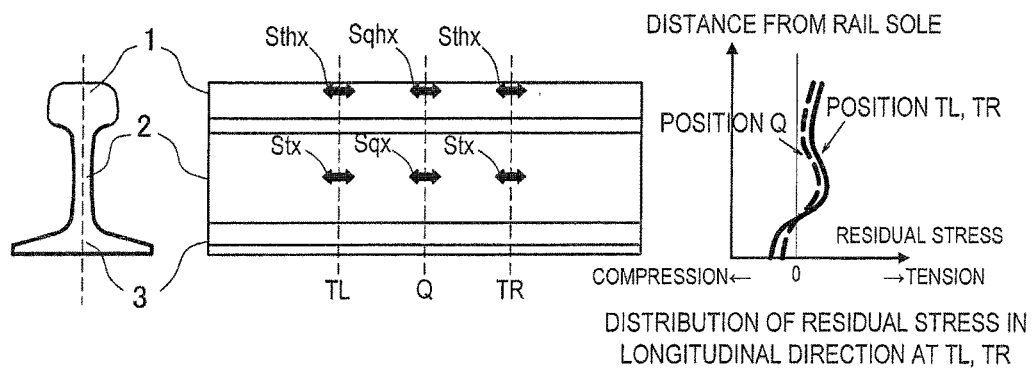

FIG. 25B is a schematic view showing distributions of residual stress in a longitudinal direction in a case where the head portion is reheated in addition to the rail web portion 2.

Figure 26:
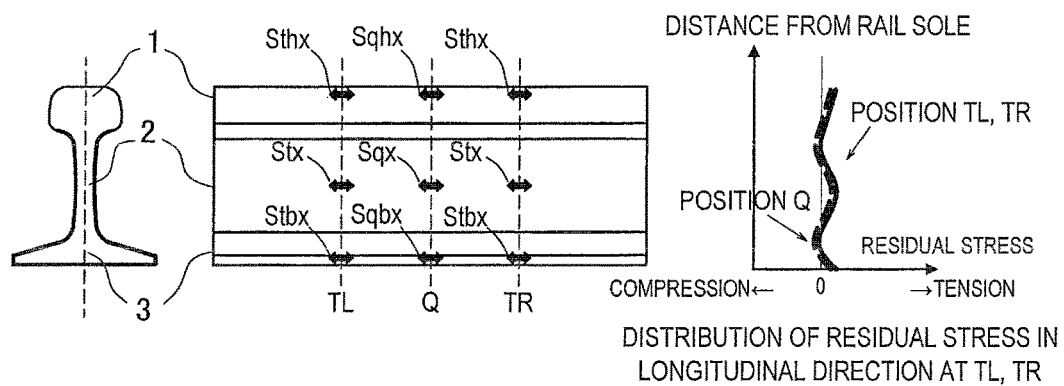

FIG. 26 is a schematic view showing distributions of residual stress at the reheating part TL, TR and the welding center Q in a longitudinal direction in a case where a head-top portion 4 and also a sole portion 6 are reheated in addition to the rail web portion 2.

Figure 27:
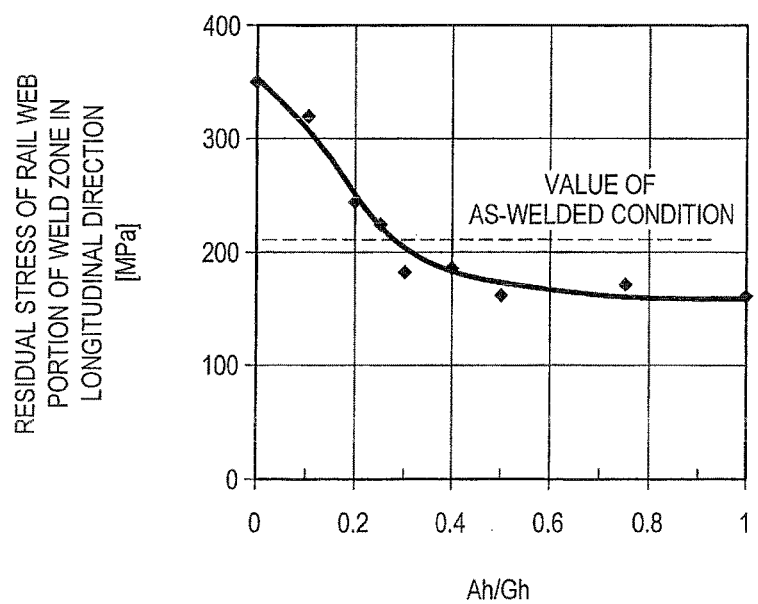

FIG. 27 is a schematic view showing a relationship between a width Ah of a reheating region Ph of a head portion 1 and residual stress of a rail web portion in a longitudinal direction.

Figure 28:
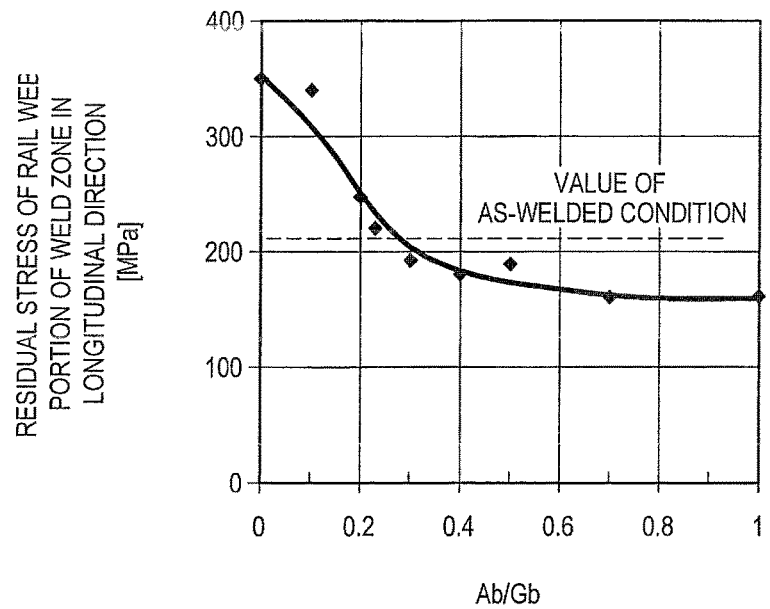

FIG. 28 is a schematic view showing a relationship between a width Ab of a reheating region Pb of a sole portion 6 and residual stress of the rail web portion in a longitudinal direction.

Figure 29:
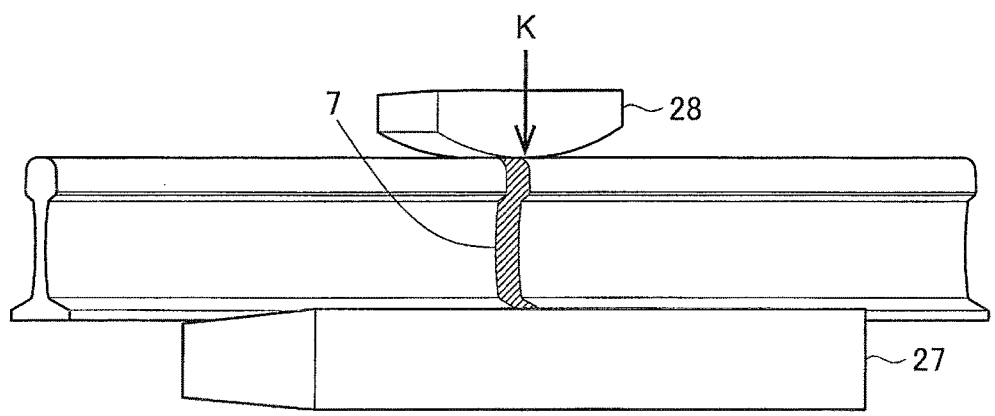

FIG. 29 shows a method for a fatigue test related to residual stress of the rail web portion 2 in a vertical direction.

Figure 30:
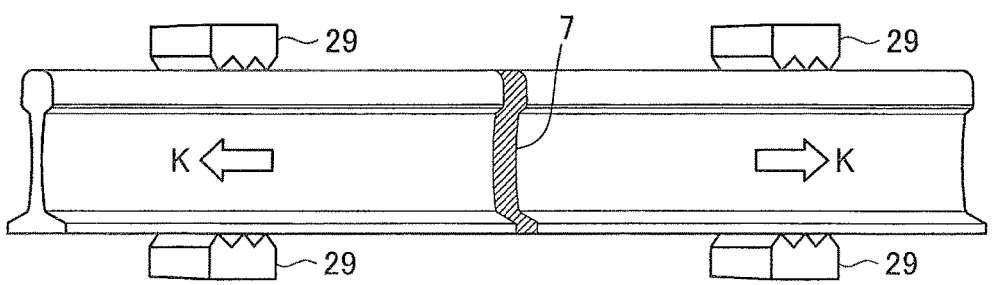

FIG. 30 shows a method for a fatigue test related to residual stress of the rail web portion 2 in a longitudinal direction.

Figure 31:
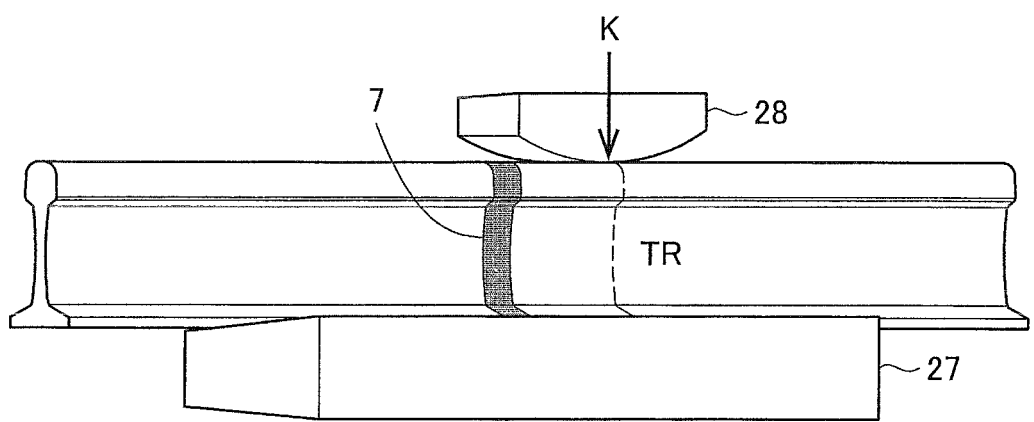

FIG. 31 shows a method for a fatigue test related to residual stress applied to a reheating part of the rail web portion 2 in a vertical direction.

MODE(S) FOR CARRYING OUT THE INVENTION

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<Description of Welding Method>

First, with reference to FIGS. 2A to 2C, a welding method will be described using flash butt welding as an example. A first process of the flash butt welding is a process of continuously generating an arc between the end faces shown in FIG. 2A, and is referred to as flashing process.

In the flashing process, the entire end faces of the welding material are melted. Further, portions of the material in the vicinity of the end faces are softened due to the rise of temperature. At the time point of reaching this state, pressurizing in the axial direction is performed as shown in FIG. 2B. The molten metal, which exists between the end faces, is pushed out by this pressurization that is referred to as upset, and a bead is formed around the weld surface.

The bead is hot sheared and removed by trimmers as shown in FIG. 2C when at a high temperature immediately after welding. This process is referred to as trimming.

<Material of Rail>

As defined in JIS E1101 and JIS E1120, eutectoid or hypoeutectoid carbon steel containing 0.5 to 0.8 mass % of carbon is generally used as rail steel. Further, rail steel, which has hypereutectoid composition, contains carbon exceeding 0.8 mass %, and further improves wear resistance of a heavy load freight line of a foreign mining railway, is also being spread in recent years.

Further, in the case where a rail is used in a railway, a size of the cross section of the rail is selected depending on weight of freight cars on the route. That is, in a section in which heavy freight cars pass, a rail having high rigidity and a large size of the cross section is adopted.

<Residual Stress Generation Mechanism after Welding>

Next, there is described an idea of the inventors on a mechanism for generating excessively large residual stress of a rail web portion in a vertical direction [o2] in the rail welding.

FIG. 8B shows temperature distributions R1 and R2 and directions in which a shrinkage strain is generated during cooling. At a welding center Q, decrease in temperature with the elapse of time is large, and a shrinkage strain Eq is large. On the other hand, the temperature of a peripheral part of the weld zone, such as ML or MR, is low to start with, and hence, the amount of temperature drop is also small and a shrinkage strain Em is small. The difference in the shrinkage strains occurs because: regarding the welding center Q as a reference, the welding center Q is in a state that the shrinkage is restricted from the periphery so that the tensile stress is generated; and regarding the peripheral part ML, MR as a reference, which is away from the welding center Q, the peripheral part ML, MR is in a state that compressive stress is applied by the shrinkage strain Eq of the weld zone. As a result thereof, as shown in FIG. 8C, the strong tensile stress in the vertical direction is generated at the welding center Q, and the compressive stress is generated in the periphery. In the figure, a positive value represents a tension state and a negative value represents a compression state. A point VL, VR at which the states change between the tension and the compression is influenced by a length of the weld zone heated at high temperature in the longitudinal direction of the rail. The length of the weld zone heated at high temperature can be represented by a length of the HAZ of the weld zone. That is, with increase in the length of the HAZ, the length of a region of the weld zone heated at high temperature increases.

According to the description above, with decrease in a HAZ length Lh, the temperature distribution in the longitudinal direction of the rail becomes sharper and the residual stress at the welding center Q in the vertical direction increases. For this reason, compressive residual stress increases at the peripheral part ML, MR which is away from the welding center Q.

In a pressure welding method such as flash butt welding or gas pressure welding, the HAZ length Lh is defined by a distance between the HAZ boundary lines X shown in FIG. 1C. Also in the same manner, in melt welding such as thermite welding, the HAZ length Lh is defined by a distance between the HAZ boundary lines X shown in FIG. 1D, but the melt welding is different from the pressure welding method in that a weld metal phase is present inside the length HAZ. Using the HAZ length Lh, the position of VL, VR corresponds to a position that is approximately Lh away from the welding center Q.

In the flash butt welding, flashing is caused to take place between the end faces of the rails placed face to face, and makes the temperature of the end faces to reach higher than a melting point of 1300 to 1400° C. On the other hand, an electrode 9 (refer to FIGS. 2A to 2C) for supplying power is water-cooled in order to suppress wearing out caused by erosion and the like. Accordingly, the rail material is cooled by the water-cooled electrode 9, and the temperature of the rail material is around 300° C. in the vicinity of the electrode 9 even at the end of welding. An installation position of the electrode 9 on the rail is normally about 100 mm from the welding end face. At the completion of welding, within a distance of about 100 mm between the electrode 9 and the end face, there is a difference in temperature of around 1000° C. FIG. 8A is a schematic view showing a temperature distribution at a rail web portion of a weld zone, where a curve Rwo represents a temperature distribution immediately after welding, and the rail material has the sharpest temperature gradient among the rail welding methods.

On the other hand, the thermite welding method is a welding method involving injecting high-temperature molten steel to thereby melt the rail end faces, and rapidly has the second steepest temperature distribution next to the flash butt welding method in the rail longitudinal direction.

In the gas pressure welding, the vicinity of the end faces is heated to around 1000° C. due to the heating in the vicinity of the rail end faces that are to be pressure-welded, and the gas pressure welding has the next sharpest temperature distribution after the thermite welding method in the rail longitudinal direction.

The generation of the residual stress of the rail web portion in the vertical direction is most notable in the flash butt welding in which the temperature gradient is the sharpest, and the residual stress is reduced as the temperature distribution is lessened in order of the thermite welding and the gas pressure welding. An aspect of the present invention is effective for any of those welding methods.

In the enclosed arc welding, the weld metal is heaped up by manual welding sequentially from a rail bottom portion by spending working time of one hour or more. At the start of welding, the temperature of the rail foot portion 3 is high, and with a progress of the welding, the weld zone goes up to the rail web portion 2, and then the head portion 1. Accordingly, along with the progress of the welding, complex thermal strain and stress are generated around the weld zone 7. It is considered that a method of reducing residual stress according to an aspect of the present invention may be also effective for the enclosed arc welding.

<Reheating Position of Weld Zone>

An aspect of the present invention provides a method of effectively reducing residual stress by reheating a welded joint. First, a reheating position of a weld zone is described.

The method of reheating a rail weld zone is disclosed in Patent Document 3 and is known technology. In the case of reheating a base material of the rail, the reheating carried out in a range larger than the part in which tensile residual stress is generated from the beginning may reduce the residual stress, but the reduction is not sufficient. The reason for the insufficient reduction is that, when the weld zone is reheated, the temperature distribution similar to that at the time of welding shown in FIG. 8B is generated again, and strain and stress after the reheating are generated.

An aspect of the present invention is characterized in that, from the viewpoint of reducing the residual stress, a reheating range is not the weld zone itself, and is the base material of the rail around the weld zone.

In describing an aspect of the present invention below, first, a reheating region according to an aspect of the present invention is shown. In FIG. 9, Pw represents a reheating region of the rail web portion 2, Aw represents a height of the reheating region, Bw represents a width of the reheating region, and Cw represents a distance between the reheating region and the welding center Q.

FIG. 10 shows a case of reheating the head-top portion 4 or the sole portion 6 along with the rail web portion 2. Ph represents a reheating region of the head-top portion 4, Ah and Ab represent widths (lengths in a width direction perpendicular to a longitudinal direction) of the reheating regions of the head-top portion 4 and the sole portion 6, respectively, Bh and Bb represent lengths (lengths in the longitudinal direction) of the reheating regions of the head-top portion 4 and the sole portion 6, respectively, and Ch and Cb represent a distance between the reheating region of the head-top portion 4 and the welding center Q and a distance between the reheating region of the sole portion 6 and the welding center Q, respectively.

Note that the reheating region Ph of the head-top portion 4 or the reheating region Pb of the sole portion 6 may be provided in a continuous manner with the reheating region Pw of the rail web portion 2.

<Description of Mechanism of Reducing Residual Stress Generated by Reheating According to One Aspect of the Present Invention>

Next, a temperature change in the rail web portion 2 caused by reheating the rail web portion 2 at a periphery of the weld zone is described. In FIG. 11, R1 schematically shows a temperature distribution immediately after the reheating along a height center line D-D of the rail web portion 2, and R2 schematically shows a temperature distribution along the line D-D after any time period has elapsed since the reheating.

FIG. 12A describes a situation of generation of a strain around the welding zone at that time.

As shown in FIG. 8C, tensile residual stress is present in the welding center Q, and compressive residual stress is present near a reheating part. When starting the reheating, the reheating part TL, TR generates expansion strain Et due to the rise of temperature. This strain generates tensile stress Sq in the welding center Q in the vertical direction. When the temperature further rises, a yield point is lowered due to the temperature rise, and this causes the increase of the stress to slow down and gradually causes the increase to be changed into decrease.

Next, FIG. 12B shows a situation of strain in a natural cooling process after the reheating is completed. In the cooling process, a shrinkage strain Et in the vertical direction is generated with the temperature decrease in the reheating part. The shrinkage strain Et generates compressive stress Sq near the welding center Q, and thus, the tensile residual stress in the weld zone decreases.

Changes in the stress accompanied by the reheating are shown in FIG. 13.

<Relationship Between: Distance Cw Between Reheating Region Pw and Welding Center; and Residual Stress>

FIG. 14 shows a relationship between: a distance Cw between the reheating region Pw of the rail web portion 2 and the welding center Q; and the residual stress.

Data in the figure is an example obtained by reheating a heat-treated rail web portion having a weight per unit length of 70 kg/m. The rail contains, in mass %, C: 0.79%, Si: 0.25%, Mn: 0.90%, Cr: 0.22%, and the balance: Fe and inevitable impurities. The hardness of the rail head-top portion is Hv 390. The cross section of the rail has a rail height of 188.9 mm, a foot width Gb of 152.4 mm, a rail web portion thickness of 17.5 mm, a head width Gh of 77.8 mm, and a rail web portion height Hw of 104.0 mm. In the welding, the flashing time is 180 seconds, the amount of shrinkage caused by upset pressurization is 16 mm, and the HAZ length is 38 mm. The reheating region is, as shown in FIG. 9, a base material part of the rail at a position away from the weld zone. The length Bw of the reheating region is 50 mm, the height Aw of the reheating region is 100 mm, and the reheating temperature at the center of the reheating region is 500° C. Under the above conditions, the distance Cw between the reheating region and the welding center of the rail web portion is changed.

To generalize the results by eliminating the influence of the length of the weld zone depending on the welding conditions, the horizontal axis shows a value Cw/Lh which is obtained by dividing the distance Cw between the reheating region Pw and the welding center Q by the HAZ length Lh. In the case where the value of Cw/Lh is smaller than 0.2, the temperature of the welding center Q increases, and an effect of applying a compressive force Sq to the weld zone using the shrinkage Et of the reheating part shown in FIG. 12B is small, and hence, a residual stress-reducing effect is small and the residual stress does not decrease to 350 MPa or less, which is effective for improving the fatigue strength. Further, in the case where the value of Cw/Lh exceeds three, it becomes difficult to apply the compressive force generated by the shrinkage strain Et of the reheating region Pw to the weld zone, and hence, the residual stress-reducing effect is decreased and the residual stress is 350 MPa or more, so that it is difficult to obtain a fatigue strength-enhancing effect. Since the residual stress-reducing effect is the greatest when the value of Cw/Lh is between 0.5 to 2, it is desirable that the value of Cw/Lh be set to this range, and at least to the range of 0.2 to 3.

<Relationship Between Length Bw of Reheating Region Pw and Residual Stress>

FIG. 15 shows a relationship between a length Bw of the reheating region Pw and residual stress.

Data in the figure is an example obtained by reheating a rail web portion of a normal rail having a weight per unit length of 50 kg/m. The rail contains, in mass %, C: 0.70%, Si: 0.23%, Mn: 0.92%, and the balance: Fe and inevitable impurities. The hardness of the rail head-top portion is Hv 270. The cross section of the rail has a rail height of 153.0 mm, a foot width Gb of 127.0 mm, a rail web portion thickness of 15.0 mm, a head width Gh of 65.0 mm, and a rail web portion height Hw of 74.0 mm. In the welding, the flashing time is 150 seconds, the amount of shrinkage caused by upset pressurization is 16 mm, and the HAZ length is 35 mm. The reheating region is, as shown in FIG. 9, a base material part of the rail at a position away from the weld zone. The distance Cw between the reheating region and the welding center of the rail web portion is 95 mm, the height Aw of the reheating region is 70 mm, and the reheating temperature at the center of the reheating region is 500° C. Under the above conditions, the length Bw of the reheating region is changed.

To generalize the results by eliminating the influence of the length of the weld zone depending on the welding method, the horizontal axis shows a value Bw/Lh which is obtained by dividing the length Bw of the reheating region by the HAZ length Lh. In the case where the value of Bw/Lh is smaller than 0.5, the reheating part shown in FIG. 12B is small, and hence, the compressive force generated by the shrinkage of the reheating part applied to the weld zone is small. Accordingly, the residual stress does not decrease to 350 MPa which is effective for improving the fatigue strength. With increase in Bw/Lh, the residual stress is decreased, but the change in the residual stress becomes small when the value of Bw/Lh is 1.5 or more. There is no limit to the value of Bw/Lh, but it is not preferred that the reheating be performed at the value Bw/Lh of more than three, since a large amount of energy is required. Therefore, it is desirable that the value of Bw/Lh be set to 1.5 to 3, and at least to the range of 0.5 to 5, from the viewpoints of reducing the residual stress and saving energy.

<Relationship Between Height Aw of Reheating Region Pw and Residual Stress>

FIG. 16 shows a relationship between a height Aw of the reheating region Pw of the rail web portion and residual stress.

Data in the figure is an example obtained by reheating a heat-treated rail web portion having a weight per unit length of 70 kg/m. The rail contains, in mass %, C: 0.91%, Si: 0.47%, Mn: 0.75%, Cr: 0.31%, and the balance: Fe and inevitable impurities. The hardness of the rail head-top portion is Hv 420. The cross section of the rail has a rail height of 188.9 mm, a foot width Gb of 152.4 mm, a rail web portion thickness of 17.5 mm, a head width Gh of 77.8 mm, and a rail web portion height Hw of 104.0 mm. In the welding, the flashing time is 120 seconds, the amount of shrinkage caused by upset pressurization is 16 mm, and the HAZ length is 33 mm. The reheating region is, as shown in FIG. 9, a base material part of the rail at a position away from the weld zone. The distance Cw between the reheating region and the welding center of the rail web portion is 80 mm, the length Bw of the reheating region is 50 mm, and the reheating temperature at the center of the reheating region is 500° C. Under the above conditions, the height Aw of the reheating region is changed.

To generalize the results by eliminating the influence of the size of the cross section of the welding rail, the horizontal axis shows a value Aw/Hw which is obtained by dividing the height Aw of the reheating region by the rail web portion height Hw. In the case where the value of Aw/Hw is smaller than 0.2, the area to be reheated is small, and hence, a compressive force generated by the shrinkage of the reheating part shown in FIG. 12B applied to the weld zone is small and the residual stress-reducing effect is small, so that the residual stress does not reach 350 MPa which is effective for improving the fatigue strength. With increase in Aw/Hw, the residual stress is decreased, and therefore, it is most desirable that the entire area of the height Hw of the rail web portion 2 be reheated. Further, the reheating region of the rail web portion 2 may be a T-shape area covering from the rail web portion 2 to head portion 1, and from the rail web portion 2 to the foot portion 3. In addition, the reheating region of the rail web portion 2 may also be an area including the reheating region Ph of the head portion 1 and the reheating region Pb of the foot portion 3 which are provided unseparately and continuously.

<Reheating Temperature>

FIG. 17 shows a relationship between a reheating temperature Th and residual stress of the rail web portion 2 of the weld zone.

Data in the figure is an example obtained by reheating a heat-treated rail web portion having a weight per unit length of 70 kg/m. The rail contains, in mass %, C: 0.91%, Si: 0.47%, Mn: 0.75%, Cr: 0.31%, and the balance: Fe and inevitable impurities. The hardness of the rail head-top portion is Hv 420. The cross section of the rail has a rail height of 188.9 mm, a foot width Gb of 152.4 mm, a rail web portion thickness of 17.5 mm, a head width Gh of 77.8 mm, and a rail web portion height Hw of 104.0 mm. In the welding, the flashing time is 240 seconds, the amount of shrinkage caused by upset pressurization is 16 mm, and the HAZ length is 42 mm. The reheating region is, as shown in FIG. 9, a base material part of the rail at a position away from the weld zone. The distance Cw between the reheating region and the welding center of the rail web portion is 80 mm, the length Bw of the reheating region is 50 mm, and the height Aw of the reheating region is 100 mm. Under the above conditions, the reheating temperature Th at the center of the reheating region is changed by increasing and decreasing reheating time.

When the reheating temperature is lower than 400° C., the effect of applying a compressive force to the weld zone using the shrinkage of the reheating part shown in FIG. 12B is small, and hence, the residual stress does not decrease. On the other hand, although the residual stress decreases with increase of the reheating temperature, when the temperature exceeds 700° C., spheroidizing of cementite in a pearlite composition starts, and the strength decreases. The spheroidizing of the pearlite progresses as the temperature is higher and the reheating time is longer. However, since an aspect of the present invention does not set a retention time, the degree of the spheroidizing in the reheating up to 750° C. is small, and it is desirable that the temperature be kept within this range.

<Reheating Treatment in Warm State after Welding>

Next, description is given of the case where the reheating region Pw of the rail web portion 2 is reheated at TL, TR, which is away from the welding center Q, in a warm state after the welding. FIG. 18 shows temperature distributions in this case in a longitudinal direction along a height center line D-D of the rail web portion 2. R0 represents a temperature distribution obtained by performing welding before reheating, and R1 represents a temperature distribution after reheating. The welding center Q is in a high-temperature state, and has a feature in that the temperature after the reheating at the welding center is higher than the temperature in the case of FIG. 11 showing the reheating from the normal temperature.

FIG. 19 shows the temperature distribution R2 and a strain generation state after a predetermined time has elapsed from the reheating. A shrinkage strain Eq caused by the decrease in temperature is generated near the welding center Q. Also in the reheating part TL, TR, a shrinkage strain Et is generated. In addition, at a position FL, FR placed at the outer side of the reheating part TL, TR, for example, the temperature changes caused by the reheating is small and a shrinkage strain Ef is small. The region in which the temperature change is small is a site for restricting the deformation of the reheating part TL, TR and the weld zone placed at the inner side.

That is, the shrinkage strain Eq of the welding center Q and the shrinkage strain Et of the reheating part are further restricted by FL and FR placed at the outer sides, and changes in the stress are generated in those parts. However, as the distance of the position of restriction from the welding center Q increases, the shrinkage is relatively easily generated near the welding center, and it is assumed that the smaller amount of residual stress is generated.

On the other hand, taking into consideration the relationship between the welding center Q and the reheating part TL, TR, the amount of temperature decrease at the reheating part is larger than the amount of temperature decrease at the weld zone, and the shrinkage strain caused by the decrease in temperature is larger at the reheating part (Et>Eq). With the difference in the shrinkage strains, the reheating part TL, TR applies the compressive stress to the weld zone.

The temperature difference between the reheating part and the weld zone is smaller in the case of carrying out reheating from the warm state than the temperature difference in the case of carrying out reheating from the normal temperature. Accordingly, the difference between the shrinkage strain Et of the reheating part TL, TR and the shrinkage strain Eq of the weld zone are smaller than the difference in the case of performing reheating from the normal temperature, and the effect of generating the compressive force Sq in the welding center Q is decreased.

However, as described in FIG. 19, the warm state reheating has a residual stress-reducing effect due to increase in the distance between the welding center Q and the restriction point, and the tensile residual stress in the weld zone is reduced in the same manner as the case of carrying out reheating from the normal temperature.

FIG. 20 shows an effect of a reheating-start time on the residual stress in the case of carrying out reheating from the warm state after the welding.

Data in the figure is an example obtained by reheating a heat-treated rail web portion having a weight per unit length of 70 kg/m. The rail contains, in mass %, C: 0.91%, Si: 0.47%, Mn: 0.75%, Cr: 0.31%, and the balance: Fe and inevitable impurities. The hardness of the rail head-top portion is Hv 420. The cross section of the rail has a rail height of 188.9 mm, a foot width Gb of 152.4 mm, a rail web portion thickness of 17.5 mm, a head width Gh of 7.8 mm, and a rail web portion height Hw of 104.0 mm. In the welding, the flashing time is 240 seconds, the amount of shrinkage caused by upset pressurization is 16 mm, and the HAZ length is 42 mm. The reheating region is, as shown in FIG. 9, a base material part of the rail at a position away from the weld zone. The distance Cw between the reheating region and the welding center of the rail web portion is 80 mm, the length Bw of the reheating region is 50 mm, the height Aw of the reheating region is 100 mm, and the reheating temperature Th at the center of the reheating region is 500° C. Under the above conditions, the reheating-start time is changed.

The horizontal axis represents timing of starting reheating in terms of time elapsed from the completion of the welding, and the vertical axis represents residual stress of the weld zone in the vertical direction. The change in the residual stress is relatively slow even when the reheating-start time increases.

<Residual Stress in Reheating Part>

On the other hand, as shown in FIG. 13, by performing reheating, residual stress of the weld zone is reduced and residual stress of the heating part is increased.

Even in the reheating part, there is a risk that a fatigue crack may be generated when the residual stress is high. However, an incidence of fatigue crack is several percent of all welded parts, even in the case of regarding the weld zones each having tensile residual stress of 400 MPa or more and having many sources of fatigue cracks, such as a weld defect including cross-sectional shape deformation and a micro-shrinkage cavity, and a hardness-reduced part affected by heat. The base material part, which is a part to be reheated in the present invention, has little fatigue generation source such as the weld zone. Accordingly, in the base material part, the risk of fatigue crack generation is considered to be sufficiently low up to 400 MPa which is the residual stress of the weld zone in the as-welded condition.

Here, the residual stress-change situations of the weld zone and the reheating part differ depending on initial temperature of the weld zone at the time of reheating. The inventors of the present application have studied the influence of reheating temperatures under two reheating conditions: a warm state immediately after the welding, having temperature at the weld zone of about 400° C.; and a normal temperature state in which sufficient amount of time has elapsed after the welding and the temperature of the weld zone has dropped to a normal temperature state.

FIG. 21 shows, in reheatings with the two different initiation conditions, an influence of a reheating temperature of a rail web portion on residual stress of a rail web portion of a weld zone in a vertical direction. In the case where the initial temperature of the weld zone is high, the residual stress-reducing effect in the weld zone is rather small.

Accordingly, it is desirable that the reheating temperature Th be set in accordance with an initial temperature Tw of the weld zone at the time of reheating. According to the studies achieved by the inventors of the present application, a desirable relationship between an initial temperature Tw (° C.) and a reheating temperature Th (° C.) is as shown in the following Expression 1. As described above, when the reheating temperature is lower than 400° C., the residual stress-reducing effect in the weld zone is small, and therefore, it is desirable that the temperature be high to some extent, and, in the case where the initial temperature of the weld zone at the time of reheating is high, it is desirable that the temperature be still higher.

$$Th \geq 0.375Tw+350 \qquad \text{(Expression 1)}$$

Next, FIG. 22 shows, in reheatings with the two different initiation conditions, an influence of a reheating temperature of a rail web portion on residual stress of a rail web portion of a reheating part in a vertical direction. In the case where the reheating is carried out from a state in which the weld zone has a low initial temperature, that is, the normal temperature, the increasing tendency of the residual stress of the reheating part becomes greater. According to the experiments conducted by the inventors of the present application, in order to make the residual stress of the reheating part to be 400 MPa or less, it is desirable that the reheating temperature Th(° C.) be set within the range shown in the following Expression 2 in accordance with the initial temperature Tw(° C.) of the weld zone at the time of reheating.

$$Th \leq 0.5Tw+600 \qquad \text{(Expression 2)}$$

From the above Expression 1 and Expression 2, the reheating temperature Th(° C.) of the rail web portion is set to the range of the following Expression 3 in accordance with the initial temperature Tw(° C.) of the weld zone, and thus, there can be obtained the weld zone excellent in the residual stress distribution in which the residual stress of the weld zone is reduced sufficiently and the residual stress of the reheating part is set to 400 MPa or less.

$$0.375Tw+350 \leq Th \leq 0.5Tw+600 \qquad \text{(Expression 3)}$$

FIG. 23 is a diagram showing a range (shaded area) of an appropriate reheating temperature in which the horizontal axis represents the initial temperature of the weld zone at the time of reheating and the vertical axis represents the reheating temperature of the reheating part of the rail web portion. The reheating temperature is set to the range shown in the above Expression 3 and to 400° C. or higher and 750° C. or lower, in accordance with the initial temperature of the weld zone at the time of reheating, and thus, there can be obtained the weld zone excellent in the fatigue strength in which the residual stress of the weld zone is 350 Pa or less and the residual stress of the reheating part is 400 MPa or less.

<Residual Stress of Rail Web Portion in Longitudinal Direction>

Next, there is described residual stress of the rail web portion 2 in the longitudinal direction in the case where the rail web portion 2 is reheated. FIG. 24A shows a surface temperature distribution R1 in the vertical direction at a reheating part TL, TR at the completion of reheating, in the case where only the rail web portion 2 is reheated. With the reheating of the rail web portion 2, the temperature of the rail web portion 2 is higher than the temperatures of the head portion 1 and the foot portion 3.

In the rail web portion 2, a shrinkage strain is generated in the longitudinal direction, but the shrinkage strain in each of the head portion 1 and the foot portion 3 is small. Owing to the difference in the shrinkage strains, the shrinkage of the rail web portion 2 in the longitudinal direction is restricted by the head portion 1 and the foot portion 3.

As a result thereof, as shown in FIG. 24B, tensile stress Stx is generated in the reheating part, and the tensile stress Stx influences the welding center Q and generates residual stress Sqx having approximately the same tension also at the welding center.

In winter, tensile stress increases seasonally caused by a temperature shrinkage, and excessively large residual stress in the longitudinal direction may cause a rail fracture. From the viewpoint of preventing the rail fracture in winter, it is desirable that the residual stress in the longitudinal direction be low.

<Method of Reducing Residual Stress of Rail Web Portion in Longitudinal Direction>

Hereinafter, there is described a method of reducing tensile residual stress in the longitudinal direction, the tensile residual stress being increased in the case where the rail web portion 2 is reheated.

This method is a method of reheating the head-top portion 4 and/or the sole portion 6 simultaneously with the rail web portion 2.

FIG. 25A shows a surface temperature distribution R1 at a cross section of a reheating part TL, TR at the completion of reheating, in the case where the reheating region Ph of the head-top portion 4 is reheated simultaneously with the rail web portion 2. In addition to the rail web portion 2, temperature of the head portion 1 also increases. In the cooling process, the shrinkage in the longitudinal direction of the rail is generated also in the head portion 1 in the same manner as the rail web portion 2. On the other hand, since the temperature change of the foot portion 3 is small, the strain thereof is small.

Owing to the difference in thermal strains of the head portion 1, the rail web portion 2, and the foot portion 3, the shrinkage of the head portion 1 and the shrinkage of the rail web portion 2 are restricted by the foot portion 3, and hence, as shown in FIG. 25B, the tensile residual stress is generated in the head portion 1 and the rail web portion 2. However, compared to the case where only the rail web portion 2 is reheated as shown in FIG. 24A and FIG. 24B, since only the foot portion 3 is serving as a restriction part, the state of the rail comes close to the state in which the total rail cross section uniformly shrinks in the longitudinal direction. The force of restricting the shrinkage strain of the rail web portion 2 in the longitudinal direction decreases, and the tensile stress Stx is reduced.

Note that, although not shown, in the case where the sole portion 6 is reheated simultaneously with the rail web portion 2, the tensile residual stress is generated in the rail web portion 2 and the sole portion 6, but compared with the case where only the rail web portion 2 is reheated, it is only the head portion 1 that restricts the deformation, and the tensile stress Stx of the rail web portion 2 in the longitudinal direction is reduced.

When three portions, that is, the rail web portion 2, the head-top portion 4, and the sole portion 6, are simultaneously reheated, the reheating temperature becomes uniform over the total rail cross section at the reheating part TL, TR. Accordingly, the shrinkage strain in the longitudinal direction also becomes uniform over the total cross section, and the residual stress Stx, Sqx of the rail web portion 2 in the longitudinal direction is further reduced. FIG. 26 shows residual stress Sqhx, Sqbx, Sthx, Stbx in the longitudinal direction within the cross section at a position TL, TR, Q in that case.

<Distance Ch Between Reheating Region pH of Head-Top Portion 4 and Welding Center, Distance Cb Between Reheating Region Pb of Sole Portion 6 and Welding Center>

It is desirable that a size of the reheating region Ph of the head-top portion 4 or the reheating region Pb of the sole portion 6 be the same as a size of the reheating region Pw in the rail web portion. That is because, when the reheating range of the head-top portion 4 or the sole portion 6 is smaller than the reheating range of the rail web portion 2, the effect of reducing the residual stress of the rail web portion 2 in the longitudinal direction is small. On the contrary, when the size of the reheating region of those portions becomes excessive, large tensile residual stress is generated in those portions. That is, it is desirable that the distance Ch between the reheating region Ph of the head-top portion 4 and the welding center and/or the distance Cb between the reheating region Pb of the sole portion 6 and the welding center be the same as the distance Cw between the reheating region Pw of the rail web portion 2 and the welding center, and it is desirable that the reheating length Bh, Bb be the same as Bw.

Therefore, it is desirable that a size limitation range be as follows, when shown in a value divided by the HAZ length Lh: Ch/Lh or Cb/Lh is 0.2 to 3; and a value Bh/Lh or a value Bb/Lh obtained by dividing the length Bh or Bb of the reheating region by the HAZ length Lh is 0.5 or more and 5 or less.

<Width Ah of Reheating Region pH of Head-Top Portion 4>

FIG. 27 shows, in the case of reheating the head portion in addition to the rail web portion in the warm state after welding, an influence on the residual stress of the weld zone rail web portion in the longitudinal direction when a width Ah of the reheating region of the head portion is changed.

Data in the figure is an example obtained by reheating a head portion in addition to a heat-treated rail web portion having a weight per unit length of 70 kg/m. The rail contains, in mass %, C: 0.91%, Si: 0.47%, Mn: 0.75%, Cr: 0.31%, and the balance: Fe and inevitable impurities. The hardness of the rail head-top portion is Hv 420. The cross section of the rail has a rail height of 188.9 mm, a foot width Gb of 152.4 mm, a rail web portion thickness of 17.5 mm, a head width Gh of 77.8 mm, and a rail web portion height Hw of 104.0 mm. In the welding, the flashing time is 240 seconds, the amount of shrinkage caused by upset pressurization is 16 mm, and the HAZ length is 42 mm. The reheating region is, as shown in FIG. 25A, a base material part of the rail at a position away from the weld zone. The distance Cw between the reheating region of the rail web portion and the welding center and the distance Ch between the reheating region of the head portion and the welding center are each 80 mm, the length Bw of the reheating region and the length Bh of the reheating region are each 50 mm, the height Aw of the reheating region of the rail web portion is 100 mm, and the reheating temperature Th at the center of the reheating region is 500° C. Under the above conditions, the width Ah of the reheating region of the head portion is changed.

To generalize the results by eliminating the influence of the rail head portion width Gh depending on a rail size, the horizontal axis shows a value Ah/Gh obtained by dividing the width Ah of the reheating region by the rail head portion width Gh. With increase in the width Ah of the reheating region of the head portion, the thermal strain of the head portion shown in FIG. 25B becomes closer to the thermal strain of the rail web portion, and hence, the residual stress of the rail web portion in the longitudinal direction reduces. An as-welded joint which is not subjected to post-heating has residual stress of about 220 MPa, and it is desirable that residual stress of a post-heat treated material be suppressed to less than 220 MPa. In order to realize the residual stress of less than 220 MPa, it is necessary that the value of Ah/Gh be more than 0.3.

<Width Ab of Reheating Region Pb of Sole Portion 6>

FIG. 28 shows, in the case of reheating the sole portion 6 in addition to the rail web portion in the warm state after welding, an influence on the residual stress of the weld zone rail web portion in the longitudinal direction when a width Ab of the reheating region of the sole portion 6 is changed.

Data in the figure is an example obtained by reheating the sole portion 6 in addition to a heat-treated rail web portion having a weight per unit length of 70 kg/m. The rail contains, in mass %, C: 0.91%, Si: 0.47%, Mn: 0.75%, Cr: 0.31%, and the balance: Fe and inevitable impurities. The hardness of the rail head-top portion is Hv 420. The cross section of the rail has a rail height of 188.9 mm, a foot width Gb of 152.4 mm, a rail web portion thickness of 17.5 mm, a head width Gh of 77.8 mm, and a rail web portion height Hw of 104.0 mm. In the welding, the flashing time is 240 seconds, the amount of shrinkage caused by upset pressurization is 16 mm, and the HAZ length is 42 mm. The reheating region is, as shown in FIG. 25A and FIG. 25B, a base material part of the rail at a position away from the weld zone. The distance Cw between the reheating region of the rail web portion and the welding center and the distance Cb between the reheating region of the sole portion 6 and the welding center are each 80 mm, the length Bw of the reheating region and the length Bb of the reheating region are each 50 mm, the height Aw of the reheating region of the rail web portion is 100 mm, and the reheating temperatures Th at the centers of the reheating regions of the rail web portion and the head portion are each 500° C. Under the above conditions, the width Ab of the reheating region of the sole portion 6 is changed.

To generalize the results by eliminating the influence of a width of the sole portion depending on a rail size, the horizontal axis shows a value Ab/Gb obtained by dividing the width Ab of the reheating region by the rail foot width Gb. With increase in the width Ab of the reheating region of the sole portion 6, the thermal strain of the sole portion 6 shown in FIG. 26 becomes closer to the thermal strain of the rail web portion, and hence, the residual stress of the rail web portion in the longitudinal direction reduces. An as-welded joint which is not subjected to post-heating has residual stress of about 220 MPa, and, it is desirable that residual stress of a post-heat treated material be suppressed to less than 220 MPa. In order to realize the residual stress of less than 220 MPa, it is necessary that the value of Ab/Gb be more than 0.3.

<Reheating Temperature of Reheating Region pH of Head-Top Portion 4, Reheating Temperature of Reheating Region Pb of Sole Portion 6>

It is desirable that a reheating temperature of the center of the reheating region Ph of the head-top portion 4 and/or a reheating temperature of the center of the reheating region Pb of the sole portion 6 be the same as the reheating temperature Th of the rail web portion.

That is because, when the reheating temperature of the head-top portion 4 or the sole portion 6 is lower than the reheating temperature of the rail web portion 2, the effect of reducing the residual stress of the rail web portion 2 in the longitudinal direction is small. On the contrary, when the reheating temperature of those portions becomes excessive, large tensile residual stress is generated in those portions. That is, it is desirable that the reheating temperature of the reheating region Ph of the head-top portion 4 or the reheating region Pb of the sole portion 6 be the same as the reheating temperature of the rail web portion 2. Therefore, it is desirable that the reheating temperature of the center of the reheating region Ph of the head-top portion 4 or the reheating region Pb of the sole portion 6 be 400° C. or higher and 750° C. or lower.

<Reheating Method>

Forms of a reheating device and a reheating mechanism for reheating a weld zone are not particularly limited as long as they can appropriately reheat a target portion of the rail.

<Rail Steel to be Used>

Rail steel to which the present invention is applied is rail steel for a railway whose metal structure is pearlite. As shown in FIGS. 8A to 8C, the generation of the residual stress is caused by the thermal strain generated by the cooling process after welding and the restriction. There is described a relationship with transformation strain of the steel in this case. At the time of transformation, complicated strain processes occur, for example, new strain caused by cubical expansion is generated and thermal stress generated in an austenite temperature region is reduced due to rearrangement of the lattice. The transformation takes place at 600 to 700° C. when the pearlite steel is cooled from an austenite temperature region. In this temperature region, a yield point of a material is low and the thermal stress is less likely to be generated. On the other hand, with increase in an alloy content, some rail materials are present having a transformation temperature region in a bainite region of 300 to 500° C. or in a martensite region of 300° C. or lower. Since those rail materials have low transformation temperature region, the transformation strain remarkably generates stress and influences the residual stress. Note that the rail steel using martensite transformation is subjected to tempering after cooling.

In the present invention, any rail steel having a pearlite structure is effective and is not influenced by the detailed chemical component composition, but a rail having a bainite structure or a tempered martensite structure are not effective.

Hereinafter, chemical components of the rail steel having the pearlite structure is supplementarily described.

C is an essential element for increasing the strength and generating a pearlite structure in rail steel for a railway having the pearlite structure, and the content thereof is 0.6% to 1.1%. With increase in C, the abrasion resistance is enhanced, and hence, rail steel with high C content is used for railways with sharp curves and heavy load railways. When the C content is 0.6% or less, pro-eutectoid ferrite is easily generated, and the strength of the material and the abrasion resistance are decreased. When the C content is 1.1% or more, pro-eutectoid cementite is easily generated, and hence, the material is apt to become brittle.

Si is an element for increasing the strength by solid solution hardening to the ferrite phase in the pearlite structure, and the content thereof is 0.1% to 1.0%. When the Si content is 0.1% or less, the effect is not obtained, and when the Si content is 1.0% or more, the material is apt to become brittle.

Mn is an element which lowers the pearlite transformation temperature, contributes to a higher strength by increasing hardenability, and the content thereof is 0.4% to 1.2%. When the Mn content is 0.4% or less, the effect is not obtained, and when the Mn content is 1.2% or more, the hardenability becomes excessive, and foreign structures such as the bainite structure and martensite structure are likely to be formed.

Further, in addition to the above components, the rail steel may contain the following components as necessary, for reinforcing the pearlite structure, improving the toughness of the ferrite phase in the pearlite, and for obtaining high toughness by making austenite grains finer at the time of heating a rolled material for the rail or making austenite grains finer at the time of rolling: 0.2% or less of V, 0.1% or less of Nb, 0.3% or less of Mo, 0.05% or less of Ti, 0.1% or less of Al, 0.02% or less of Ca, 0.5% or less of Ni, 0.5% or less of Cu, and 0.8% or less of Cr.

Further, the steel contains, as inevitable impurities, 0.03% or less of each of P, S, O, and N, 0.005% or less of H.

EXAMPLE(S)

Hereinafter, Examples and Comparative Examples according to an aspect of the present invention are shown.

<Rails Used in Examples and Comparative Examples>

Table 1 shows three types of rails that were used. A rail steel A belonged to a steel type commonly called "normal rail", was hypoeutectoid steel containing 0.65 to 0.75 mass % of carbon, and had a hardness in Vickers hardness at a rail head portion in as-rolled material of 260 to 290. Used as a rail steel B was a rail subjected to rolling and then to heat treatment, which was eutectoid steel containing 0.75 to 0.85 mass % of carbon, and had a hardness in Vickers hardness at 5 mm below the surface of the rail head portion of 360 to 400. Used as a rail steel C was a rail subjected to rolling and then to heat treatment, which was hypereutectoid steel containing 0.85 to 0.95% of carbon, and had a hardness in Vickers hardness at 5 mm below the surface of the rail head portion of 400 to 450.

Table 2 shows sizes of the rails that were used. "X" shown in the table is an example of a rail employed mainly for heavy load freight railways, which has a name of "141L". "Y" shown in the table is an example of a rail having a size of a cross section employed mainly for light load freight and passenger railways, which has a name of "50N".

<Welding Method>

Welding was performed using a flash butt welding method. The flashing time was 180 seconds, and the pressurization distance was 15 mm.

<Reheating Method>

Reheating was performed by rectifying 60 Hz AC power supply to be converted into a high frequency of 5 kHz, and sending an electric current to a heating coil. The heating coil was set at a short distance, 5 to 20 mm, from the surface of the rail, so that the reheating region could be determined as clearly as possible.

<Method of Measuring Residual Stress>

A strain gauge was bonded to a measurement position, this part was cut into a size having a thickness of 5 mm, a length of 15 mm, and a width of 15 mm, and residual stress was calculated based on the amount of change in the strain.

<Method for Fatigue Test>

(1) Method of Testing Fatigue Characteristics of Rail Web Portion with Respect to Horizontal Crack A test for evaluating a fatigue strength of a rail web portion with respect to a horizontal crack was performed using the method schematically shown in FIG. 29. A rail weld zone was placed on a surface plate 27, and a load was repeatedly applied by a pressing tool 28 from a rail head portion of the weld zone. The radius of curvature of the pressing tool 28 was set to 450 mm, which is close to the radius of curvature of a wheel. Taking into consideration that an actual load in the heavy freight railways was about 20 tons, the load to be applied was set to 30 tons for increasing the rate of experiment. The minimum load was set to 4 tons. The frequency of the repetition of a load was set to 2 Hz, and the test ended at the time point where cracks were generated at the weld zone. In the case where no fracture occurred until the number of the repetitions of a load reached 2000000, the test ended at that point.

TABLE 1

Steel types of rails used in Examples and Comparative Examples

|   | Chemical component [mass %] | | | | Hardness [Hv] | |
|---|---|---|---|---|---|---|
|   | C | Si | Mn | Cr | As-rolled | Heat treatment |
| A | 0.68 to 0.73 | 0.2 to 0.4 | 0.7 to 1.0 | <0.2 | 260 to 290 | |
| B | 0.78 to 0.83 | 0.2 to 0.4 | 0.7 to 1.0 | 0.2 to 0.6 | | 360 to 400 |
| C | 0.88 to 0.95 | 0.2 to 0.4 | 0.7 to 1.0 | 0.2 to 0.6 | | 400 to 450 |

TABLE 2

Sizes of rail steels used in Examples and Comparative Examples (unit: mm)

|   | Size name | Rail web portion height Hw | Head width Gh | Foot width Gb | Total height |
|---|---|---|---|---|---|
| X | 141L | 104 | 78 | 152 | 189 |
| Y | 50N | 74 | 65 | 127 | 153 |

(2) Method of Testing Fatigue Characteristics of Rail Web Portion with Respect to Stress in Axial Direction A test for evaluating a fatigue strength in an axial direction is schematically shown in FIG. 30. A rail was held in a testing machine at each of positions 0.5 m away from the weld zone, and a pulsating load K in the axial direction as repeatedly applied. The minimum stress was set to 30 MPa, and the maximum stress was set to 430 MPa. The frequency of the repetition of a load was set to 5 Hz, and the test ended at the time point where cracks were generated at the weld zone. In the case where no fracture occurred until the number of the repetitions of a load reached 2000000, the test ended at that point.

TABLE 3

| Example A | | | |
|---|---|---|---|
| 3 Lh ≥ C ≥ 0.2 Lh | 5 Lh ≥ B ≥ 0.5 Lh | Hw ≥ A ≥ 0.2 Hw | 750/400 |

| | 3 Lh ≥ C ≥ 0.2 Lh | 5 Lh ≥ B ≥ 0.5 Lh | Hw ≥ A ≥ 0.2 Hw |
|---|---|---|---|
| max→ | 90 | 150 | 104 |
| min→ | 6 | 15 | 20.8 |

| No. | Welded rail steel type | Welded rail size | Weld zone HAZ length [mm] Lh | Rail web portion height Hw | Experiment conditions Rail web portion Distance Cw | Length Bw | Height Aw |
|---|---|---|---|---|---|---|---|
| Example A1 | A | X | 30 | 104 | 50 | 200 | 15 |
| Example A2 | A | X | 30 | 104 | 50 | 60 | 15 |
| Example A3 | A | X | 30 | 104 | 50 | 200 | 104 |
| Example A4 | A | X | 30 | 104 | 10 | 60 | 104 |
| Example A5 | A | X | 30 | 104 | 85 | 60 | 104 |
| Example A6 | A | X | 30 | 104 | 50 | 20 | 104 |
| Example A7 | A | X | 30 | 104 | 50 | 140 | 104 |
| Example A8 | A | X | 30 | 104 | 50 | 60 | 25 |
| Example A9 | A | X | 30 | 104 | 50 | 60 | 60 |
| Example A10 | A | X | 30 | 104 | 50 | 60 | 104 |
| Example A11 | A | X | 30 | 104 | 50 | 60 | 104 |
| Example A12 | A | X | 30 | 104 | 50 | 60 | 104 |
| Example A13 | A | X | 30 | 104 | 50 | 60 | 104 |
| Example A14 | A | X | 30 | 104 | 50 | 60 | 104 |
| Example A15 | A | X | 30 | 104 | 50 | 60 | 104 |
| Example A16 | A | X | 30 | 104 | 50 | 60 | 104 |
| Example A17 | A | X | 30 | 104 | 50 | 60 | 104 |
| Example A18 | A | X | 30 | 104 | 50 | 60 | 104 |
| Example A19 | A | X | 30 | 104 | 50 | 60 | 104 |
| Example A20 | A | X | 30 | 104 | 50 | 60 | 104 |
| Example A21 | A | X | 30 | 104 | 50 | 60 | 104 |
| Comparative Example a1 | A | X | 30 | 104 | | | |
| Comparative Example a2 | A | X | 30 | 104 | 120 | 60 | 104 |
| Comparative Example a3 | A | X | 30 | 104 | 4 | 160 | 104 |
| Comparative Example a4 | A | X | 30 | 104 | 4 | 60 | 15 |
| Comparative Example a5 | A | X | 30 | 104 | 120 | 200 | 15 |
| Comparative Example a6 | A | X | 30 | 104 | 120 | 200 | 104 |
| Comparative Example a7 | A | X | 30 | 104 | 120 | 60 | 15 |
| Comparative Example a8 | A | X | 30 | 104 | 4 | 10 | 15 |
| Comparative Example a9 | A | X | 30 | 104 | 120 | 60 | 104 |

| No. | Experiment conditions Rail web portion Temperature | Heating start time after welding [min] | Heating start temperature [° C.] | Residual stress ✕1 [MPa] | Fatigue crack generation life ✕2 [×10³] | Remarks |
|---|---|---|---|---|---|---|
| Example A1 | 600 | 180 | 50 | 330 | >2,000 | |
| Example A2 | 600 | 180 | 50 | 311 | >2,000 | |
| Example A3 | 600 | 180 | 50 | 126 | >2,000 | |
| Example A4 | 600 | 180 | 50 | 342 | >2,000 | |
| Example A5 | 600 | 180 | 50 | 326 | >2,000 | |
| Example A6 | 600 | 180 | 50 | 331 | >2,000 | |
| Example A7 | 600 | 180 | 50 | 82 | >2,000 | |
| Example A8 | 600 | 180 | 50 | 289 | >2,000 | |
| Example A9 | 600 | 180 | 50 | 206 | >2,000 | |
| Example A10 | 420 | 180 | 50 | 346 | >2,000 | |
| Example A11 | 500 | 180 | 50 | 300 | >2,000 | |
| Example A12 | 600 | 180 | 50 | 87 | >2,000 | |
| Example A13 | 720 | 180 | 50 | 45 | >2,000 | |
| Example A14 | 600 | 5 | 400 | 233 | >2,000 | |
| Example A15 | 600 | 7 | 350 | 204 | >2,000 | |
| Example A16 | 600 | 9 | 300 | 190 | >2,000 | |
| Example A17 | 600 | 11 | 270 | 172 | >2,000 | |
| Example A18 | 600 | 20 | 220 | 151 | >2,000 | |
| Example A19 | 600 | 30 | 160 | 136 | >2,000 | |
| Example A20 | 600 | 60 | 100 | 113 | >2,000 | |
| Example A21 | 600 | 120 | 60 | 102 | >2,000 | |
| Comparative Example a1 | | | | 425 | 1,012 | As-welded |
| Comparative Example a2 | 600 | 180 | 50 | 381 | 1,251 | |
| Comparative Example a3 | 600 | 180 | 50 | 402 | 984 | |
| Comparative Example a4 | 600 | 180 | 50 | 418 | 1,016 | |
| Comparative Example a5 | 600 | 180 | 50 | 390 | 1,194 | |
| Comparative Example a6 | 350 | 180 | 50 | 379 | 1,289 | |

TABLE 3-continued

| | Example A | | | | | |
|---|---|---|---|---|---|---|
| Comparative Example a7 | 350 | 180 | 50 | 415 | 964 | |
| Comparative Example a8 | 800 | 180 | 50 | 409 | 826 | Excessively high heating temperature caused fracture from softened part |
| Comparative Example a9 | 600 | 7 | 350 | 384 | 1,204 | |

※1 Stress of rail web portion in vertical direction
※2 Test for evaluating rail web portion Example A Table 3 shows examples each obtained by reheating a rail web portion after subjecting the rail to the flash butt welding.

Two to three specimens were formed under the same conditions using the flash butt welding. Among them, a first specimen was used for the measurement of residual stress, and a second specimen was used in a test for evaluating the fatigue life of the rail web portion. Welded rails each having a steel type of "A" shown in Table 1 and a cross section size of "X" shown in Table 2 were used. The hardness of the base material was Hv 260 to 290.

Examples A1 to A13 are each an example in which reheating was performed after 180 minutes had elapsed from the completion of welding and the temperature of the weld zone had become 50° C. Examples A14 to A21 are examples in which the reheating start times were varied from 5 to 120 minutes from the completion of welding.

In any of those Examples, the residual stress of the rail web portion in the vertical direction was reduced as compared to the as-welded material shown in Comparative Example a1. For this reason, in the case of the as-welded material of Comparative Example a1, cracks were generated at a short life where the number of the repetitions of a load did not reach 2000000 in a fatigue test of the rail web portion. In contrast, in the cases of Examples A1 to A21, cracks were not generated until the number of the repetitions of a load reached 2000000.

Meanwhile, in each of the cases of Comparative Examples a2 to a9, although the rail web portion was reheated, the residual stress was not sufficiently reduced, mainly due to the fact that the distance C between the reheating region P and the welding center was too small or too large. Accordingly, Comparative Examples a2 to a9 were fractured at a short life in the fatigue test.

Further, since Comparative Example a8 had excessively high reheating temperature, the reheating part was softened to have a hardness of Hv 200, and a fatigue crack was generated from the softened part.

TABLE 4

| | Example B | | | | | | | |
|---|---|---|---|---|---|---|---|---|
| | 3 Lh ≥ C ≥ 0.2 Lh | 5 Lh ≥ B ≥ 0.5 Lh | Hw ≥ A ≥ 0.2 Hw | 750/400 | 3 Lh ≥ Ch ≥ 0.2 Lh | 5 Lh ≥ B ≥ 0.5 Lh | Ah ≥ 0.3 G | 750/400 |
| max→ | 90 | 150 | 104 | | 90 | 150 | 78 | |
| min→ | 6 | 15 | 20.8 | | 6 | 15 | 23.4 | |

| No. | Welded rail steel type | Welded rail size | Weld zone HAZ length [mm] Lh | Rail web portion height Hw | Rail head portion width Gh | Experiment conditions | | | | | |
|---|---|---|---|---|---|---|---|---|---|---|---|
| | | | | | | Rail web portion | | | | Head portion | |
| | | | | | | Distance Cw | Length Bw | Height Aw | Temperature | Distance Ch | Length Bh |
| Example B1 | B | X | 30 | 104 | 78 | 50 | 60 | 104 | 600 | 50 | 180 |
| Example B2 | B | X | 30 | 104 | 78 | 50 | 60 | 104 | 600 | 50 | 60 |
| Example B3 | B | X | 30 | 104 | 78 | 50 | 60 | 104 | 600 | 50 | 180 |
| Example B4 | B | X | 30 | 104 | 78 | 50 | 60 | 104 | 600 | 10 | 60 |
| Example B5 | B | X | 30 | 104 | 78 | 50 | 60 | 104 | 600 | 85 | 60 |
| Example B6 | B | X | 30 | 104 | 78 | 50 | 60 | 104 | 600 | 50 | 18 |
| Example B7 | B | X | 30 | 104 | 78 | 50 | 60 | 104 | 600 | 50 | 145 |
| Example B8 | B | X | 30 | 104 | 78 | 50 | 60 | 104 | 600 | 50 | 60 |
| Example B9 | B | X | 30 | 104 | 78 | 50 | 60 | 104 | 600 | 50 | 60 |
| Example B10 | B | X | 30 | 104 | 78 | 50 | 60 | 104 | 420 | 50 | 60 |
| Example B11 | B | X | 30 | 104 | 78 | 50 | 60 | 104 | 500 | 50 | 60 |
| Example B12 | B | X | 30 | 104 | 78 | 50 | 60 | 104 | 600 | 50 | 60 |
| Example B13 | B | X | 30 | 104 | 78 | 50 | 60 | 104 | 740 | 50 | 60 |
| Example B14 | B | X | 30 | 104 | 78 | 50 | 60 | 104 | 600 | 50 | 60 |
| Example B15 | B | X | 30 | 104 | 78 | 50 | 60 | ≥104 | 600 | 50 | 60 |
| Example B16 | B | X | 30 | 104 | 78 | 50 | 60 | 104 | 600 | 50 | 60 |
| Example B17 | B | X | 30 | 104 | 78 | 50 | 60 | ≥104 | 600 | 50 | 60 |
| Example B18 | B | X | 30 | 104 | 78 | 50 | 60 | 104 | 600 | 50 | 60 |
| Example B19 | B | X | 30 | 104 | 78 | 50 | 60 | 104 | 600 | 50 | 60 |
| Example B20 | B | X | 30 | 104 | 78 | 50 | 60 | 104 | 600 | 50 | 60 |
| Example B21 | B | X | 30 | 104 | 78 | 50 | 60 | 104 | 600 | 50 | 60 |

TABLE 4-continued

Example B

| No. | | | | | | | | | | | |
|---|---|---|---|---|---|---|---|---|---|---|---|
| Example B22 | B | X | 30 | 104 | 78 | 50 | 60 | 104 | 600 | 50 | 60 |
| Example B23 | B | X | 30 | 104 | 78 | 50 | 60 | 104 | 600 | 50 | 60 |
| Comparative Example b1 | B | X | 30 | 104 | 78 | | | | | | |
| Comparative Example b2 | B | X | 30 | 104 | 78 | 120 | 60 | 70 | 600 | 50 | 60 |
| Comparative Example b3 | B | X | 30 | 104 | 78 | 120 | 60 | 70 | 600 | 150 | 60 |
| Comparative Example b4 | B | X | 30 | 104 | 78 | 4 | 60 | 70 | 600 | 50 | 200 |
| Comparative Example b5 | B | X | 30 | 104 | 78 | 4 | 60 | 70 | 600 | 150 | 60 |
| Comparative Example b6 | B | X | 30 | 104 | 78 | 120 | 60 | 70 | 600 | 50 | 60 |
| Comparative Example b7 | B | X | 30 | 104 | 78 | 120 | 60 | 70 | 600 | 150 | 200 |
| Comparative Example b8 | B | X | 30 | 104 | 78 | 4 | 60 | 70 | 600 | 50 | 200 |
| Comparative Example b9 | B | X | 30 | 104 | 78 | 4 | 60 | 70 | 600 | 150 | 200 |
| Comparative Example b10 | B | X | 30 | 104 | 78 | 120 | 60 | 70 | 600 | 50 | 60 |
| Comparative Example b11 | B | X | 30 | 104 | 78 | 120 | 60 | 70 | 600 | 150 | 60 |

| | Experiment conditions Head portion | | Heating start time after welding [min] | Heating part-heating start temperature [°C] | Residual stress [MPa] | | Fatigue crack generation life [×1000] | | |
|---|---|---|---|---|---|---|---|---|---|
| No. | Width Ah | Temperature | | | Vertical direction | Longitudinal direction | Rail web portion test | Axial force test | Remarks |
| Example B1 | 15 | 600 | 180 | 50 | 115 | 162 | >2,000 | >2,000 | |
| Example B2 | 15 | 600 | 180 | 50 | 124 | 174 | >2,000 | >2,000 | |
| Example B3 | 70 | 600 | 180 | 50 | 109 | 144 | >2,000 | >2,000 | |
| Example B4 | 70 | 600 | 180 | 50 | 138 | 170 | >2,000 | >2,000 | |
| Example B5 | 70 | 600 | 180 | 50 | 107 | 176 | >2,000 | >2,000 | |
| Example B6 | 70 | 600 | 180 | 50 | 98 | 179 | >2,000 | >2,000 | |
| Example B7 | 70 | 600 | 180 | 50 | 154 | 141 | >2,000 | >2,000 | |
| Example B8 | 26 | 600 | 180 | 50 | 139 | 161 | >2,000 | >2,000 | |
| Example B9 | 75 | 600 | 180 | 50 | 89 | 149 | >2,000 | >2,000 | |
| Example B10 | 70 | 420 | 180 | 50 | 322 | 177 | >2,000 | >2,000 | |
| Example B11 | 70 | 500 | 180 | 50 | 209 | 152 | >2,000 | >2,000 | |
| Example B12 | 70 | 600 | 180 | 50 | 130 | 146 | >2,000 | >2,000 | |
| Example B13 | 70 | 740 | 180 | 50 | 48 | 132 | >2,000 | >2,000 | |
| Example B14 | 70 | 600 | 180 | 50 | 92 | 140 | >2,000 | >2,000 | Heating regions of rail web portion and head portion were continuously connected |
| Example B15 | ≥78 | 600 | 5 | 400 | 236 | 160 | >2,000 | >2,000 | |
| Example B16 | 70 | 600 | 7 | 350 | 211 | 158 | >2,000 | >2,000 | |
| Example B17 | ≥78 | 600 | 7 | 350 | 205 | 156 | >2,000 | >2,000 | Heating regions of rail web portion and head portion were continuously connected |
| Example B18 | 70 | 600 | 9 | 300 | 164 | 153 | >2,000 | >2,000 | |
| Example B19 | 70 | 600 | 11 | 270 | 172 | 151 | >2,000 | >2,000 | |
| Example B20 | 70 | 600 | 20 | 220 | 151 | 148 | >2,000 | >2,000 | |
| Example B21 | 70 | 600 | 30 | 160 | 133 | 145 | >2,000 | >2,000 | |
| Example B22 | 70 | 600 | 60 | 100 | 100 | 145 | >2,000 | >2,000 | |
| Example B23 | 70 | 600 | 120 | 60 | 89 | 142 | >2,000 | >2,000 | |
| Comparative Example b1 | | | | | 425 | 217 | 1,012 | 1,005 | As-welded |
| Cpmparative Example b2 | 70 | 600 | 180 | 50 | 384 | 146 | 1310 | >2,000 | |
| Comparative Example b3 | 70 | 300 | 180 | 50 | 376 | 181 | 1247 | 1357 | |
| Comparative Example b4 | 70 | 600 | 180 | 50 | 402 | 149 | 1026 | >2,000 | |
| Comparative Example b5 | 100 | 600 | 180 | 50 | 419 | 164 | 981 | >2,000 | |

TABLE 4-continued

| | | | | Example B | | | | |
|---|---|---|---|---|---|---|---|---|
| Comparative Example b6 | 100 | 300 | 180 | 50 | 391 | 189 | 1316 | 1416 |
| Comparative Example b7 | 70 | 300 | 180 | 50 | 382 | 192 | 1268 | 1251 |
| Comparative Example b8 | 100 | 600 | 180 | 50 | 406 | 174 | 1059 | >2,000 |
| Comparative Example b9 | 100 | 300 | 180 | 50 | 418 | 190 | 1007 | 1265 |
| Comparative Example b10 | 70 | 600 | 7 | 350 | 379 | 155 | 1194 | >2,000 |
| Comparative Example b11 | 70 | 600 | 7 | 350 | 399 | 167 | 1279 | >2,000 Heating regions of rail web portion and head portion were continuously connected |

Example B

Table 4 shows examples each obtained by reheating a rail head portion simultaneously with a rail web portion after subjecting the rail to the flash butt welding.

Three specimens were formed under the same conditions using the flash butt welding. Among them, a first specimen was used for the measurement of residual stress, a second specimen was used in a test for evaluating the fatigue life of the rail web portion, and a third specimen was used for an axial force fatigue test.

Welded rails each having a steel type of "B" shown in Table 1 and a cross section size of "X" shown in Table 2 were used. The hardness of the base material was Hv 360 to 400.

In any of those Examples, the residual stress of the rail web portion in the vertical direction was reduced as compared to the as-welded material shown in Comparative Example b1. For this reason, in the case of the as-welded material of Comparative Example b1, cracks were generated at a short life where the number of the repetitions of a load did not reach 2000000 in a fatigue test of the rail web portion. In contrast, in the cases of Examples B1 to B23, cracks were not generated until the number of the repetitions of a load reached 2000000.

Examples B1 to B 14 are each an example in which reheating was performed after 180 minutes had elapsed from the completion of welding and the temperature of the weld zone had become 50° C. Examples B 15 to B23 are examples in which the reheating start times were varied from 5 to 120 minutes from the completion of welding. With decrease in the reheating start time, the residual stress tended to increase slightly.

Examples B14 and B 17 are each an example in which the reheating region of the rail web portion 2 and the reheating region of the head-top portion 4 were continuously connected to each other.

Meanwhile, in each of the cases of Comparative Examples b2 to b11, although the rail web portion 2 and the head-top portion 4 were reheated, the residual stress in the vertical direction was not sufficiently reduced, mainly due to the fact that the distance Cw between the reheating region Pw of the rail web portion 2 and the welding center was too small or too large. Accordingly, Comparative Examples b2 to b11 were fractured at a short life in the fatigue test of the rail web portion. On the other hand, by reheating the head-top portion 4, the residual stress in the longitudinal direction was reduced as compared to the as-welded material shown in Comparative Example b1, and the fatigue life in an axial direction fatigue test increased. However, Comparative Examples b3, b6, b7, and b9 fractured before the number of the repetitions of a load reached 2000000 due to the fact that the reheating temperature of the head-top portion 4 was not sufficient and that the size of the reheating region was not appropriate.

TABLE 5

| | | | | | Example C | | | | |
|---|---|---|---|---|---|---|---|---|---|
| | 3 Lh ≥ C ≥ 0.2 Lh | 5 Lh ≥ B ≥ 0.5 Lh | Hw ≥ A ≥ 0.2 Hw | 750/400 | | 3 Lh ≥ Cb ≥ 0.2 Lh | 5 Lh ≥ Bb ≥ 0.5 Lh | Ab ≥ 0.3 Gh | 750/400 |
| max→ | 90 | 150 | 104 | | | 90 | 150 | 152 | |
| min→ | 6 | 15 | 20.8 | | | 6 | 15 | 45.6 | |

| | | | | Weld zone | Rail web portion | Rail foot portion | Experiment conditions | | | | |
|---|---|---|---|---|---|---|---|---|---|---|---|
| | | | | HAZ length | height | width | Rail web portion | | | Foot portion | |
| No. | Welded rail steel type | Welded rail size | | [mm] Lh | Hw | Gb | Distance Cw | Length Bw | Height Aw | Temperature | Distance Cb | Length Bb |
| Example C1 | C | X | | 30 | 104 | 152 | 50 | 70 | 104 | 600 | 50 | 10 |
| Example C2 | C | X | | 30 | 104 | 152 | 50 | 70 | 104 | 600 | 50 | 70 |
| Example C3 | C | X | | 30 | 104 | 152 | 50 | 70 | 104 | 600 | 50 | 10 |
| Example C4 | C | X | | 30 | 104 | 152 | 50 | 70 | 104 | 600 | 10 | 70 |
| Example C5 | C | X | | 30 | 104 | 152 | 50 | 70 | 104 | 600 | 85 | 70 |

TABLE 5-continued

Example C

| | | | | | | | | | | | |
|---|---|---|---|---|---|---|---|---|---|---|---|
| Example C6 | C | X | 30 | 104 | 152 | 50 | 70 | 104 | 600 | 50 | 17 |
| Example C7 | C | X | 30 | 104 | 152 | 50 | 70 | 104 | 600 | 50 | 140 |
| Example C8 | C | X | 30 | 104 | 152 | 50 | 70 | 104 | 600 | 50 | 70 |
| Example C9 | C | X | 30 | 104 | 152 | 50 | 70 | 104 | 600 | 50 | 70 |
| Example C10 | C | X | 30 | 104 | 152 | 50 | 70 | 104 | 420 | 50 | 70 |
| Example C11 | C | X | 30 | 104 | 152 | 50 | 70 | 104 | 500 | 50 | 70 |
| Example C12 | C | X | 30 | 104 | 152 | 50 | 70 | 104 | 600 | 50 | 70 |
| Example C13 | C | X | 30 | 104 | 152 | 50 | 70 | 104 | 740 | 50 | 70 |
| Example C14 | C | X | 30 | 104 | 152 | 50 | 70 | 104 | 600 | 50 | 70 |
| Example C15 | C | X | 30 | 104 | 152 | 50 | 70 | 104 | 600 | 50 | 70 |
| Example C16 | C | X | 30 | 104 | 152 | 50 | 70 | 104 | 600 | 50 | 70 |
| Example C17 | C | X | 30 | 104 | 152 | 50 | 70 | 104 | 600 | 50 | 70 |
| Example C18 | C | X | 30 | 104 | 152 | 50 | 70 | 104 | 600 | 50 | 70 |
| Example C19 | C | X | 30 | 104 | 152 | 50 | 70 | 104 | 600 | 50 | 70 |
| Example C20 | C | X | 30 | 104 | 152 | 50 | 70 | 104 | 600 | 50 | 70 |
| Example C21 | C | X | 30 | 104 | 152 | 50 | 70 | 104 | 600 | 50 | 70 |
| Example C22 | C | X | 30 | 104 | 152 | 50 | 70 | 104 | 600 | 50 | 70 |
| Example C23 | C | X | 30 | 104 | 152 | 50 | 70 | 104 | 600 | 50 | 70 |
| Comparative Example c1 | C | X | 30 | 104 | 152 | | | | | | |
| Comparative Example c2 | C | X | 30 | 104 | 152 | 120 | 70 | 100 | 600 | 50 | 70 |
| Comparative Example c3 | C | X | 30 | 104 | 152 | 120 | 70 | 100 | 600 | 50 | 70 |
| Comparative Example c4 | C | X | 30 | 104 | 152 | 4 | 70 | 100 | 600 | 120 | 10 |
| Comparative Example c5 | C | X | 30 | 104 | 152 | 4 | 70 | 100 | 600 | 50 | 70 |
| Comparative Example c6 | C | X | 30 | 104 | 152 | 120 | 70 | 100 | 600 | 120 | 70 |
| Comparative Example c7 | C | X | 30 | 104 | 152 | 120 | 70 | 100 | 600 | 50 | 180 |
| Comparative Example c8 | C | X | 30 | 104 | 152 | 4 | 70 | 100 | 600 | 120 | 10 |
| Comparative Example c9 | C | X | 30 | 104 | 152 | 4 | 70 | 100 | 600 | 50 | 10 |
| Comparative Example c10 | o | X | 30 | 104 | 152 | 120 | 70 | 100 | 600 | 120 | 70 |
| Comparative Example c11 | C | X | 30 | 104 | 152 | 120 | 70 | ≥104 | 600 | 50 | 70 |

| | Experiment conditions Foot portion | | Heating start time after welding [min] | Heating part-heating start temperature [° C.] | Residual stress [MPa] | | Fatigue crack generation life [×1000] | | Remarks |
|---|---|---|---|---|---|---|---|---|---|
| No. | Width Ab | Temperature | | | Vertical direction | Longitudinal direction | Rail web portion test | Axial force test | |
| Example C1 | 30 | 600 | 180 | 50 | 121 | 176 | >2,000 | >2,000 | |
| Example C2 | 30 | 600 | 180 | 50 | 119 | 162 | >2,000 | >2,000 | |
| Example C3 | 120 | 600 | 180 | 50 | 86 | 165 | >2,000 | >2,000 | |
| Example C4 | 120 | 600 | 180 | 50 | 157 | 177 | >2,000 | >2,000 | |
| Example C5 | 120 | 600 | 180 | 50 | 153 | 167 | >2,000 | >2,000 | |
| Example C6 | 120 | 600 | 180 | 50 | 108 | 180 | >2,000 | >2,000 | |
| Example C7 | 120 | 600 | 180 | 50 | 90 | 140 | >2,000 | >2,000 | |
| Example C8 | 50 | 600 | 180 | 50 | 123 | 160 | >2,000 | >2,000 | |
| Example C9 | 140 | 600 | 180 | 50 | 147 | 144 | >2,000 | >2,000 | |
| Example C10 | 120 | 420 | 180 | 50 | 333 | 171 | >2,000 | >2,000 | |
| Example C11 | 120 | 500 | 180 | 50 | 200 | 153 | >2,000 | >2,000 | |
| Example C12 | 120 | 600 | 180 | 50 | 117 | 146 | >2,000 | >2,000 | |
| Example C13 | 120 | 740 | 180 | 50 | 65 | 130-140 | >2,000 | >2,000 | |
| Example C14 | 120 | 600 | 180 | 50 | 134 | 147 | >2,000 | >2,000 | Heating regions of rail web portion and foot portion were continuously connected |
| Example C15 | 120 | 600 | 5 | 400 | 235 | 152 | >2,000 | >2,000 | |
| Example C16 | 120 | 600 | 7 | 350 | 220 | 159 | >2,000 | >2,000 | |
| Example C17 | 120 | 600 | 7 | 350 | 201 | 152 | >2,000 | >2,000 | Heating regions of rail web portion and foot portion were continuously connected |

TABLE 5-continued

| | | | Example C | | | | | | |
|---|---|---|---|---|---|---|---|---|---|
| Example C18 | 120 | 600 | 9 | 300 | 182 | 156 | >2,000 | >2,000 | |
| Example C19 | 120 | 600 | 11 | 270 | 174 | 157 | >2,000 | >2,000 | |
| Example C20 | 120 | 600 | 20 | 220 | 157 | 141 | >2,000 | >2,000 | |
| Example C21 | 120 | 600 | 30 | 160 | 125 | 148 | >2,000 | >2,000 | |
| Example C22 | 120 | 600 | 60 | 100 | 104 | 145 | >2,000 | >2,000 | |
| Example C23 | 120 | 600 | 120 | 60 | 86 | 142 | >2,000 | >2,000 | |
| Comparative Example c1 | | | | | 425 | 216 | 1,012 | 1,005 | As-welded |
| Comparative Example c2 | 120 | 600 | 180 | 50.00 | 394 | 140 | 1251 | >2,000 | |
| Comparative Example c3 | 120 | 350 | 180 | 50.00 | 378 | 184 | 1184 | 1425 | |
| Comparative Example c4 | 120 | 600 | 180 | 50.00 | 410 | 174 | 905 | >2,000 | |
| Comparative Example c5 | 40 | 600 | 180 | 50.00 | 408 | 179 | 1026 | >2,000 | |
| Comparative Example c6 | 30 | 800 | 180 | 50.00 | 391 | 158 | 1305 | >2,000 | Head-top portion softened due to excessively high heating temperature |
| Comparative Example c7 | 120 | 800 | 180 | 50.00 | 388 | 156 | 1249 | >2,000 | Head-top portion softened due to excessively high heating temperature |
| Comparative Example c8 | 40 | 600 | 180 | 50.00 | 417 | 174 | 986 | >2,000 | |
| Comparative Example c9 | 30 | 350 | 180 | 50.00 | 406 | 199 | 1087 | 1250 | |
| Comparative Example c10 | 120 | 600 | 7 | 350 | 379 | 168 | 1311 | >2,000 | |
| Comparative Example c11 | ≥152 | 600 | 7 | 350 | 400 | 150 | 1294 | >2,000 | Heating regions of rail web portion and foot portion were continuously connected |

Example C

Table 5 shows examples each obtained by reheating the rail sole portion 6 simultaneously with the rail web portion 2 after subjecting the rail to the flash butt welding.

Three specimens were formed under the same conditions using the flash butt welding. Among them, a first specimen was used for the measurement of residual stress, a second specimen was used in a test for evaluating the fatigue life of the rail web portion, and a third specimen was used for an axial force fatigue test.

Welded rails each having a steel type of "C" shown in Table 1 and a cross section size of "X" shown in Table 2 were used. The hardness of the base material was Hv 400 to 450.

In any of those Examples, the residual stress of the rail web portion in the vertical direction was reduced as compared to the as-welded material shown in Comparative Example c1. For this reason, in the case of Comparative Example c1, cracks were generated at a short life where the number of the repetitions of a load did not reach 2000000 in a fatigue test of the rail web portion. In contrast, in the cases of Examples C1 to C23, cracks were not generated until the number of the repetitions of a load reached 2000000.

Examples C1 to C14 are each an example in which reheating was performed after 180 minutes had elapsed from the completion of welding and the temperature of the weld zone had become 50° C. Examples C15 to C23 are examples in which the reheating start times were varied from 5 to 120 minutes from the completion of welding. With decrease in the reheating start time, the residual stress tended to increase slightly.

Examples C14 and C17 are each an example in which the reheating region of the rail web portion and the reheating region of the head-top portion 4 were continuously connected to each other.

Meanwhile, in each of the cases of Comparative Examples c2 to c11, although the rail web portion 2 and the head-top portion 4 were reheated, the residual stress in the vertical direction was not sufficiently reduced, mainly due to the fact that the distance Cw between the reheating region Pw of the rail web portion and the welding center was too small or too large. Accordingly, Comparative Examples c2 to c11 were fractured at a short life in the fatigue test of the rail web portion.

On the other hand, by reheating the head-top portion 4, the residual stress in the longitudinal direction was reduced as compared to the as-welded material shown in Comparative Example c1, and the fatigue life in an axial direction fatigue test increased. However, Comparative Examples c3 and c9 fractured before the number of the repetitions of a load reached 2000000 due to the fact that the reheating temperature of the head-top portion 4 was not sufficient and that the size of the reheating region was not appropriate.

Further, in each of the cases of Comparative Examples c6 and c7, the reheating temperature of the head-top portion 4 was excessively high, and hence, a head-top surface was softened. Since the abrasion resistance is important for the head-top portion 4, the treatment that causes softening is not preferred.

TABLE 6-1

| | | | | | | | | | | | | | |
|---|---|---|---|---|---|---|---|---|---|---|---|---|---|
| | | | | | | | | Example D | | | | | |
| 3 Lh ≥ C ≥ 0.2 Lh | 5 Lh ≥ B ≥ 0.5 Lh | Hw ≥ A ≥ 0.2 Hw | 750/400 | 3 Lh ≥ Ch ≥ 0.2 Lh | 5 Lh ≥ B ≥ 0.5 Lh | Ah ≥ 0.3 Gh | 750/400 | 3 Lh ≥ Cb ≥ 0.2 Lh | 5 Lh ≥ Bb ≥ 0.5 Lh | Ab ≥ 0.3 Gh | 750/400 | | |

| | | | Weld zone | Rail | Rail | Rail | | | | | | | |
|---|---|---|---|---|---|---|---|---|---|---|---|---|---|
| | Welded | | HAZ | web | head | foot | | Experiment conditions | | | | | |
| | | | | | | | | Rail web portion | | | | Head portion | |
| No. | rail steel type | Welded rail size | length [mm] Lh | portion height Hw | portion width Gh | portion width Gb | Distance Cw | Length Bw | Height Aw | Temperature | Distance Ch | Length Bh | Width Ah | Temperature |
| Example D1 | C | X | 30 | 104 | 78 | 152 | 10 | 70 | 104 | 600 | 50 | 70 | 70 | 600 |
| Example D2 | C | X | 30 | 104 | 78 | 152 | 85 | 70 | 104 | 600 | 50 | 70 | 70 | 600 |
| Example D3 | C | X | 30 | 104 | 78 | 152 | 50 | 20 | 104 | 600 | 50 | 70 | 70 | 600 |
| Example D4 | C | X | 30 | 104 | 78 | 152 | 50 | 140 | 104 | 600 | 50 | 70 | 70 | 600 |
| Example D5 | C | X | 30 | 104 | 78 | 152 | 50 | 70 | 25 | 600 | 50 | 70 | 70 | 600 |
| Example D6 | C | X | 30 | 104 | 78 | 152 | 50 | 70 | 100 | 600 | 50 | 70 | 70 | 600 |
| Example D7 | C | X | 30 | 104 | 78 | 152 | 50 | 70 | 104 | 420 | 50 | 70 | 70 | 420 |
| Example D8 | C | X | 30 | 104 | 78 | 152 | 50 | 70 | 104 | 500 | 50 | 70 | 70 | 500 |
| Example D9 | C | X | 30 | 104 | 78 | 152 | 50 | 70 | 104 | 600 | 50 | 70 | 70 | 600 |
| Example D10 | C | X | 30 | 104 | 78 | 152 | 50 | 70 | 104 | 740 | 50 | 70 | 70 | 740 |
| Example D11 | C | X | 30 | 104 | 78 | 152 | 50 | 70 | 104 | 600 | 10 | 70 | 70 | 600 |
| Example D12 | C | X | 30 | 104 | 78 | 152 | 50 | 70 | 104 | 600 | 85 | 70 | 70 | 600 |
| Example D13 | C | X | 30 | 104 | 78 | 152 | 50 | 70 | 104 | 600 | 50 | 20 | 70 | 600 |
| Example D14 | C | X | 30 | 104 | 78 | 152 | 50 | 70 | 104 | 600 | 50 | 140 | 70 | 600 |
| Example D15 | C | X | 30 | 104 | 78 | 152 | 50 | 70 | 104 | 600 | 50 | 70 | 25 | 600 |
| Example D16 | C | X | 30 | 104 | 78 | 152 | 50 | 70 | 104 | 600 | 50 | 70 | 75 | 600 |
| Example D17 | C | X | 30 | 104 | 78 | 152 | 50 | 70 | 104 | 600 | 50 | 70 | 70 | 600 |
| Example D18 | C | X | 30 | 104 | 78 | 152 | 50 | 70 | 104 | 600 | 50 | 70 | 70 | 600 |
| Example D19 | C | X | 30 | 104 | 78 | 152 | 50 | 70 | 104 | 600 | 50 | 70 | 70 | 600 |
| Example D20 | C | X | 30 | 104 | 78 | 152 | 50 | 70 | 104 | 600 | 50 | 70 | 70 | 600 |
| Example D21 | C | X | 30 | 104 | 78 | 152 | 50 | 70 | 104 | 600 | 50 | 70 | 70 | 600 |
| Example D22 | C | X | 30 | 104 | 78 | 152 | 50 | 70 | 104 | 600 | 50 | 70 | 70 | 600 |
| Example D23 | C | X | 30 | 104 | 78 | 152 | 50 | 70 | 104 | 600 | 50 | 70 | 70 | 600 |
| Example D24 | C | X | 30 | 104 | 78 | 152 | 50 | 70 | 104 | 600 | 50 | 70 | 70 | 600 |
| Example D25 | C | X | 30 | 104 | 78 | 152 | 50 | 70 | 104 | 600 | 50 | 70 | 70 | 600 |
| Example D26 | C | X | 30 | 104 | 78 | 152 | 50 | 70 | 104 | 600 | 50 | 70 | 70 | 600 |
| Example D27 | C | X | 30 | 104 | 78 | 152 | 50 | 70 | 104 | 600 | 50 | 70 | 70 | 600 |
| Example D28 | C | X | 30 | 104 | 78 | 152 | 50 | 70 | 104 | 600 | 50 | 70 | 70 | 600 |
| Example D29 | C | X | 30 | 104 | 78 | 152 | 50 | 70 | 104 | 600 | 50 | 70 | 70 | 600 |
| Example D30 | C | X | 30 | 104 | 78 | 152 | 50 | 70 | ≥104 | 600 | 50 | 70 | ≥78 | 600 |
| Example D31 | C | X | 30 | 104 | 78 | 152 | 50 | 70 | ≥104 | 600 | 50 | 70 | 70 | 600 |
| Example D32 | C | X | 30 | 104 | 78 | 152 | 50 | 70 | ≥104 | 600 | 50 | 70 | ≥78 | 600 |
| Example D33 | C | X | 30 | 104 | 78 | 152 | 50 | 70 | ≥104 | 600 | 50 | 70 | ≥78 | 600 |
| Example D34 | C | X | 30 | 104 | 78 | 152 | 50 | 70 | ≥104 | 600 | 50 | 70 | 70 | 600 |
| Example D35 | C | X | 30 | 104 | 78 | 152 | 50 | 70 | ≥104 | 600 | 50 | 70 | ≥78 | 600 |
| Example D36 | C | X | 40 | 104 | 78 | 152 | 100 | 150 | 104 | 600 | 100 | 150 | 70 | 600 |
| Example D37 | C | X | 40 | 104 | 78 | 152 | 100 | 150 | ≥104 | 600 | 100 | 150 | ≥78 | 600 |
| Example D38 | C | X | 50 | 104 | 78 | 152 | 100 | 150 | 104 | 600 | 100 | 150 | 70 | 600 |
| Example D39 | C | X | 50 | 104 | 78 | 152 | 100 | 150 | ≥104 | 600 | 100 | 150 | ≥78 | 600 |
| Example D40 | C | Y | 30 | 74 | 65 | 127 | 50 | 70 | ≥74 | 600 | 50 | 70 | ≥65 | 600 |
| Example D41 | C | Y | 30 | 74 | 65 | 127 | 50 | 70 | ≥74 | 600 | 50 | 70 | ≥65 | 600 |

| | Experiment conditions | | | Heating start time | Heating part-heating | Residual stress [MPa] | | Fatigue crack generation life [×1000] | | |
|---|---|---|---|---|---|---|---|---|---|---|
| | Foot portion | | | after | start tem- | | Longi- | Rail web | Axial | |
| No. | Distance | Length Bb | Width Ab | Temperature | welding [min] | perature [° C.] | Vertical direction | tudinal direction | portion test | force test | Remarks |
| Example D1 | 50 | 70 | 120 | 600 | 180 | 50 | 331 | 147 | >2,000 | >2,000 | |
| Example D2 | 50 | 70 | 120 | 600 | 180 | 50 | 286 | 140 | >2,000 | >2,000 | |
| Example D3 | 50 | 70 | 120 | 600 | 180 | 50 | 347 | 146 | >2,000 | >2,000 | |
| Example D4 | 50 | 70 | 120 | 600 | 180 | 50 | 129 | 148 | >2,000 | >2,000 | |
| Example D5 | 50 | 70 | 120 | 600 | 180 | 50 | 338 | 141 | >2,000 | >2,000 | |
| Example D6 | 50 | 70 | 120 | 600 | 180 | 50 | 301 | 149 | >2,000 | >2,000 | |
| Example D7 | 50 | 70 | 120 | 420 | 180 | 50 | 325 | 174 | >2,000 | >2,000 | |
| Example D8 | 50 | 70 | 120 | 500 | 180 | 50 | 207 | 152 | >2,000 | >2,000 | |
| Example D9 | 50 | 70 | 120 | 600 | 180 | 50 | 114 | 143 | >2,000 | >2,000 | |
| Example D10 | 50 | 70 | 120 | 740 | 180 | 50 | 28 | 132 | >2,000 | >2,000 | |
| Example D11 | 50 | 70 | 120 | 600 | 180 | 50 | 129 | 162 | >2,000 | >2,000 | |
| Example D12 | 50 | 70 | 120 | 600 | 180 | 50 | 98 | 150 | >2,000 | >2,000 | |
| Example D13 | 50 | 70 | 120 | 600 | 180 | 50 | 106 | 165 | >2,000 | >2,000 | |

TABLE 6-1-continued

| | Example D | | | | | | | | | | |
|---|---|---|---|---|---|---|---|---|---|---|---|
| Example D14 | 50 | 70 | 120 | 600 | 180 | 50 | 145 | 147 | >2,000 | >2,000 | |
| Example D15 | 50 | 70 | 120 | 600 | 180 | 50 | 125 | 166 | >2,000 | >2,000 | |
| Example D16 | 50 | 70 | 120 | 600 | 180 | 50 | 150 | 157 | >2,000 | >2,000 | |
| Example D17 | 10 | 70 | 120 | 600 | 180 | 50 | 96 | 167 | >2,000 | >2,000 | |
| Example D18 | 85 | 70 | 120 | 600 | 180 | 50 | 90 | 156 | >2,000 | >2,000 | |
| Example D19 | 50 | 20 | 120 | 600 | 180 | 50 | 138 | 147 | >2,000 | >2,000 | |
| Example D20 | 50 | 145 | 120 | 600 | 180 | 50 | 100 | 142 | >2,000 | >2,000 | |
| Example D21 | 50 | 70 | 50 | 600 | 180 | 50 | 103 | 161 | >2,000 | >2,000 | |
| Example D22 | 50 | 70 | 145 | 600 | 180 | 50 | 148 | 151 | >2,000 | >2,000 | |
| Example D23 | 50 | 70 | 120 | 600 | 5 | 400 | 226 | 157 | >2,000 | >2,000 | |
| Example D24 | 50 | 70 | 120 | 600 | 7 | 350 | 220 | 150 | >2,000 | >2,000 | |
| Example D25 | 50 | 70 | 120 | 600 | 9 | 300 | 195 | 155 | >2,000 | >2,000 | |
| Example D26 | 50 | 70 | 120 | 600 | 11 | 270 | 169 | 153 | >2,000 | >2,000 | |
| Example D27 | 50 | 70 | 120 | 600 | 20 | 220 | 154 | 144 | >2,000 | >2,000 | |
| Example D28 | 50 | 70 | 120 | 600 | 30 | 160 | 121 | 148 | >2,000 | >2,000 | |
| Example D29 | 50 | 70 | 120 | 600 | 60 | 100 | 89 | 141 | >2,000 | >2,000 | |
| Example D30 | 50 | 70 | 120 | 600 | 180 | 50 | 104 | 140 | >2,000 | >2,000 | Heating regions of head portion and rail web portion were continuously connected |
| Example D31 | 50 | 70 | ≥152 | 600 | 180 | 50 | 96 | 142 | >2,000 | >2,000 | Heating regions of foot portion and rail web portion were continuously connected |
| Example D32 | 50 | 70 | ≥152 | 600 | 180 | 50 | 114 | 147 | >2,000 | >2,000 | Heating regions of head portion, rail web portion, and foot portion were continuously connected |
| Example D33 | 50 | 70 | 120 | 600 | 7 | 350 | 152 | 143 | >2,000 | >2,000 | Heating regions of head portion and rail web portion were continuously connected |
| Example D34 | 50 | 70 | ≥152 | 600 | 7 | 350 | 126 | 140 | >2,000 | >2,000 | Heating regions of foot portion and rail web portion were continuously connected |
| Example D35 | 50 | 70 | ≥152 | 600 | 7 | 350 | 137 | 150 | >2,000 | >2,000 | Heating regions of head portion, rail web portion, and foot portion were continuously connected |
| Example D36 | 100 | 150 | 120 | 600 | 180 | 50 | 82 | 143 | >2,000 | >2,000 | |
| Example D37 | 100 | 150 | ≥152 | 600 | 7 | 350 | 121 | 147 | >2,000 | >2,000 | Heating regions of head portion, rail web portion, and foot portion were continuously connected |
| Example D38 | 100 | 150 | 120 | 600 | 7 | 350 | 137 | 146 | >2,000 | >2,000 | |
| Example D39 | 100 | 150 | ≥152 | 600 | 7 | 350 | 97 | 142 | >2,000 | >2,000 | Heating regions of head portion, rail web portion, and foot portion were continuously connected |
| Example D40 | 50 | 70 | ≥127 | 600 | 180 | 50 | 106 | 143 | >2,000 | >2,000 | Heating regions of head portion, rail web portion, and foot portion were continuously connected |
| Example D41 | 50 | 70 | ≥127 | 600 | 7 | 350 | 119 | 149 | >2,000 | >2,000 | Heating regions of head portion, rail web portion, and foot portion |

TABLE 6-1-continued

Example D were continuously connected

TABLE 6-2

Example D

| No. | Welded rail steel type | Welded rail size | Weld zone HAZ length [mm] Lh | Rail web portion height Hw | Rail head portion width Gh | Rail foot portion width Gb | Experiment conditions | | | | | | | |
|---|---|---|---|---|---|---|---|---|---|---|---|---|---|---|
| | | | | | | | Rail web portion | | | | Head portion | | | |
| | | | | | | | Distance Cw | Length Bw | Height Aw | Temperature | Distance Ch | Length Bh | Width Ah | Temperature |
| Comparative Example d1 | C | X | 30 | 104 | 78 | 152 | | | | | | | | |
| Comparative Example d2 | C | X | 30 | 104 | 78 | 152 | 120 | 70 | 104 | 780 | 50 | 70 | 70 | 600 |
| Comparative Example d3 | C | X | 30 | 104 | 78 | 152 | 120 | 70 | 104 | 600 | 50 | 170 | 70 | 600 |
| Comparative Example d4 | C | X | 30 | 104 | 78 | 152 | 4 | 70 | 104 | 600 | 50 | 70 | 15 | 600 |
| Comparative Example d5 | C | X | 30 | 104 | 78 | 152 | 4 | 70 | 104 | 600 | 50 | 70 | 70 | 300 |
| Comparative Example d6 | C | X | 30 | 104 | 78 | 152 | 120 | 70 | 104 | 600 | 4 | 170 | 70 | 600 |
| Comparative Example d7 | C | X | 30 | 104 | 78 | 152 | 120 | 70 | 104 | 600 | 4 | 70 | 15 | 600 |
| Comparative Example d8 | C | X | 30 | 104 | 78 | 152 | 4 | 70 | 104 | 600 | 4 | 70 | 70 | 300 |
| Comparative Example d9 | C | X | 30 | 104 | 78 | 152 | 4 | 70 | 104 | 600 | 50 | 170 | 15 | 600 |
| Comparative Example d10 | C | X | 30 | 104 | 78 | 152 | 120 | 70 | 104 | 600 | 50 | 170 | 70 | 300 |
| Comparative Example d11 | C | X | 30 | 104 | 78 | 152 | 120 | 70 | 104 | 600 | 50 | 70 | 15 | 300 |
| Comparative Example d12 | C | X | 30 | 104 | 78 | 152 | 4 | 70 | 104 | 600 | 50 | 170 | 15 | 300 |
| Comparative Example d13 | C | X | 30 | 104 | 78 | 152 | 4 | 70 | 104 | 600 | 4 | 70 | 15 | 300 |
| Comparative Example d14 | C | X | 30 | 104 | 78 | 152 | 120 | 70 | 104 | 600 | 120 | 170 | 70 | 300 |
| Comparative Example d15 | C | X | 30 | 104 | 78 | 152 | 120 | 70 | ≥74 | 600 | 50 | 70 | ≥65 | 600 |
| Comparative Example d16 | C | X | 30 | 104 | 78 | 152 | 120 | 70 | ≥74 | 600 | 50 | 70 | ≥65 | 600 |

| No. | Experiment conditions Foot portion | | | | Heating start time after welding [min] | Heating part-heating start temperature [° C.] | Residual stress [MPa] | | Fatigue crack generation life [×1000] | | Remarks |
|---|---|---|---|---|---|---|---|---|---|---|---|
| | Distance Cb | Length Bb | Width Ab | Temperature | | | Vertical direction | Longitudinal direction | Rail web portion test | Axial force test | |
| Comparative Example d1 | | | | | | | 425 | 226 | 1,168 | 1,085 | As-welded |
| Comparative Example d2 | 50 | 70 | 120 | 780 | 180 | 50 | 384 | 144 | 1206 | >2,000 | Rail web portion and sole portion softened due to excessively high heating temperature |
| Comparative Example d3 | 50 | 160 | 120 | 600 | 180 | 50 | 392 | 148 | 1352 | >2,000 | |
| Comparative Example d4 | 50 | 70 | 35 | 600 | 180 | 50 | 412 | 167 | 1002 | >2,000 | |
| Comparative Example d5 | 50 | 70 | 120 | 350 | 180 | 50 | 408 | 211 | 980 | 981 | |
| Comparative Example d6 | 120 | 160 | 120 | 600 | 180 | 50 | 375 | 181 | 1186 | >2,000 | |

TABLE 6-2-continued

Example D

| | | | | | | | | | | |
|---|---|---|---|---|---|---|---|---|---|---|
| Comparative Example d7 | 120 | 70 | 160 | 600 | 180 | 50 | 391 | 186 | 1240 | >2,000 | |
| Comparative Example d8 | 120 | 70 | 120 | 350 | 180 | 50 | 401 | 218 | 1080 | 1054 | |
| Comparative Example d9 | 50 | 160 | 35 | 600 | 180 | 50 | 418 | 187 | 942 | >2,000 | |
| Comparative Example d10 | 50 | 10 | 120 | 350 | 180 | 50 | 385 | 200 | 1307 | 1100 | |
| Comparative Example d11 | 50 | 70 | 160 | 350 | 180 | 50 | 379 | 206 | 1196 | 950 | |
| Comparative Example d12 | 50 | 10 | 35 | 350 | 180 | 50 | 405 | 214 | 908 | 1041 | |
| Comparative Example d13 | 4 | 70 | 160 | 350 | 180 | 50 | 416 | 217 | 1016 | 1084 | |
| Comparative Example d14 | 4 | 10 | 120 | 350 | 180 | 50 | 385 | 208 | 1284 | 986 | |
| Comparative Example d15 | 50 | 70 | ≥127 | 600 | 180 | 50 | 396 | 149 | 1327 | >2,000 | Heating regions of head portion, rail web portion, and foot portion were continuously connected |
| Comparative Example d16 | 50 | 70 | ≥127 | 600 | 7 | 350 | 378 | 142 | 1267 | >2,000 | Heating regions of head portion, rail web portion, and foot portion were continuously connected |

Example D

Table 6-1 and Table 6-2 show examples each obtained by reheating the rail head-top portion 4 and the rail sole portion 6 simultaneously with the rail web portion 2 after subjecting the rail to the flash butt welding.

Three specimens were formed under the same conditions using the flash butt welding. Among them, a first specimen was used for the measurement of residual stress, a second specimen was used in a test for evaluating the fatigue life of the rail web portion, and a third specimen was used for an axial force fatigue test.

Welded rails each having a steel type of "C" shown in Table 1 and a cross section size of "X" shown in Table 2, and welded rails each having a steel type of "C" shown in Table 1 and a cross section size of "Y" shown in Table 2 were used. The hardness of the base material was Hv 400 to 450.

In any of those Examples, the residual stress of the rail web portion in the vertical direction was reduced as compared to the as-welded material shown in Comparative Example d1. For this reason, in the case of the as-welded material of Comparative Example d1, cracks were generated at a short life where the number of the repetitions of a load did not reach 2000000 in a fatigue test of the rail web portion. In contrast, in the cases of Examples D1 to D41, cracks were not generated until the number of the repetitions of a load reached 2000000.

Examples D1 to D22, D30 to D32, D36, and D40 are each an example in which reheating was performed after 180 minutes had elapsed from the completion of welding and the temperature of the weld zone had become 50° C. Examples D23 to D29, D33 to D35, and D37 to D39 are examples in which the reheating start times were varied from 5 to 120 minutes from the completion of welding. With decrease in the reheating start time, the residual stress tended to increase slightly.

Examples D36 to D39 are examples each obtained by high heat input welding having a large HAZ length.

D30 and D33 are each an example in which the reheating region of the rail web portion 2 and the reheating region of the head-top portion 4 were continuously connected to each other.

D31 and D34 are each an example in which the reheating region of the rail web portion 2 and the reheating region of the sole portion 6 were continuously connected to each other.

D32, D37, and D39 to D41 are each an example in which all of the reheating regions of the rail web portion 2, the head-top portion 4, and the sole portion 6 were continuously connected to each other.

Meanwhile, in each of the cases of Comparative Examples d2 to d16, although the rail web portion 2, and the head-top portion 4 and/or the sole portion 6 were reheated, the residual stress in the vertical direction was not sufficiently reduced, mainly due to the fact that the distance Cw between the reheating region Pw of the rail web portion and the welding center was too small or too large. Accordingly, Comparative Examples d2 to d16 were fractured at a short life in the fatigue test of the rail web portion.

On the other hand, by reheating the head-top portion 4 and/or the sole portion 6, the residual stress in the longitudinal direction was reduced as compared to the as-welded material shown in Comparative Example d1, and the fatigue life in an axial direction fatigue test increased. However, Comparative Examples d5, d8, and d10 to d14 fractured before the number of the repetitions of a load reached 2000000 due to the fact that the reheating temperature of the head-top portion 4 or the sole portion 6 was not sufficient and that the size of the reheating region was not appropriate.

Further, in Comparative Example d2, the reheating temperatures of the rail web portion 2 and the sole portion 6 were excessively high, and hence, those portions softened and the softened parts became fatigue originations. Further, since bending tensile stress was generated in the sole portion 6 with the passage of wheels, the treatment that causes softening is not preferred.

TABLE 7

Example E

| No. | Welded rail steel type | Welded rail size | Weld zone HAZ length [mm] Lh | Rail web portion height Hw | Rail head portion width Gh | Rail foot portion width Gb | Experiment condition Rail web portion Distance Cw $3 Lh \geq C \geq 0.2 Lh$ | Length Bw $5 Lh \geq B \geq 0.5 Lh$ | Height Aw $Hw \geq A \geq 0.2 Hw$ | Heating temperature 750/400 |
|---|---|---|---|---|---|---|---|---|---|---|
| Example E1 | C | X | 30 | 104 | 78 | 152 | 50 | 70 | 104 | 720 |
| Example E2 | C | X | 30 | 104 | 78 | 152 | 50 | 70 | 104 | 680 |
| Example E3 | C | X | 30 | 104 | 78 | 152 | 50 | 70 | 104 | 700 |
| Example E4 | C | X | 30 | 104 | 78 | 152 | 50 | 70 | 104 | 550 |
| Example E5 | C | X | 30 | 104 | 78 | 152 | 50 | 70 | 104 | 720 |
| Example E6 | C | X | 30 | 104 | 78 | 152 | 50 | 70 | 104 | 680 |
| Example E7 | C | X | 30 | 104 | 78 | 152 | 50 | 70 | 104 | 700 |
| Example E8 | C | X | 30 | 104 | 78 | 152 | 50 | 70 | 104 | 720 |
| Example E9 | C | X | 30 | 104 | 78 | 152 | 50 | 70 | 104 | 680 |
| Example E10 | C | X | 30 | 104 | 78 | 152 | 50 | 70 | 104 | 700 |
| Example E11 | C | X | 30 | 104 | 78 | 152 | 50 | 70 | 104 | 550 |
| Example E12 | C | X | 30 | 104 | 78 | 152 | 50 | 70 | 104 | 670 |
| Example E13 | C | X | 30 | 104 | 78 | 152 | 50 | 70 | 104 | 550 |
| Example E14 | C | X | 30 | 104 | 78 | 152 | 50 | 70 | ≥104 | 580 |
| Example E15 | C | X | 30 | 104 | 78 | 152 | 50 | 70 | ≥104 | 580 |
| Example E16 | C | X | 30 | 104 | 78 | 152 | 50 | 70 | ≥104 | 570 |
| Example E17 | C | X | 30 | 104 | 78 | 152 | 50 | 70 | ≥104 | 720 |
| Example E18 | C | X | 30 | 104 | 78 | 152 | 50 | 70 | ≥104 | 730 |
| Example E19 | C | X | 30 | 104 | 78 | 152 | 50 | 70 | ≥104 | 740 |
| Example E20 | C | X | 40 | 104 | 78 | 152 | 100 | 150 | ≥104 | 700 |
| Example E21 | C | X | 50 | 104 | 78 | 152 | 100 | 150 | ≥104 | 620 |
| Example E22 | C | Y | 30 | 74 | 65 | 127 | 50 | 70 | ≥74 | 500 |
| Example E23 | C | Y | 30 | 74 | 65 | 127 | 50 | 70 | ≥74 | 720 |
| Comparative Example e1 | C | X | 30 | 104 | 78 | 152 | | | | |
| Comparative Example e2 | C | X | 30 | 104 | 78 | 152 | 50 | 70 | 104 | 750 |
| Comparative Example e3 | C | X | 30 | 104 | 78 | 152 | 50 | 70 | 104 | 350 |
| Comparative Example e4 | C | X | 30 | 104 | 78 | 152 | 50 | 70 | 104 | 400 |
| Comparative Example e5 | C | X | 30 | 104 | 78 | 152 | 50 | 70 | 104 | 745 |
| Comparative Example e6 | C | X | 30 | 104 | 78 | 152 | 50 | 70 | 104 | 410 |
| Comparative Example e7 | C | X | 30 | 104 | 78 | 152 | 50 | 70 | 104 | 415 |
| Comparative Example e8 | C | X | 30 | 104 | 78 | 152 | 50 | 70 | 104 | 760 |
| Comparative Example e9 | C | X | 30 | 104 | 78 | 152 | 50 | 70 | ≥74 | 400 |
| Comparative Example e10 | C | X | 30 | 104 | 78 | 152 | 50 | 70 | ≥74 | 760 |

| | Experiment condition | | | | | | | | |
|---|---|---|---|---|---|---|---|---|---|
| | Appropriate temperature | | Head portion | | | | Foot portion | | |
| | | | Distance | Length | | | Distance | Length | |
| No. | min $0.375 Tw + 350$ or $400°$ C. | max $0.5 Tw + 600$ or $750°$ C. | Ch $3 Lh \geq Ch \geq 0.2 Lh$ | Bh $5 Lh \geq B \geq 0.5 Lh$ | Width Ah $Ah \geq 0.3 Gh$ | Temperature 750/400 | Cb $3 Lh \geq Cb \geq 0.2 Lh$ | Bb $5 Lh \geq Bb \geq 0.5 Lh$ | Width Ab $Ab \geq 0.3 Gh$ | Temperature 750/400 |
| Example E1 | 500 | 750 | | | | | | | | |
| Example E2 | 481 | 750 | | | | | | | | |
| Example E3 | 470 | 750 | 50 | 70 | 70 | 600 | | | | |
| Example E4 | 451 | 735 | 50 | 70 | 70 | 600 | | | | |
| Example E5 | 500 | 750 | | | | | 50 | 70 | 120 | 600 |
| Example E6 | 481 | 750 | | | | | 50 | 70 | 120 | 600 |
| Example E7 | 538 | 750 | 50 | 70 | 70 | 600 | 50 | 70 | 120 | 600 |
| Example E8 | 500 | 750 | 50 | 70 | 70 | 600 | 50 | 70 | 120 | 600 |
| Example E9 | 481 | 750 | 50 | 70 | 70 | 600 | 50 | 70 | 120 | 600 |
| Example E10 | 470 | 750 | 50 | 70 | 70 | 600 | 50 | 70 | 120 | 600 |
| Example E11 | 451 | 735 | 50 | 70 | 70 | 600 | 50 | 70 | 120 | 600 |
| Example E12 | 455 | 740 | 50 | 70 | 70 | 600 | 50 | 70 | 120 | 600 |
| Example E13 | 395 | 660 | 50 | 70 | 70 | 600 | 50 | 70 | 120 | 600 |
| Example E14 | 400 | 625 | 50 | 70 | ≥78 | 600 | 50 | 70 | 120 | 600 |

TABLE 7-continued

| | | | | | Example E | | | | | |
|---|---|---|---|---|---|---|---|---|---|---|
| Example E15 | 400 | 625 | 50 | 70 | 70 | 600 | 50 | 70 | ≥152 | 600 |
| Example E16 | 400 | 625 | 50 | 70 | ≥78 | 600 | 50 | 70 | ≥152 | 600 |
| Example E17 | 500 | 750 | 50 | 70 | ≥78 | 600 | 50 | 70 | 120 | 600 |
| Example E18 | 500 | 750 | 50 | 70 | 70 | 600 | 50 | 70 | ≥152 | 600 |
| Example E19 | 500 | 750 | 50 | 70 | ≥78 | 600 | 50 | 70 | ≥152 | 600 |
| Example E20 | 500 | 750 | 100 | 150 | ≥78 | 600 | 100 | 150 | ≥152 | 600 |
| Example E21 | 500 | 750 | 100 | 150 | ≥78 | 600 | 100 | 150 | ≥152 | 600 |
| Example E22 | 400 | 625 | 50 | 70 | ≥65 | 600 | 50 | 70 | ≥127 | 600 |
| Example E23 | 500 | 750 | 50 | 70 | ≥65 | 600 | 50 | 70 | ≥127 | 600 |
| Comparative Example e1 | | | | | | | | | | |
| Comparative Example e2 | 400 | 625 | 50 | 70 | 70 | 600 | 50 | 70 | 120 | 600 |
| Comparative Example e3 | 400 | 625 | 50 | 70 | 70 | 600 | 50 | 70 | 120 | 600 |
| Comparative Example e4 | 451 | 735 | 50 | 70 | 70 | 600 | 50 | 70 | 120 | 600 |
| Comparative Example e5 | 451 | 735 | 50 | 70 | 70 | 600 | 50 | 70 | 120 | 600 |
| Comparative Example e6 | 500 | 750 | 50 | 70 | 70 | 600 | 50 | 70 | 120 | 600 |
| Comparative Example e7 | 481 | 750 | 50 | 70 | 70 | 600 | 50 | 70 | 120 | 600 |
| Comparative Example e8 | 538 | 750 | 50 | 70 | 70 | 600 | 50 | 70 | 120 | 600 |
| Comparative Example e9 | 500 | 750 | 50 | 70 | ≥65 | 600 | 50 | 70 | ≥127 | 600 |
| Comparative Example e10 | 500 | 750 | 50 | 70 | ≥65 | 600 | 50 | 70 | ≥127 | 600 |

| No. | Heating start time after welding [min] | Heating start temperature [° C.] of rail web portion of heating part | Temperature Tw[° C.] of rail web portion of weld zone at start of heating | Residual stress [MPa] | | Fatigue crack generation life [×1000] Rail web portion test | | Remarks |
|---|---|---|---|---|---|---|---|---|
| | | | | Weld zone | Reheating part | Load applied to weld zone | Load applied to reheating part | |
| Example E1 | 7 | 350 | 400 | 102 | 150 | >2,000 | >2,000 | |
| Example E2 | 9 | 300 | 350 | 138 | 147 | >2,000 | >2,000 | |
| Example E3 | 11 | 270 | 320 | 162 | 158 | >2,000 | >2,000 | |
| Example E4 | 20 | 220 | 270 | 199 | 164 | >2,000 | >2,000 | |
| Example E5 | 7 | 350 | 400 | 101 | 182 | >2,000 | >2,000 | |
| Example E6 | 9 | 300 | 350 | 136 | 150 | >2,000 | >2,000 | |
| Example E7 | 5 | 400 | 600 | 182 | 162 | >2,000 | >2,000 | |
| Example E8 | 7 | 350 | 400 | 98 | 159 | >2,000 | >2,000 | |
| Example E9 | 9 | 300 | 350 | 145 | 143 | >2,000 | >2,000 | |
| Example E10 | 11 | 270 | 320 | 150 | 150 | >2,000 | >2,000 | |
| Example E11 | 20 | 220 | 270 | 205 | 163 | >2,000 | >2,000 | |
| Example E12 | 30 | 160 | 280 | 115 | 154 | >2,000 | >2,000 | |
| Example E13 | 60 | 100 | 120 | 162 | 106 | >2,000 | >2,000 | |
| Example E14 | 180 | 50 | 50 | 125 | 86 | >2,000 | >2,000 | Heating regions of head portion and rail web portion were continuously connected |
| Example E15 | 180 | 50 | 50 | 95 | 86 | >2,000 | >2,000 | Heating regions of foot portion and rail web portion were continuously connected |
| Example E16 | 180 | 50 | 50 | 125 | 108 | >2,000 | >2,000 | Heating regions of head portion, rail web portion, and foot portion were continuously connected |
| Example E17 | 7 | 350 | 400 | 81 | 120 | >2,000 | >2,000 | Heating regions of head portion and rail web portion were |

TABLE 7-continued

| | | | | | | | Example E |
|---|---|---|---|---|---|---|---|
| Example E18 | 7 | 350 | 400 | 94 | 107 | >2,000 | >2,000 | continuously connected |
| | | | | | | | Heating regions of foot portion and rail web portion were continuously connected |
| Example E19 | 7 | 350 | 400 | 76 | 114 | >2,000 | >2,000 | Heating regions of head portion, rail web portion, and foot portion were continuously connected |
| Example E20 | 7 | 350 | 400 | 58 | 154 | >2,000 | >2,000 | Heating regions of head portion, rail web portion, and foot portion were continuously connected |
| Example E21 | 7 | 350 | 400 | 125 | 184 | >2,000 | >2,000 | Heating regions of head portion, rail web portion, and foot portion were continuously connected |
| Example E22 | 180 | 50 | 50 | 175 | 147 | >2,000 | >2,000 | Heating regions of head portion, rail web portion, and foot portion were continuously connected |
| Example E23 | 7 | 350 | 400 | 62 | 180 | >2,000 | >2,000 | Heating regions of head portion, rail web portion, and foot portion were continuously connected |
| Comparative Example e1 | | | | 425 | −186 | 1,168 | >2,000 | As-welded |
| Comparative Example e2 | 180 | 50 | 50 | 12 | 482 | 1,680 | 982 | Residual stress of reheating part increased |
| Comparative Example e3 | 180 | 50 | 50 | 396 | −120 | 1384 | >2,000 | Reheating temperature was insufficient and residual stress was high |
| Comparative Example e4 | 20 | 220 | 270 | 385 | −102 | 1,773 | >2,000 | Reheating temperature was insufficient and residual stress was high |
| Comparative Example e5 | 20 | 220 | 270 | 28 | 404 | >2,000 | 1,758 | Residual stress of reheating part increased |
| Comparative Example e6 | 7 | 350 | 400 | 361 | 59 | 1868 | 1,890 | Reheating temperature was insufficient and residual stress was high |
| Comparative Example e7 | 9 | 300 | 350 | 205 | 296 | 1720 | 1,646 | Reheating temperature was insufficient and residual stress was high |
| Comparative Example e8 | 5 | 400 | 500 | 44 | 364 | 1289 | 685 | Softening occurred due to excessively high heating temperature |
| Comparative Example e9 | 7 | 350 | 400 | 360 | −50 | 1,386 | >2,000 | Reheating temperature was insufficient and residual stress was high |

TABLE 7-continued

| | Example E | | | | | | | |
|---|---|---|---|---|---|---|---|---|
| Comparative Example e10 | 7 | 350 | 400 | 19 | 304 | 1408 | 1,500 | Softening occurred due to excessively high heating temperature |

Example E

Table 7 shows Examples obtained by reheating rails at times in which the rails had various different temperatures after subjecting the rails to the flash butt welding.

Welded rails each having a steel type of "C" shown in Table 1 and a cross section size of "X" shown in Table 2, and welded rails each having a steel type of "C" shown in Table 1 and a cross section size of "Y" shown in Table 2 were used. The hardness of the base material was Hv 400 to 450.

In this Example, the residual stress of the reheating part of the rail web portion was measured. Further, as a fatigue test, as shown in FIG. 31, a test in which a load was applied to the vertical line of the center of the reheating part of the rail web portion was performed.

Three specimens were formed under the same conditions using the flash butt welding. Among them, a first specimen was used for the measurement of residual stress, a second specimen was used in a test for evaluating the fatigue life of the weld zone of the rail web portion, and a third specimen was used for evaluating the fatigue life of the reheating part of the rail web portion.

Examples E1 and E2 are each an example in which only the rail web portion was reheated, Examples E3 and E4 are each an example in which the rail web portion and the rail head portion were reheated, Examples E5 and E6 are each an example in which the rail web portion and the rail foot portion were reheated, and Examples E7 to E23 are each an example in which the rail web portion, the rail head portion, and the rail foot portion were reheated. Of those, Examples E14 to E23 are each an example in which at least two of the reheating regions of the rail web portion, the rail head portion, and the rail foot portion were continuously connected.

With adjustment of reheating temperature in accordance with initial temperature of a weld zone varying depending on the reheating-start time, the residual stress of the weld zone was 350 MPa or less and the residual stress of the reheating part was 400 MPa or less, and hence, the weld zone having small residual stress as an entire weld zone was obtained.

With the reduction in the residual stress, compared to the case of the as-welded material of Comparative Example e1 in which cracks were generated at a short life where the number of the repetitions of a load did not reach 2000000 in a fatigue test of the weld zone of the rail web portion, cracks were not generated until the number of the repetitions of a load reached 2000000 in Examples E1 to E23.

Further, cracks were not generated until the number of repetitions of a load reached 2000000 in a fatigue test of the rail web portion performed with respect to the reheating part. On the other hand, in each of the cases of Comparative Examples e2 and e5, the residual stress of the reheating part was 400 MPa or more, and cracks were generated at a short life where the number of the repetitions of a load did not reach 2000000 in a fatigue test of the rail web portion performed with respect to the reheating part.

Further, in each of the cases of Comparative Examples e3, e4, e6, e7, and e9, since the reheating temperature was insufficient, the residual stress of the weld zone exceeded 350 MPa, cracks were generated at a short life where the number of the repetitions of a load did not reach 2000000 in a fatigue test of the rail web portion performed with respect to the weld zone.

Further, in each of the cases of Comparative Examples e8 and e10, the reheating part softened due to excessively high reheating temperature, cracks were generated at a short life where the number of the repetitions of a load did not reach 2000000 in fatigue tests of the rail web portion with respect to the weld zone and the reheating part.

REFERENCE SIGNS LIST

1: head portion of rail
2: rail web portion of rail
3: foot portion of rail
4: head-top portion of rail
5: foot-top portion of rail
6: sole portion of rail
7: weld zone
8: weld bead
9: electrode
10: welded rail
11: weld bead formed by upset
12: trimmer
13: power
22: fatigue crack
23: brittle crack
24: tie
25: wheel
26: shrinkage stress in axial direction
27: surface plate
28: pressing tool
29: chuck of fatigue testing machine
A-A: cross section along line A-A, cross section forming right angle with longitudinal direction of rail at welding center
Aw: height of reheating region of rail web portion
Ah: width of reheating region of head portion
Ab: width of reheating region of sole portion 6
B-B: cross section along line B-B, cross section passing symmetry axis of rail and being parallel and vertical to longitudinal direction
Bw: length of reheating region of rail web portion
Bh: length of reheating region of head portion
Bb: length of reheating region of sole portion 6
C: distance between reheating region and welding center
Cw: distance between reheating region of rail web portion and welding center
Ch: distance between reheating region of head portion and welding center
Cb: distance between reheating region of sole portion 6 and welding center
D-D: cross section along line D-D (center plane of height of rail web portion)

E: strain
Et: strain of reheating part
Etx: strain of reheating part in longitudinal direction
FL, FR: cross section forming right angle with longitudinal direction of rail, placed at outer side of reheating region, FL representing left-hand cross section shown in figure, and FR representing right-hand cross section shown in figure
Gh: head width
Gb: foot width
Hw: height of rail web
K: load
Lh: HAZ length
ML, MR: cross section forming right angle with longitudinal direction of rail near weld zone, ML representing left-hand cross section shown in figure, and MR representing right-hand cross section shown in figure
P: reheating region
Pw: reheating region of rail web portion
Ph: reheating region of head portion
Pb: reheating region of sole portion 6
Q: welding center
Rwo: temperature distribution immediately after welding
Rw1: temperature distribution at standing to cool immediately after welding
R0: temperature distribution immediately before reheating
R1: temperature distribution immediately after reheating
R2: temperature distribution after predetermined time has elapsed from the reheating
Sq: stress in welding center
St: stress in reheating part
Stx: shrinkage stress of rail web portion in longitudinal direction at cross section T
Sthx: shrinkage stress of head portion in longitudinal direction at cross section T
Sf: stress in cross section placed at outer side of reheating region
Sm: stress in cross section M
TL, TR: cross section passing center of reheating region and forming right angle with longitudinal direction of rail, TL representing left-hand cross section shown in figure, and TR representing right-hand cross section shown in figure
Th: reheating temperature
U: distribution of residual stress
VL, VR: point at which residual stress is neutral, VL representing left-hand point shown in figure, and VR representing right-hand point shown in figure
W: position at which compressive residual stress at rail side is maximum
X: HAZ boundary line
Z: melting boundary

The invention claimed is:
1. A method of reheating a rail weld zone, the method being performed after rails were welded, comprising:
selecting a distance Cw from a welding center Q as a location of a reheating region Pw of a rail web portion, the distance Cw being more than or equal to 0.2 times and less than or equal to three times a heat affected zone (HAZ) length Lh of the rail weld zone,
selecting a distance Ch in a rail longitudinal direction from a vertical axis through the welding center Q as a location of a reheating region Ph of a rail head top portion, wherein the distance Ch is more than or equal to 0.2 times and less than or equal to three times the HAZ length Lh of the rail weld zone, and
reheating the reheating region Pw simultaneously with the reheating region Ph based on the selected distances Cw and Ch.

2. The method of reheating a rail weld zone according to claim 1,
wherein the reheating region Ph of the rail head-top portion has a length Bh of more than or equal to 0.5 times and less than or equal to five times the HAZ length Lh of the rail weld zone.

3. The method of reheating a rail weld zone according to claim 1,
wherein the reheating region Ph of the rail head-top portion has a width Ah of more than or equal to 0.3 times a rail head width Gh.

4. The method of reheating a rail weld zone according to claim 1,
wherein the reheating region Ph of the rail head-top portion has a temperature Th(° C.) reached at a center of the reheating region Ph of higher than or equal to 400° C. and lower than or equal to 750° C.

5. The method of reheating a rail weld zone according to claim 1,
wherein the reheating region Pw has a length B in a rail longitudinal direction of more than or equal to 0.5 times and less than or equal to five times the HAZ length Lh of the rail weld zone:

$$0.5Lh \leq B \leq 5Lh.$$

6. The method of reheating a rail weld zone according to claim 1,
wherein the reheating region Pw has a height A of more than or equal to 0.2 times a height Hw of the rail web portion:

$$0.2Hw \leq A.$$

7. The method of reheating a rail weld zone according to claim 1,
wherein the reheating region Pw has a temperature Th(° C.) reached in a reheating process at a center of the reheating region Pw of higher than or equal to 400° C. and lower than or equal to 750° C.

8. The method of reheating a rail weld zone according to claim 7, wherein the temperature Th(° C.) reached in the reheating process at the center of the reheating region Pw satisfies the following Expression (1)

$$0.375Tw+350 \leq Th \leq 0.5Tw+600 \qquad (1)$$

where Tw represents an initial temperature Tw(° C.) of the rail weld zone in the reheating process.

9. The method of reheating a rail weld zone according to claim 1,
further comprising a distance Cb between a reheating region Pb of a rail sole portion and the welding center Q that is more than or equal to 0.2 times and less than or equal to three times the HAZ length Lh of the rail weld zone.

10. A method of reheating a rail weld zone, the method being performed after rails were welded, comprising:
selecting a distance Cw from a welding center Q as a location of a reheating region Pw of a rail web portion, the distance Cw being more than or equal to 0.2 times and less than or equal to three times a heat affected zone (HAZ) length Lh of the rail weld zone,
selecting a distance Cb in a rail longitudinal direction from a vertical axis through the welding center Q as a location of a reheating region Pb of a rail sole portion, wherein the distance Cb is more than or equal to 0.2 times and less than or equal to three times the HAZ length Lh of the rail weld zone, and reheating the reheating region Pw simultaneously with the reheating region Pb based on the selected distances Cw and Cb.

11. The method of reheating a rail weld zone according to claim 10,
wherein the reheating region Pb of the rail sole portion has a length Bb of more than or equal to 0.5 times and less than or equal to five times the HAZ length Lh of the rail weld zone.

12. The method of reheating a rail weld zone according to claim 11,
wherein the reheating region of the rail sole portion has a width Ab of more than or equal to 0.3 times a rail foot width Gb.

13. The method of reheating a rail weld zone according to claim 10,
wherein the reheating region Pb of the rail sole portion has a temperature Th(° C.) reached at a center of the reheating region Pb of higher than or equal to 400° C. and lower than or equal to 750° C.

14. The method of reheating a rail weld zone according to claim 10,
wherein the reheating region Pw has a length B in a rail longitudinal direction of more than or equal to 0.5 times and less than or equal to five times the HAG length Lh of the rail weld zone:

$$0.5Lh \leq B \leq 5Lh.$$

15. The method of reheating a rail weld zone according to claim 10,
wherein the reheating region Pw has a height A of more than or equal to 0.2 times a height Hw of the rail web portion:

$$0.2Hw \leq A.$$

16. The method of reheating a rail weld zone according to claim 10,
wherein the reheating region Pw has a temperature Th(° C.) reached in a reheating process at a center of the reheating region Pw of higher than or equal to 400° C. and lower than or equal to 750° C.

17. The method of reheating a rail weld zone according to claim 16, wherein the temperature Th(° C.) reached in the reheating process at the center of the reheating region Pw satisfies the following Expression (1)

$$0.375Tw + 350 \leq Th \leq 0.5Tw + 600 \quad (1)$$

where Tw represents an initial temperature Tw(° C.) of the rail weld zone in the reheating process.

* * * * *